(12) United States Patent
Walsh

(10) Patent No.: US 10,748,112 B2
(45) Date of Patent: Aug. 18, 2020

(54) INTELLIGENT USE OF LOCKERS IN MAILCENTER PACKAGE PROCESSING SYSTEM

(71) Applicant: Dale Walsh, Dallas, GA (US)

(72) Inventor: Dale Walsh, Dallas, GA (US)

(73) Assignee: RICOH COMPANY, LTD., Tokyo (JP)

( * ) Notice: Subject to any disclaimer, the term of this patent is extended or adjusted under 35 U.S.C. 154(b) by 686 days.

(21) Appl. No.: 15/339,832

(22) Filed: Oct. 31, 2016

(65) Prior Publication Data

US 2018/0121873 A1     May 3, 2018

(51) Int. Cl.
*G06Q 10/08*    (2012.01)

(52) U.S. Cl.
CPC .................... *G06Q 10/0836* (2013.01)

(58) Field of Classification Search
CPC ..................................................... G06F 21/62
See application file for complete search history.

(56) References Cited

U.S. PATENT DOCUMENTS

| | | | | |
|---|---|---|---|---|
| 4,416,413 A * | 11/1983 | Chester | ................ | A47G 29/20 232/24 |
| 4,865,248 A * | 9/1989 | Barth | ................ | A47G 29/20 232/24 |
| 6,694,217 B2 * | 2/2004 | Bloom | ................ | G07C 9/27 700/215 |
| 7,133,743 B2 * | 11/2006 | Tilles | ................ | G07F 17/12 700/242 |
| 7,162,330 B2 * | 1/2007 | Mayer | ................ | A47G 29/141 700/213 |
| 7,693,745 B1 * | 4/2010 | Pomerantz | ........... | G06Q 10/08 705/26.5 |
| 9,745,130 B1 * | 8/2017 | Rawal | ................ | G06Q 10/0836 |
| 2001/0017507 A1 * | 8/2001 | Hara | ................ | G07C 9/27 312/326 |
| 2002/0177922 A1 * | 11/2002 | Bloom | ................ | G07C 9/27 700/213 |
| 2002/0184497 A1 * | 12/2002 | Gage | ................ | G07F 17/12 713/168 |
| 2003/0025590 A1 * | 2/2003 | Gokcebay | ......... | G07C 9/00571 340/5.73 |
| 2007/0065259 A1 * | 3/2007 | Talley | ................ | B65G 1/0407 414/279 |
| 2007/0226088 A1 | 9/2007 | Miles et al. | | |
| 2008/0103791 A1 | 5/2008 | Heiden et al. | | |
| 2008/0158615 A1 | 7/2008 | Parkos et al. | | |

(Continued)

OTHER PUBLICATIONS

U.S. Appl. No. 15/339,807, Dale Walsh filed Oct. 31, 2016.

(Continued)

*Primary Examiner* — Talia F Crawley
(74) *Attorney, Agent, or Firm* — Duft & Bornsen, PC

(57) ABSTRACT

Tools (e.g., systems, apparatuses, methodologies, computer programs, etc.) including intelligent provisions enable a mail center to process packages at a mailcenter. Such processing may include extracting information from the package (via image processing), and then, when appropriate, assigning such package for pickup at a package storage locker. The package storage locker is preferably an intelligent locker that can be electronically controlled and can be integrated in the electronic mailcenter service system.

19 Claims, 42 Drawing Sheets

(56) References Cited

U.S. PATENT DOCUMENTS

| | | | | |
|---|---|---|---|---|
| 2013/0144427 | A1* | 6/2013 | Pugliese, III | B65G 1/137 |
| | | | | 700/215 |
| 2014/0035721 | A1* | 2/2014 | Heppe | G07C 9/00571 |
| | | | | 340/5.54 |
| 2015/0106296 | A1* | 4/2015 | Robinson | G06F 21/62 |
| | | | | 705/339 |
| 2015/0158679 | A1* | 6/2015 | Lossov | B65G 1/06 |
| | | | | 414/298 |
| 2015/0186840 | A1* | 7/2015 | Torres | A47F 10/02 |
| | | | | 705/339 |
| 2018/0121872 | A1* | 5/2018 | Walsh | G06Q 10/0833 |

OTHER PUBLICATIONS

"Intelligent Mail Barcode Question and Answers", Sep. 17, 2008.
"USPS—Mail Tracking and Reporting—How IMb Tracing™ Works", 2016.
"Steps to creating your Intelligent Mail Barcode", 2016.
M. Ironside, "Revolutionizing the Student Mail Center".
"Intelligent Mail Barcode 4-State Specification", 2015.
U.S. Appl. No. 15/280,277, Dale Walsh, filed Sep. 29, 2016.
Application No. 15/280,327, Dale Walsh, filed Sep. 29, 2016.
"Digital Mail—Applying Accurate and Objective Metrics to Improve Mail Operations and Document Management Decisions", copyright 2019.
David Pogue; The New York Times; On Internet, You've Got (Paper) Mail; Sep. 3, 2008.
Peter Nirenberg; Digital Mail Delivery—Features and Benefits; Power Point Mailcom 2001 Washington DC.

\* cited by examiner

INTELLIGENT USE OF LOCKERS IN MAILCENTER PACKAGE PROCESSING SYSTEM

TECHNICAL FIELD

This disclosure relates to systems, apparatuses, methodologies and other tools for processing of mail, and more specifically, intelligent provisions to process packages at a mailcenter, including use of package processing lockers for package retrieval by mail service customers, when possible.

BACKGROUND

Although proliferation of information technology tools has largely facilitated communication by electronic means, such as e-mail, text messaging, etc., there remains a great need for mailcenter services to process conventional mail, such as in the form of envelopes and paper, as well as packages. Many mailcenters were designed for a community (or other arrangement) in which mail service customers receive a significant amount of mail and occasional packages from family, friends or others. However, such paradigm has shifted dramatically, and many mail service customers now receive relatively little traditional letter mail but receive tremendous amounts of packages which may be attributable largely to online shopping.

Indeed, since the onset of online shopping, processing of packages has become increasingly a challenge to many mailcenters, and even a burden at times. Storing and distributing large numbers of packages creates significant challenges, particularly to mailcenters that were designed before unveiling of the Internet to common public use.

In many instances, a package is required to be delivered to a person (and not left unattended at a door). On the other hand, although mail service in many communities includes package delivery, the addressee of a package is often not available to receive delivery of the package. Even when redelivery of the package is available, scheduling redelivery may pose a problem to such addresses, since such scheduling typically means selection of a specific day for redelivery (within, at best, a window of several hours of a specified day), while time of delivery typically is virtually random. Further, pickup of the package at a conventional mailcenter may be cumbersome as well, since such pickup is generally required to be during specific hours of operation of a pickup window at the mailcenter. Further, in our current culture, customers, in many instances, prefer 24/7 service, particularly when such customers lead a busy life, spending the bulk of their day away from home, and therefore find it challenging to visit the mailcenter during normal business hours to retrieve their packages. Expanding the hours and days of operation of the mailcenter can help, but staffing the mailcenter then becomes a large expense due to the high cost of labor.

An improved approach to process packages so that mail service customers can receive packages in a manner most suitable to the customer, such as by integrating and adapting existing information technology tools, is needed.

SUMMARY

Various tools (for example, systems, apparatuses, methodologies, computer programs, etc.) can be provided to improve processing of packages. For example, a mailcenter service system may be configured to process packages more efficiently, from any of many perspectives, such as space, human resources, etc., while rendering the process of obtaining a package more convenient to the mail service customer. In an aspect, space reserved behind the service window for processing and storage of letters and/or packages can be, at least in part, reallocated to be occupied by intelligent lockers, in a space accessible to customers, permitting such a customer to retrieve packages in such a locker upon entry of a specified code.

In another aspect, tasks in the system may be automated as much as possible, including, for example, obtaining information from each incoming package (such as by scanning the package to generate a digital image, performing optical character recognition (OCR) on the digital image to obtain sender/addressee information, etc.), marking tracking code on the package, assigning a package storage locker (or a locker bank location) to the package, obtaining a device identifier of the locker, generating an unlock code to unlock the locker, acquiring electronic address of a customer associated with the extracted addressee information, sending a notification to the electronic address notifying arrival of the package shown by the digital image, notifying a device identifier and unlock code in the case that the package is to be or has already been deposited in a locker, requesting alternative instruction as to how to process the package, etc.

In another aspect, the system may include one or more package processing workstations to process incoming packages. Such processing may include, for example, applying a tracking code unique to the package being processed, assigning a default processing route to the package, etc. The default processing route can be assigned based on business rules and information extracted from the package. Such default route may correspond to locker pickup, mailcenter pickup, delivery to customer, delivery to alternate address, etc. Although locker pickup, when possible, is the preferred route, business rules may indicate that packages that are, for example, fragile, unwieldy, etc., should be processed for mail center pickup, or that packages that are, for example, urgent, perishable, biological, chemical, dangerous, etc., should be delivered directly to the customer (or another predetermined address).

The package processing workstation may include any of various other provisions to facilitate locker pickup. For example, when the package processing workstation assigns a package to locker pickup, the package processing workstation may also assign the package to a specified locker (or locker bank) location, and print such location on the package being processed. Further, the package processing workstation may control a label printer to print the location on a label to be applied on the package being processed. As another example, the package processing workstation may include a route selection user interface to permit user selection of a processing route or to override the system-selected default route with the user-selected route.

In another aspect, the package processing workstation may be configured to include an image capture device to capture a digital image of the package being processed, and such image may be used, as mentioned above, as well as elsewhere herein, in any of many different useful ways. For example, such image of the package may be compared to one or more package templates, to determine whether the package, due to size or shape, cannot be accommodated in any of the available package storage lockers, in which case the package may be assigned to mailcenter pickup. As another example, image processing provisions in the package processing workstation may be configured to extract from the digital image (i) sender information indicating a sender of the package and (ii) addressee information indicating an addressee of the package, and output metadata including the sender information and the addressee information along with the digital image of the address-bearing face. Such metadata may be registered in a database and employed to track the package, and/or may be used by the system to determine metrics and/or analytics as to package processing at the mailcenter. As another example, the registered data for a customer may be employed by the system to determine that the customer, due to personal circumstances or otherwise determinable from the registered data, prefers delivery of the package to a registered address, prefers mailcenter pickup, or prefers a particular locker bank location (when locker pickup is appropriate).

In another aspect, a mail service controller may be provided in the system to track packages, communicate with the package processing workstation(s), monitor status of the package storage locker (e.g., tracking whether the locker is occupied by a package) and track locker usage (e.g., what percentage of a selected period of time is a particular locker occupied, what percentage of the lockers are occupied at any particular time), track and/or control service provided to each service customer, etc.

In another aspect, a locker assignment device may be provided in the system, and such device may be a handheld device that is configured to read the device identifier of a locker when a package is being deposited at the locker. Such handheld locker assignment device preferably includes a wireless communication interface through which the device can communicate with the mail service controller. For example, when the locker assignment device reads the device identifier of the locker at which a package is being deposited, the locker assignment device may communicate the device identifier of the locker in association with the tracking code of the deposited package, to the mail service controller.

In another aspect, after determining or setting a default processing route, the mail service controller can cause a package arrival notification, or when appropriate (e.g., upon receiving from the locker assignment device the device identifier of the locker in association with the tracking code of the deposited package), a locker pickup notification, to be sent, notifying the customer. The package arrival notification identifies the package by tracking code and may request instruction (or alternate instruction modifying the processing route) via a webpage accessible by a uniform resource locator (URL) link that is included in the notification. At the webpage, the customer may enter a message, or otherwise specify instructions, indicating to the mailcenter as to how to process the package. For example, the page (or notification) may provide options for specifying predetermined instructions, such as hold package for pickup, deliver package to registered customer address, forward to another specified address, return to sender, discard or destroy, treat as junk mail, etc. Thus, in such instance, the customer may simply activate one of the predetermined response instructions for processing the package.

Although locker pickup, when possible, is assigned as the default processing route, when the mail service controller determines, based on business rules, that the package being processed is to be assigned by the route assignment device to mailcenter pickup, the mail service controller may be configured to automatically transmit a mailcenter pickup command to the package processing workstation and transmit a mailcenter pickup notification of arrived package to a registered electronic address of the specified customer. In such instance, the mailcenter pickup notification may include a selectable link to a notification response page at which the customer is to specify disposition instructions to the mailcenter.

Such notifications and instructions specified by the customer through the notification response page are preferably registered in a database in association with the customer. Such data may be advantageously employed in many ways. For example, the mail service controller may be configured to determine a preferred delivery address based on registered delivery instructions of the customer, and may populate the preferred delivery address as a default delivery location which is changeable upon command, as a disposition option in a notification or on a notification response page.

Business rules may be employed in other ways to facilitate processing and/or disposition of packages. For example, the mail service controller may be configured to determine, based on business rules, that after the mail service controller has not received disposition instruction from the customer for a package within a predetermined period of time in response to a notification, that the package has been abandoned, and in such instance, the mail service controller may determine, based on registered data, that the package should be returned to sender, or should be processed according to a default workflow for packages with no disposition instruction Any one or combination of technologies may be employed to facilitate package tracking and/or locker assignment. For example, the locker assignment device may employ a barcode reader to read a barcode on or in a locker, where the barcode encodes the device identifier and/or unlock code of the locker. In another example, the locker assignment device includes a RF tag reader to communicate with a RF tag on or in a locker to obtain the unique device identifier of the locker from the RF tag.

As discussed herein, the system preferably is configured to permit the mail service controller to communicate with each, and any combination, of the package processing workstation, the lockers, the locker assignment device, various databases, etc. For example, wireless technology may be used as much as possible, to facilitate portability, when feasible. With such communication provisions, any of various aspects may be provided in the system. For example, upon request from the locker assignment device, the mail service controller can communicate a list of unused package storage lockers at or near a specified locker bank location.

In another aspect, package storage lockers may hold the packages until a customer retrieves such packages from the package storage lockers. The package storage lockers may remain locked until an unlock code is supplied to the package storage lockers. The unlock code may be registered in local storage device (or a radio frequency tag) of the package storage lockers. A mail service controller or locker assignment device may generate the unlock code. Such unlock code is then sent to a customer via a notification notifying arrival of a package for the customer. When the customer arrives at the package storage locker holding his or her package, the customer inputs the unlock code into the package storage locker. The package storage locker compares the input unlock code with the unlock code registered by the package storage locker. The package storage locker opens a door of the package storage locker in case that the input unlock code and the registered unlock code matches.

BRIEF DESCRIPTION OF THE DRAWINGS

The aforementioned and other aspects, features and advantages can be more readily understood from the following detailed description with reference to the accompanying drawings wherein:

FIG. 17D shows an example of a notification response page, in any of the systems of FIGS. 1A-1C (or an equivalent);

DETAILED DESCRIPTION OF EMBODIMENTS

Figure 1A:
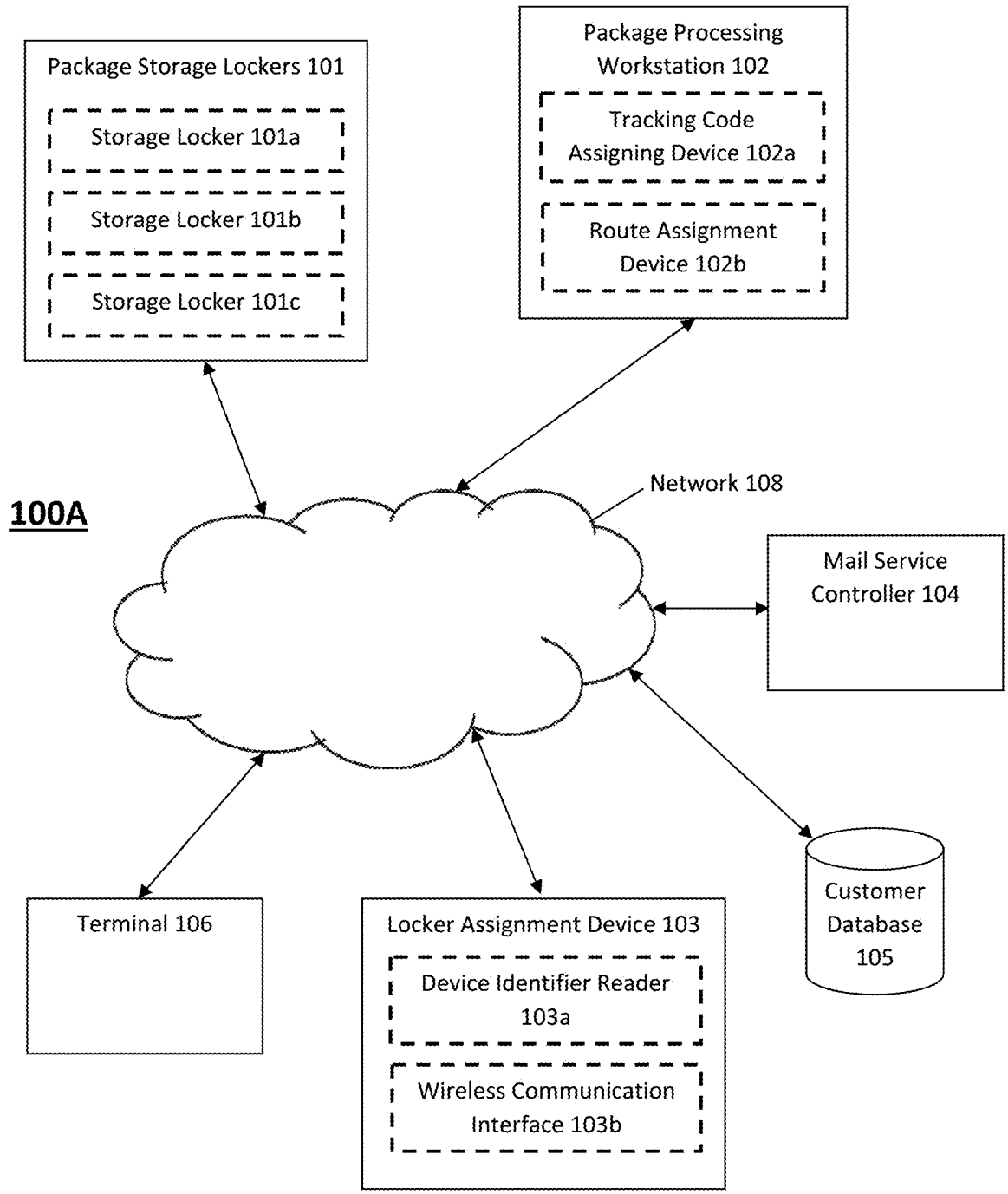
FIG. 1A shows a block diagram of a system that can include various provisions to perform processing of mail (packages and/or letter mail), according to an embodiment of this disclosure.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools to facilitate processing of mail (packages and/or letter mail) are discussed herein. It should be appreciated by those skilled in the art that any one or more of the various aspects, features and advantages discussed herein may be embedded in a mail or package processing system and/or in any of various other ways, and thus while various examples are discussed herein, the inventive aspects of this disclosure are not limited to such examples described herein.

Referring now to the drawings, wherein like reference numerals designate identical or corresponding parts throughout the several views, FIG. 1A shows schematically a system 100A that includes package storage lockers 101, a package processing workstation 102, mail service controller 104, locker assignment device 103 and a terminal 105, all of which is configured to connect to a network, such as network 108.

The package storage lockers 101 may be a set of one or more physical containers that can hold one or more pieces of mail (e.g., packages, letters, postcards, etc.) for a predetermined (or indefinite) amount of time. The package storage lockers 101 may be located a mailcenter that receives incoming mail. In an exemplary embodiment, the package storage lockers 101 may also be disposed at a location that is open anytime (e.g., 24/7) for customers to come to acquire the packages. For example, the package storage lockers 101 may include storage lockers 101a, 101b and 101c. However, it should be noted that there may be many more storage lockers included within the package storage lockers 101. Each of the package storage lockers 101 may include a code entry device which facilitates the locking (and unlocking) of each of the package storage lockers 101. For example, before access is granted to contents held by the package storage locker 101a, the code entry device may require an unlock code which may be a series of one or more characters (e.g., letters, numbers, symbols, etc.) that may be input into the code entry device. In an exemplary embodiment, the code entry device may include one or more physical buttons to receive a button-pushing sequence corresponding to the unlock code. In another exemplary embodiment, the code entry device may include an electronic touch screen interface to receive the unlock code. Thus, in the case that a correct unlock code is input into the code entry device, the package storage locker 101a may be unlocked thereby permitting access to contents held by the package storage locker 101a. On the other hand, in the case that the wrong unlock code is input into the code entry device, the package storage locker 101a may deny access to the contents held within.

In addition, the package storage lockers 101 may each include a unique device identifier which may be a series of one or more characters that may identify each of the package storage lockers 101 in one or more ways. Such unique device identifier may be placed (e.g., labeled, marked, etc.) on each of the package storage lockers 101 (i.e. for all to see), or may be placed inside each of the package storage lockers 101 (i.e. viewable only when the storage lockers are opened). In an exemplary embodiment, the character patterns which form the unique device identifier may be random. In another exemplary embodiment, each unique device identifier may have character patterns that denote an assigned location of each of the package storage lockers 101. In other words, by reading the unique device identifier (by either a person or an electronic device), the physical location of each of the package storage lockers 101 can be determined. For example, a particular unique device identifier may include a building number, an area number and a room number to help a person locate a specific package storage locker corresponding to the particular unique device identifier. In yet another exemplary embodiment, the unique device identifier be a barcode, which is an optical machine readable representation of data. In yet another exemplary embodiment, the unique device identifier may be stored in a radio-frequency (RF) tag (or chip) that may be read by an RF reader to obtain the unique device identifier. In yet another exemplary embodiment, each of the package storage lockers 101 may include a wireless communication device that permits access to a unique device identifier stored in a storage medium. Such storage medium may be accessible by any electronic device that can communicate wirelessly with the wireless communication device.

In an exemplary embodiment, each of the package storage lockers 101 may include different physical features (e.g., size, shape, color, etc.) from one another. In an example, the package storage lockers 101 may each be different sizes to accommodate large, medium, or small packages. In another example, the package storage lockers 101 may each be of a different shape to accommodate packages having unusual dimensions. In yet another example, each of the package storage lockers 101 may be in different colors. Such colors may assist in quickly identifying storage capabilities (e.g., small packages only) or purpose (e.g., for fragile packages) of the package storage lockers 101.

The package processing workstation 102 may perform processing of incoming packages in a mailcenter. For example, the package processing workstation 102 may be a single device or series of devices that facilitate the steps that incoming packages take. In another example, the package processing workstation 102 sorts incoming packages to facilitate more efficient processing. In yet another example, the package processing workstation 102 determines the destination of the incoming packages. The package processing workstation 101 includes a tracking code assigning device 102a and a route assignment device 102b.

The tracking code assigning device 102a designates a tracking code for each incoming package. Such tracking code may be a series of characters (or a barcode) that associates a particular package with a specific customer. For example, a particular customer may be assigned a permanent tracking code which uniquely identifies the particular customer. In another example, the tracking code assigning device 102a may generate a unique tracking code for each incoming package and create a tracking code-customer link to indicate a relationship between the tracking code and a specific customer. Thus, whenever such tracking code is assigned to a particular package, a customer associated with an intended recipient of the particular package is immediately known by reading the tracking code (by either a person or an electronic device). In another example, the tracking code is randomly generated. Further such randomly generated tracking code may be generated for every incoming package (even if multiple incoming packages are to be bound for the same recipient). Thus, for example, each randomly generated tracking code may be assigned to a particular customer.

In an exemplary embodiment, the mailcenter may also include one or more package templates. Such package templates may be templates that are compared to incoming packages. For example, the package templates may each represent package sizes (or shapes) that can fit in the package storage lockers 101. In other words, the package templates provide information on whether a specific incoming package can be held in one of the package storage lockers 101. In another exemplary embodiment, if it is determined that a specific incoming package is greater than the size of the largest packaging template (after a comparison is performed between the specific incoming package and the largest packaging template), the tracking code assigning device 102a labels the specific incoming package with a special tracking code. Such special tracking code indicates to the route assignment device 102b that the specific incoming package should be assigned a default route associated with transporting the specific incoming mail to be stored at a specific location at the mailcenter until an intended recipient of the specific incoming package performs a pick-up.

The route assignment device 102b designates a default route that is selected for an incoming package. The default route may correspond to a course or path by which a particular incoming package is to take. The route assignment device 102b may also include a label printer to create markings on incoming packages. Such markings may be characters (or images) marked on the incoming packages using ink (or other pigments or dyes) to identify the incoming packages.

For example, a specific incoming package may be assigned a default route in which the specific incoming package is sent to be held in one of the storage lockers (e.g., 101a, 101b, 101c, etc.) of the package storage lockers 101 for an amount of time until an intended recipient of the specific incoming package performs a pick-up. In such case, the route assignment device 102b may assign a particular package storage locker (e.g., 101a, 101b, 101c, etc.) to hold the specific incoming package. For example, the route assignment device 102b may determine if there are any empty package storage lockers that have the capability to hold the specific incoming package. In this case, the storage locker 101c may be provide such capability. Thus, the route assignment device 102b may, via the label printer, print a location of the storage locker 101c on a location label to be placed on the specific incoming package. The location label, for example, may include a written location (e.g., building no., department, room no., etc.) of the storage locker 101c. In another example, the location label may simply be the unique device identifier corresponding to the package storage locker 101c.

In another example, a particular incoming package may be assigned a default route in which the particular incoming package is transported to be stored at a specific location at the mailcenter until an intended recipient of the particular incoming package performs a pick-up. In this case, the intended recipient is handed the incoming package by mailcenter staff as opposed to personally picking up the incoming package at any of the storage lockers (e.g., 101a, 101b, 101c, etc.) in the package storage locker 101 with no interference by any mail staff.

The locker assignment device 103 assigns package storage lockers to packages that have arrived at the mail center after receiving package information from the mail service controller 104. In addition, the locker assignment device 103 may also obtain device identifiers and unlock codes from package storage lockers. For example, the locker assignment device 103 may be a handheld device that is utilized by mail staff to acquire device identifiers (and unlock codes) from each package storage locker. To facilitate the aforementioned tasks, the locker assignment device 103 may include a device identifier reader 103a to scan the unique device identifier and a wireless communication interface 103b to communicate with various devices (e.g., mail service controller) to obtain (or send) information regarding packages and package storage lockers.

The device identifier reader 103a reads the unique device identifier of one of the package storage lockers 101 whenever an incoming package is assigned to a storage locker (e.g., 101a, 101b, 101c, etc.). For example, the locker assignment device 103 may include a barcode reader to scan a device barcode disposed on or within the package storage lockers 101. Such device barcode may include encoding of both the unique device identifier and the unlock code of the package storage lockers 101. In yet another example, the device identifier reader may include an RF tag reader to scan (or communicate) with an RF tag disposed on the package storage lockers 101 to acquire the unique device identifiers (and unlock codes) corresponding to each of the package storage locker 101 from the RF tag.

The wireless communication interface 103b communicates wirelessly (e.g., via 802.11 protocol, Bluetooth, RF, etc.) with various devices. For example, the wireless communication interface 103b may receive package information (e.g., tracking code, etc.) of a package from the mail service controller 104. In another example, the wireless communication interface 103b communicates with a package storage locker to obtain the device identifier and unlock code of the package storage locker without having to read an RF tag or be in close proximity to the package storage locker. In yet another example, the wireless communication interface 103b may obtain an unlock code (or a device identifier) generated by the mail service controller 104 and forward such unlock code (or device identifier) to be registered by a specific package storage locker.

The mail service controller 104 tracks status of each of the storage lockers (e.g., 101a, 101b, 101c, etc.) in the package storage lockers 101, by communicating with the package processing workstation 102. For example, since the route assignment device 102b assigns a specific storage locker (e.g., 101b) for one or more incoming packages, the mail service controller 103 may want to keep track of (or monitor) which storage lockers are being used, and which storage lockers are currently empty. Further, the mail service controller 104 may also communicate with the locker assignment device 103 to determine the status of the package storage lockers 101. For example, after the locker assignment device 103 assigns a particular incoming package to a specific storage locker of the package storage lockers 101, the locker assignment device 103 may automatically communicate package-locker association information to the mail service controller 104. Such package-locker association information may include (i) the tracking code that was placed on the particular incoming package, (ii) the unique device identifier associated with the specific storage locker which holds (or is to hold) the particular incoming package and (iii) the unlock code associated with the specific storage locker.

Upon receiving the package-locker association information, the mail service controller 104 determines a customer who is the intended recipient of the incoming package by examining the tracking code that was received from the locker assignment device 103, and comparing such tracking code to content registered in the customer database 105. For example, the content of the customer database 105 may include a list of one or more customers whose information (e.g., contact information) is pre-registered with the mail facility. Whenever, a tracking code is generated for an incoming package, the generated tracking code is linked with a customer who is the intended recipient of the package. More than one tracking code can be linked with a customer. Such tracking code-customer link is then registered in the customer database 105. For example, the tracking code assigning device 102a may generate the tracking code and create the tracking code-customer link to indicate a relationship between the tracking code and a specific customer. Thus, the mail service controller 104 may check the customer database 105 to determine a customer who matches the received tracking code.

Once the mail service controller 104 determines the customer associated with the tracking code, the mail service controller 104 creates a locker pickup notification which is sent to an electronic address (e.g., email) associated with the customer. For example, the mail service controller 104 may check the customer database 105 to determine the electronic address. The locker pickup notification may include information indicating that the customer corresponding to the electronic address has a package intended for him or her at the mailcenter. Further, the locker pickup notification may also include (i) the tracking code of the package, (ii) a location of a specific storage locker currently holding the package, (iii) a unique device identifier of the storage locker and (iv) an unlock code for unlocking such specific storage locker.

The customer database 105 includes content such as information on one or more customers that are associated with the mailcenter. For example, contact information (e.g., name, physical address, email address, telephone number, fax number, etc.) may be registered in the customer database 105. Further, the tracking code assignment device 102a may register one or more tracking codes that are associated with each customer registered in the customer database 105. Such associations may be stored by the customer database 105 as tracking code-customer links. In addition, the mail service controller 105 may access the customer database 105 to acquire tracking code and customer information.

The host terminal 106 can be any computing device, including but not limited to a tablet or notebook computer, a PDA (personal digital assistant), another mobile information terminal, etc., that can communicate with other devices through the network 108.

The network 108 can be a local area network, a wide area network or any type of network such as an intranet, an extranet (for example, to provide controlled access to external users, for example through the Internet), a private or public cloud network, the Internet, etc., or a combination thereof. In addition, the network 106 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
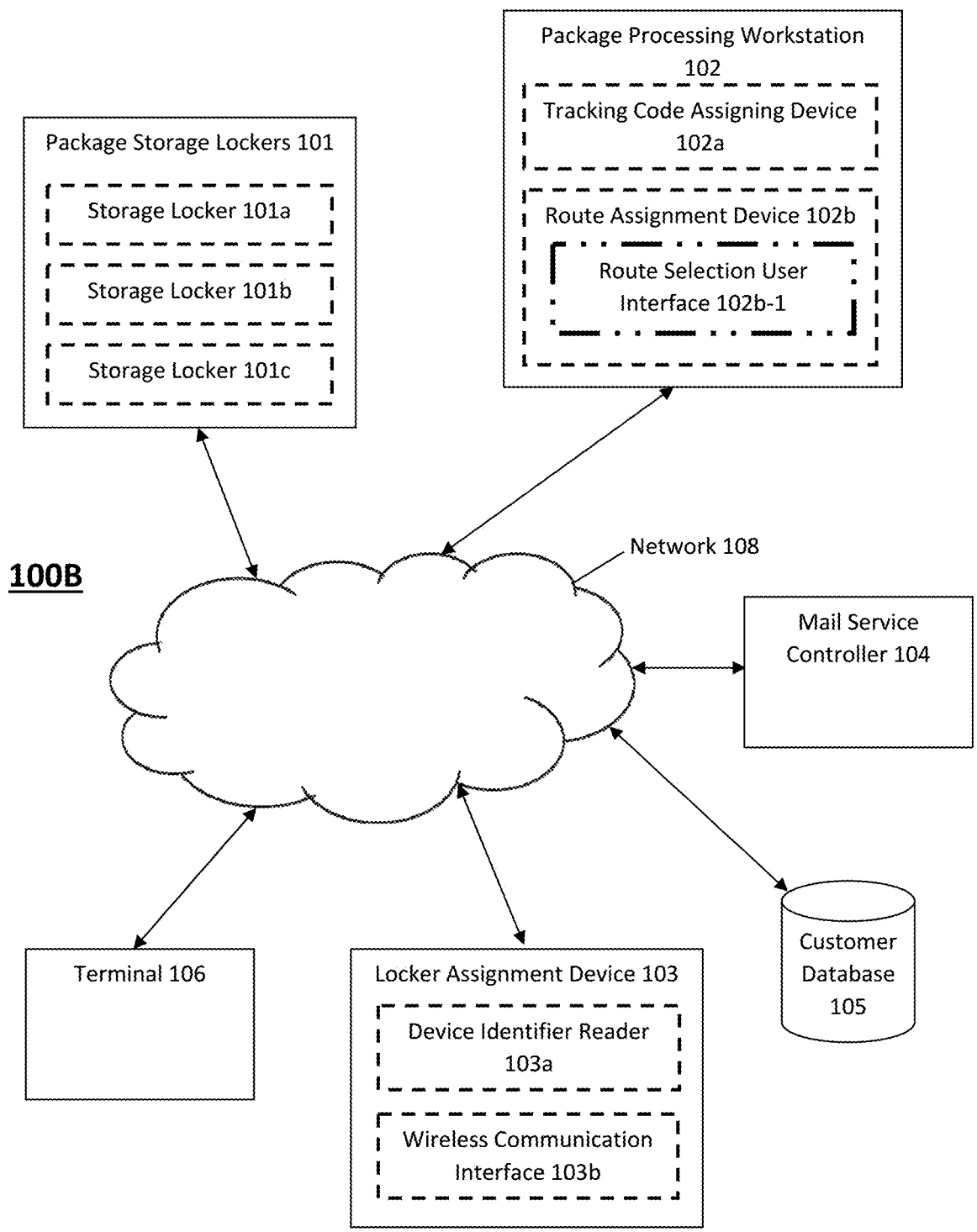
FIG. 1B shows a block diagram of a system that can include various provisions to perform processing of mail (packages and/or letter mail), according to another embodiment.

FIG. 1B shows schematically a system 100B according to another exemplary embodiment. The system 100B is similar to the system 100A except that the system 100B additionally includes a route selection user interface 102b-1.

The route selection user interface 102b-1 allows mailcenter staff to override a default route set by the route assignment device 102b. For example the route selection user interface 102b-1 may be a graphic user interface (GUI) disposed on the package processing workstation 102. In another example, the route selection user interface 102b-1 may be a touch screen interface. When the package processing workstation 102 receives a package, the route assignment device 102b may automatically assign a default route (e.g., delivery, send to locker, hold for mailcenter pickup, etc.) for the package to take. However, mailcenter staff may not always agree with the default route assigned by the route assignment device 102b. In other words, mailcenter staff may believe that another route is more appropriate. For example, mailcenter staff may decide for whatever reason that a package is better off being assigned to mail center pickup rather than being stored at a package storage locker. Thus, by using the route selection user interface 102b-1, the mailcenter staff may override the default route to the package storage locker and replace such default route with the mail center pickup route.

Otherwise, operations of the elements of the system 100B are similar to those discussed in connection with corresponding elements of the system 100A of FIG. 1A.

Figure 1C:
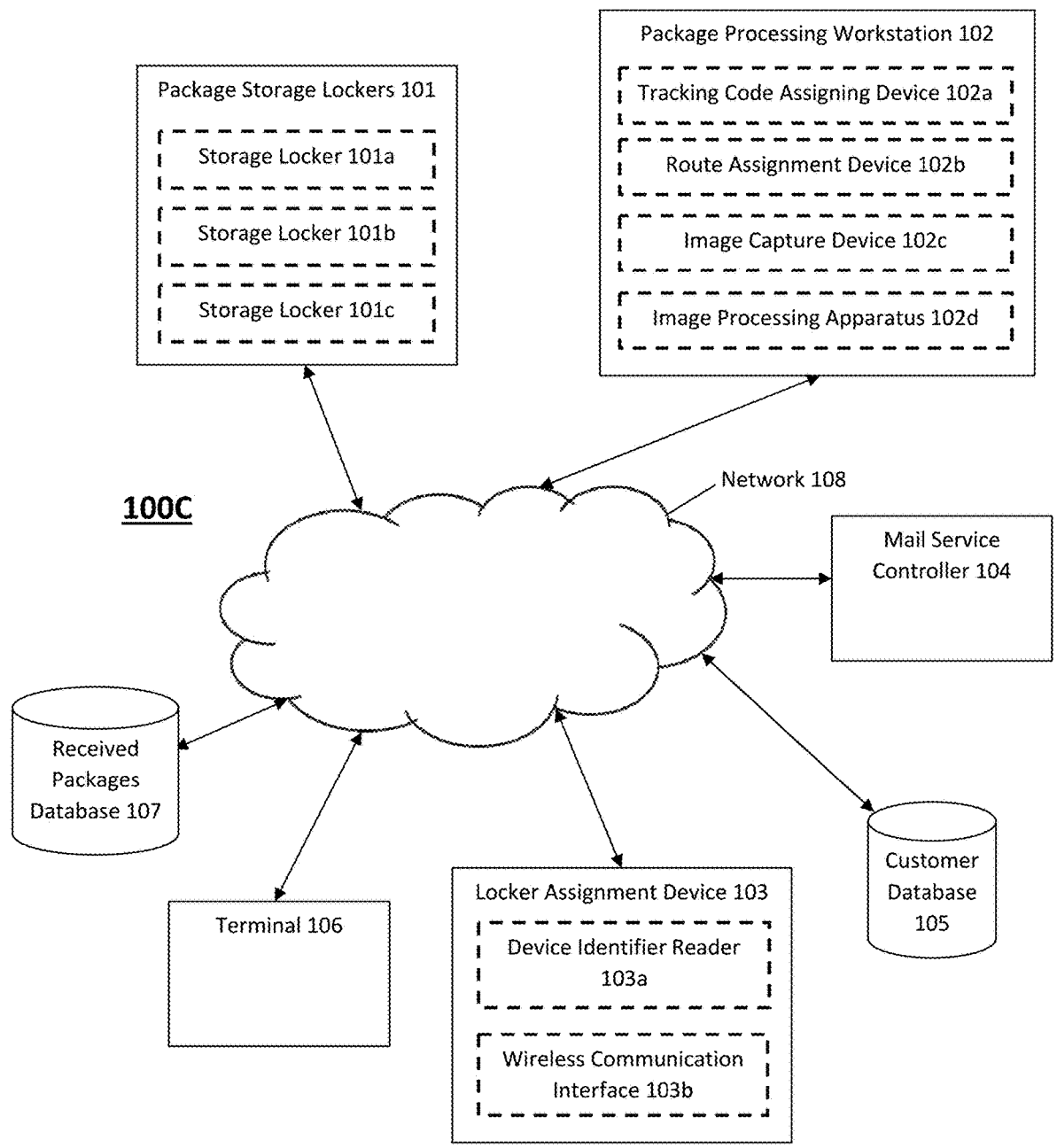
FIG. 1C shows a block diagram of a system that can include various provisions to perform processing of mail (packages and/or letter mail), according to yet another embodiment.

FIG. 1C shows schematically a system 100C according to another exemplary embodiment. The system 100C is similar to the system 100A except that the system 100C additionally includes an image capture device 102c, an image processing apparatus 102d and a received packages database 107.

The image capture device 102c captures an image of a package and outputs such captured image of the package as digital image which may include an address-bearing face. The address-bearing face of the package may be the portion of the package in which information regarding the sender (and his or her address) and the addressee (and his or her address) is indicated. In an exemplary embodiment, a mailcenter staff may assist the image capture device 102c in determining which portion of the mail item is the address-bearing face. In another exemplary embodiment, the image capture device 102c may capture every portion of the mail item, and let another device (e.g., image processing apparatus 102d) determine which portion is the address-bearing face. The image capture device 102c may send the digital image to the image processing apparatus 102d.

The image processing apparatus 102d receives the digital image of the package from the image capture device 102c, to perform image processing on the digital image for extracting information. For example, from the digital image, image processing apparatus 102d may determine any writing (whether typed or handwritten) on the package by using optical character recognition (OCR). After performing OCR on the digital image to obtain characters (e.g., letters, numbers, symbols, etc.), the image processing apparatus 102d may determine what sort of mail information is represented by the now-recognized characters (e.g., a person's name, company, government agency, university, a physical address of a location in real-life, etc.) by, for example, comparing information in the customer database 105 to the now-recognized characters.

In an exemplary embodiment, in a case that the image processing apparatus 102d receives more than one digital image (as the image capture device does not know which side is the address-bearing face of the mail item), the image processing apparatus 102d may perform OCR on each of the digital images, then compare the now-recognized characters to the information in the customer database 105 to determine which of the digital images is the address-bearing face, as well as the information contained with the now-determined address-bearing face. By performing such action, the image processing apparatus 102d can extract sender information (e.g., sender name, sender's address, etc.) and addressee information (e.g., recipient name, recipient's address, etc.) from the digital image. Next, after performing extraction, the image processing apparatus 102d outputs, to the mail service controller 104 (i) the digital image and (ii) metadata (e.g., sender information, addressee information, time of arrival of package, etc.) as extracted mail information.

The received packages database 107 registers information regarding incoming packages to the mailcenter. For example, after the image processing apparatus 102d extracts information from the package, the image processing apparatus 102d may receive the digital image and the metadata associated with the incoming packages, for registering the digital image and the metadata. In addition, the received packaged database may also receive tracking codes associated with the packages. Whenever such tracking code is received, the received packages database 107 registers an association between the tracking code, digital image and the metadata. Further, the received packages database 107 may also register notifications (e.g., locker pickup notification, pickup notification, delivery notification, etc.) sent by the mail service controller 104. Moreover, the received packages database 107 may also register instructions in response to the notifications (if any) received by the mail service controller 104 in association with the corresponding notifications.

Otherwise, operations of the elements of the system 100C are similar to those discussed in connection with corresponding elements of the system 100A of FIG. 1A.

Figure 2:
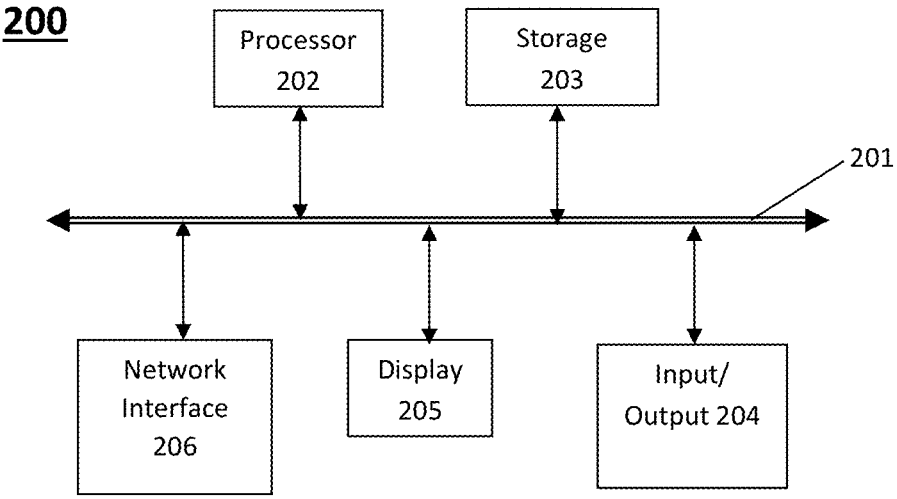
FIG. 2 shows a block diagram of an example of a configuration of a computing device that can be configured by software to operate as a mail service controller and/or mail notification apparatus.

FIG. 2 shows an exemplary constitution of a computing device that can be configured (for example, through software) to operate (at least in part) as a mail service controller and/or mail notification apparatus (e.g., 104 in FIGS. 1A-1C). In FIG. 2, apparatus 200 includes a processor (or central processing unit) 202 that communicates with a number of other components, including memory or storage device 203, display 205, network interface 206, and other input/output (e.g., keyboard, mouse, etc.) 204, by way of a system bus 201. The apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art. In the management apparatus 200, the processor 202 executes program code instructions that control device operations. The processor 202, memory/storage 203, input/output 204, display 205 and network interface 206 are conventional, and therefore in order to avoid obfuscating the inventive aspects of this disclosure, such conventional aspects are not discussed in detail herein.

The apparatus 200 includes the network interface 206 for communications through a network, such as communications through the network 107. However, it should be appreciated that the subject matter of this disclosure is not limited to such configuration. For example, the apparatus 200 may communicate with user terminals through direct connections and/or through a network to which some components are not connected. As another example, the apparatus 200 does not need to be provided by a server that services terminals, but rather may communicate with the devices on a peer basis, or in another fashion. Further, the apparatus 200 is not limited to a server or computer, but can be manifested in any of various devices that can be configured to communicate over a network and/or the Internet.

Figure 3:
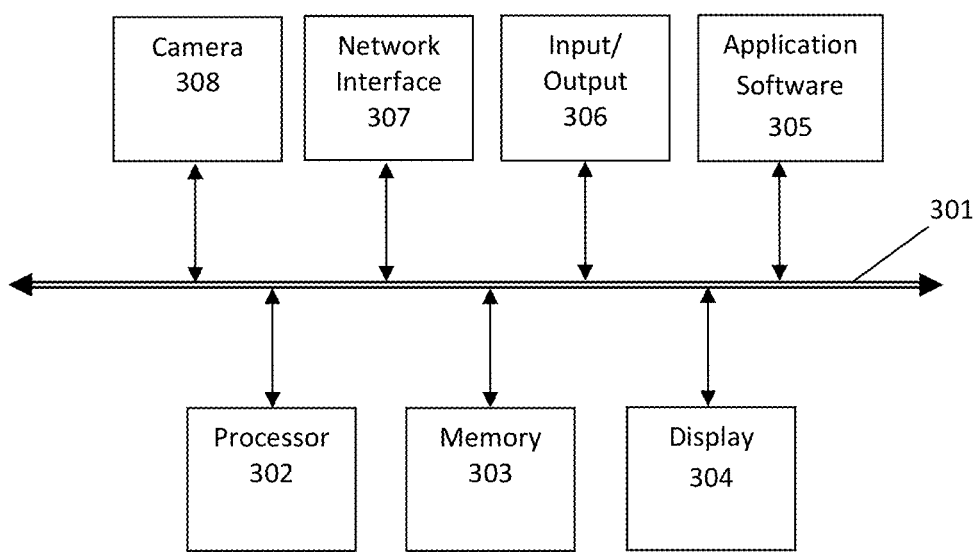
FIG. 3 shows a block diagram of an example of a configuration of a mobile device that can be configured to be a terminal.

An exemplary constitution of a locker assignment device 103 or a host terminal 106 of FIGS. 1A-1C is shown schematically in FIG. 3. In FIG. 3, terminal 300 includes a processor (or central processing unit) 302 that communicates with various other components, such as memory (and/or other storage device) 303, display 304, application software 305, input/output (such as keyboard, mouse, touchpad, stylus, microphone and/or speaker with voice/speech interface and/or recognition software, etc.) 306 and network interface 307, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NVRAM), etc.].

The network interface 307 provides a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 106 of FIGS. 1A-1C).

The camera 308 is, for example, a digital camera including a series of lenses, an image sensor for converting an optical image into an electrical signal, an image processor for processing the electrical signal into a color corrected image in a standard image file format, and a storage medium for storing the processed images.

The series of lenses focus light onto the sensor [e.g. a semiconductor device such as a charge-coupled device (CCD) image sensor or a complementary metal-oxide-semiconductor (CMOS) active pixel sensor] to generate an electrical signal corresponding to an image of a scene. The image processor then breaks down the electronic information into digital data, creating an image in a digital format. The created image is stored in the storage medium (e.g. a hard disk or a portable memory card).

The camera 308 may also be used to scan a barcode. As used herein, the term 'barcode' refers to an optical machine readable representation of data. The data encoded in the barcode is referred to in this disclosure as 'barcode data'. For example, a common type of barcode includes a linear barcode, also referred to as a one-dimensional barcode, wherein such a barcode represents information by varying the width, height and/or spacing of a plurality of parallel lines. Another common type of barcode includes matrix barcode, also referred to as a two-dimensional barcode, wherein such a barcode represents information using rectangles, dots, hexagons and other geometric patterns in 2-dimensions.

Barcodes are often attached to the exterior and/or packaging of various products and items in order to represent information pertaining to that product or item. The information represented by a barcode may include, for example, the manufacturer of the barcode, the type of the item, the model of the item, the identity of the item, the serial number of the item, etc. The barcodes may be scanned and read by special optical scanners called barcode readers, although scanners, cameras and interpretive software are available on devices including desktop printers and smart phones. The technology relating to barcodes and the different types of barcodes are well understood by those skilled in the art, and will not be discussed in further detail herein in order to avoid occluding inventive aspects of this disclosure.

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
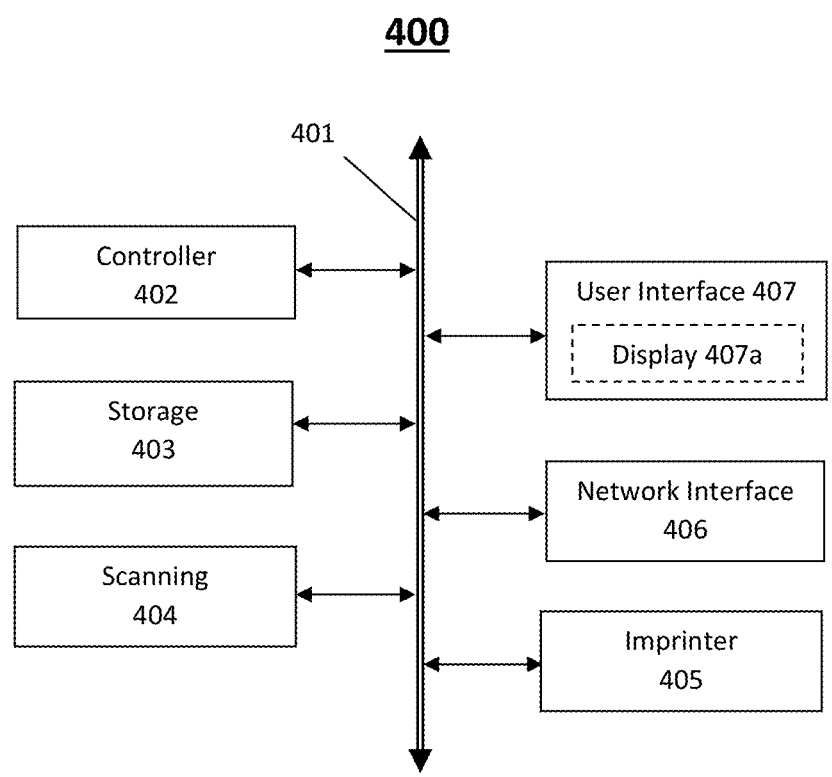
FIG. 4 shows a block diagram of an example of a configuration of a workstation.

FIG. 4 shows a schematic diagram of a configuration of a workstation (e.g., package processing workstation 102) that may include a scanner (e.g., image capture device 102c, bar code reader, etc.). The package processing workstation 400 shown in FIG. 4 includes a controller 402, and various elements connected to the controller 402 by an internal bus 401. The controller 402 controls and monitors operations of the scanner workstation 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanner 404, printer 405 (e.g. label printer, imprinter, etc.), a network interface (I/F) 406 and a user interface 407.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the scanner workstation 400, to enable the scanner workstation 400 to interact with a terminal, as well as perhaps other external devices, through the network interface 407, and interactions with users through the user interface 407.

The network interface 406 is utilized by the scanner workstation 400 to communicate via a network with other network-connected devices such as a terminal, a server and receive data requests, print (or other) jobs, user interfaces, and etc.

The user interface 407 includes one or more electronic visual displays that display, under control of controller 402, information allowing the user of the scanner workstation 400 to interact with the scanner workstation 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the scanner workstation 400, so as to allow the operator to interact conveniently with services provided on the scanner workstation 400, or with the scanner workstation 400 serving as terminal for accessing electronic data or other content through the network. User interfaces or other contents received through the network via the network interface 406 can be displayed on the display screen.

The display screen does not need to be integral with, or embedded in, a housing of the scanner workstation 400, but may simply be coupled to the scanner workstation 400 by either a wire or a wireless connection. The user interface 408 may include keys and/or buttons (such as graphical keys or buttons, or other graphical elements, of a GUI on a touch-screen display 407*a*) for inputting information or requesting various operations. Alternatively, the user interface 407 and the display screen may be operated by a keyboard, a mouse, a remote control, voice recognition, or eye-movement tracking, or a combination thereof.

Image reader or scanner 404, printer 405, and network interface 406 are otherwise conventional, and therefore, a detailed description of such conventional aspects is omitted in the interest of clarity and brevity. The scanner workstation 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 5A:
FIGS. 5A-5D graphically portray examples of an address bearing face of a package.

FIG. 5A is an example of an address bearing face of a package that may be received at the mailcenter. The term package, as used herein, may include, but is not limited to, packages, letters, postcards, etc. For example, such package may include sender information (e.g., an address of the person/organization who is sending the package) and addressee information (e.g., an address of the intended recipient of the package). Further, such package may also include a mail stamp.

Figure 5B:
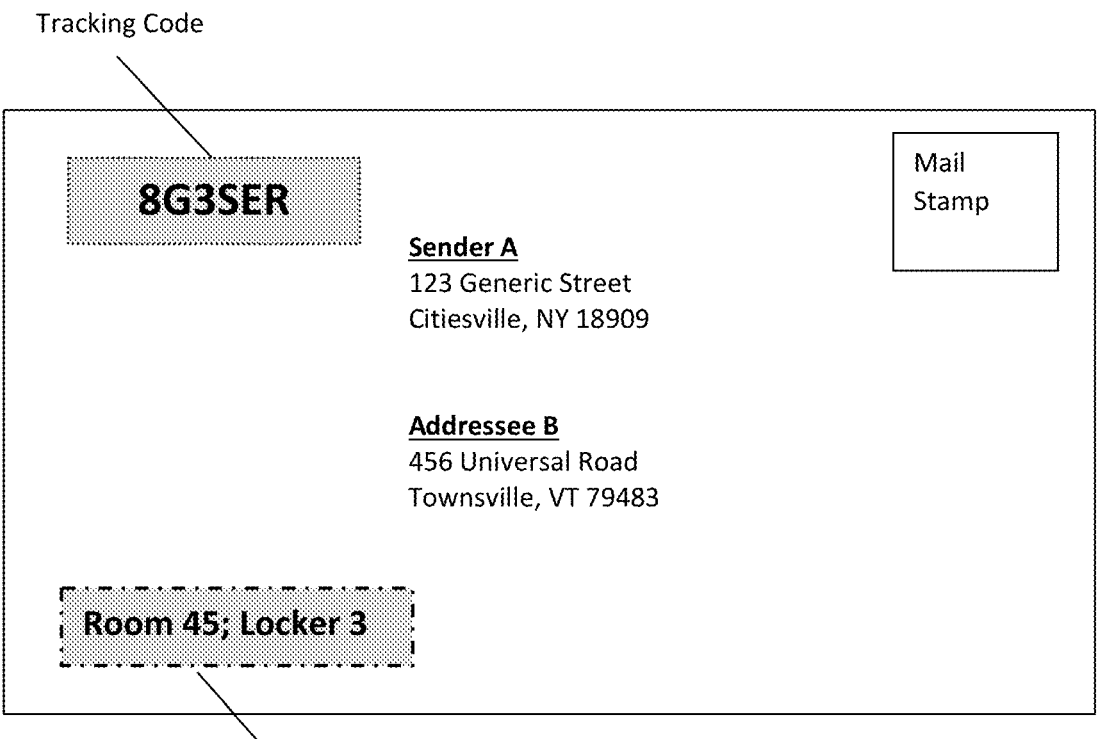

FIG. 5B is an example of an address bearing face of a package that has been imprinted (or marked) with a tracking code and a locker location. As shown, the tracking code may be a series of characters (e.g., letters, numbers, symbols, etc.) physically imprinted on the package for easy viewing. Further, the locker location may indicate a physical location of the package storage locker that the package is to be stored in. In addition, such locker location may be written in a manner that allows a person to determine the location of the locker without using a device.

Figure 5C:

FIG. 5C is another exemplary embodiment of a package that has been imprinted (or marked) with a tracking code and a locker location. In this case, the tracking code is represented by a barcode while the locker location is represented by a series of characters. This may permit greater security, as a device is needed to read the tracking code and a person may need to know how each package storage locker is labeled in order to determine the locker location.

Figure 5D:

FIG. 5D is another exemplary embodiment of a package that has been imprinted (or marked) with a tracking code and a locker location. In this case, both the tracking code and the locker location are represented by a barcode. Further, it should be noted that the location of where each tracking code and locker location is imprinted, can be anywhere on the label.

Figure 6A:
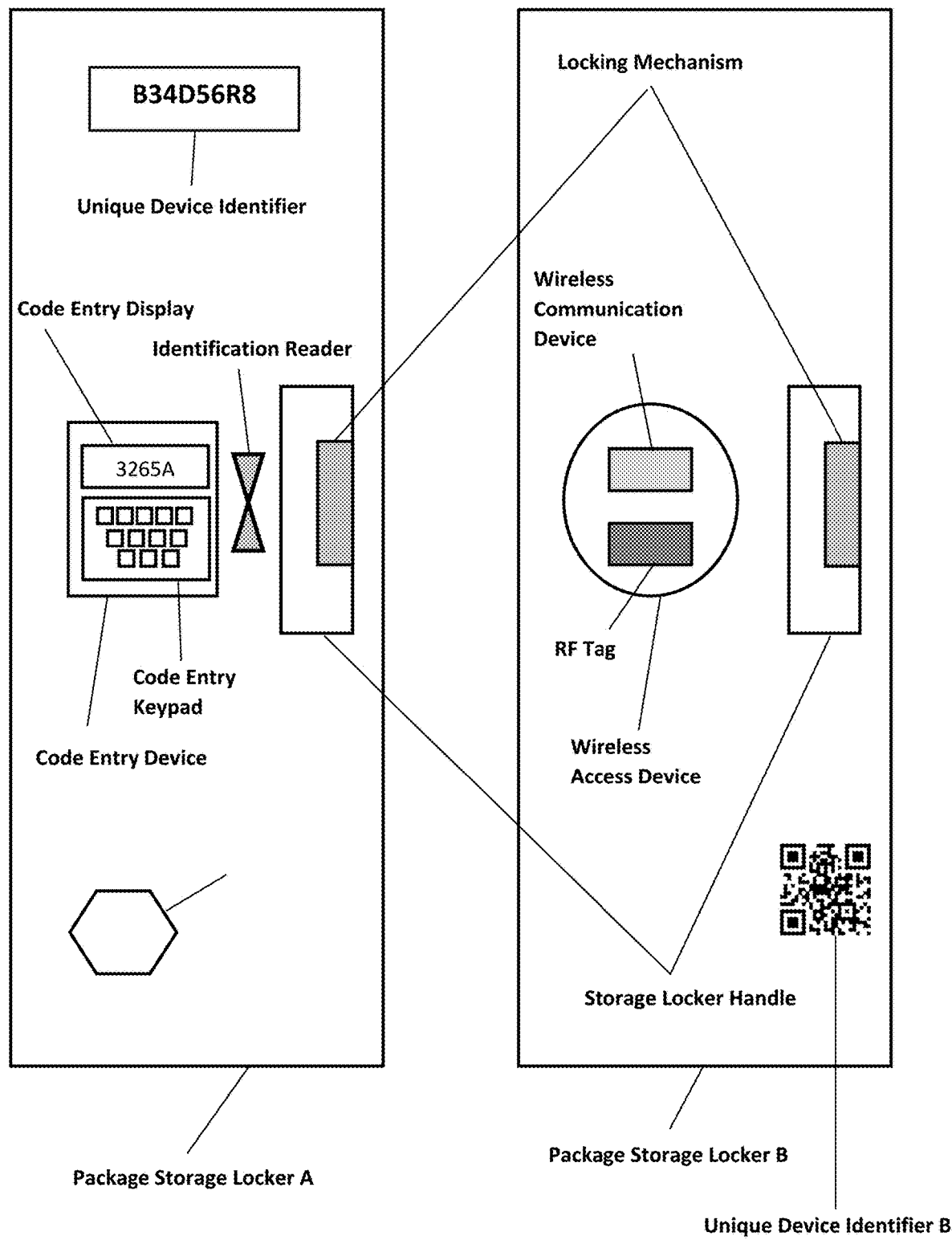
FIG. 6A graphically portrays examples of package storage lockers.

FIG. 6A is an example of package storage lockers. As shown, each of the package storage lockers include a device identifier unique to each package storage locker. For example, package storage locker A includes a device identifier comprised entirely of characters, while package storage locker B includes a device identifier represented by a barcode. Further, each device identifier may be disposed anywhere on each of package storage lockers. In addition, each package storage locker may include a locking mechanism which determines whether a storage locker handle can be activated to open the package storage locker for accessing contents inside. There may be one or more ways to cause the locking mechanism to open.

For example, in package storage locker A, the package storage locker may be opened by entering a correct unlock code in a code entry device. Such code entry device may, for example, include a code entry keypad to receive input of the unlock code. Further, the code entry device may also include a code entry display to display the input unlock code and to display an error message when an incorrect unlock code is input. In an exemplary embodiment, the package storage locker A may compare the input unlock code with an unlock code registered in a local storage device to determine whether the input lock code is correct.

In another example, the package storage locker B includes a wireless access device that includes a wireless communication device (e.g., for 802.11 or Bluetooth standards) and an RF tag that may include information regarding the package storage locker. In an exemplary embodiment, a customer may utilize his or her terminal to access the wireless communication device to send the unlock code. In another exemplary embodiment, the customer does not have to enter any unlock code. He or she may simply have the wireless communication device communicate with an application on his or her terminal.

It should be noted that the wireless access device is not restricted to communicating only with the terminal of the customer. The wireless access device may also communicated via the wireless communication device to a locker assignment device or a mail service controller to send the device identifier (or an unlock code) of the package storage locker upon request. Further, the RF tag may register the device identifier (or an unlock code) of the package storage locker. The device identifier (or unlock code) may be obtained by the RF tag using a barcode reader on a locker assignment device.

In another exemplary embodiment, package storage locker A may also include an identification reader to verify an identity of the customer who is going to try to open the package storage locker A for enhance security purposes. Such identification reader may perform verification (i.e. indicating whether the customer is recorded in a database of the mailcenter or has a package assigned to this locker) by identification card, retinal scanning, fingerprint scanning, voice recognition, body movement, etc. Once the identification reader successfully authenticates the customer, the customer is permitted access to the code entry device. In other words, if the customer does not allow him or herself to be verified (or is not successfully authenticated), the customer cannot enter anything on the code entry device. \

Figure 6B:
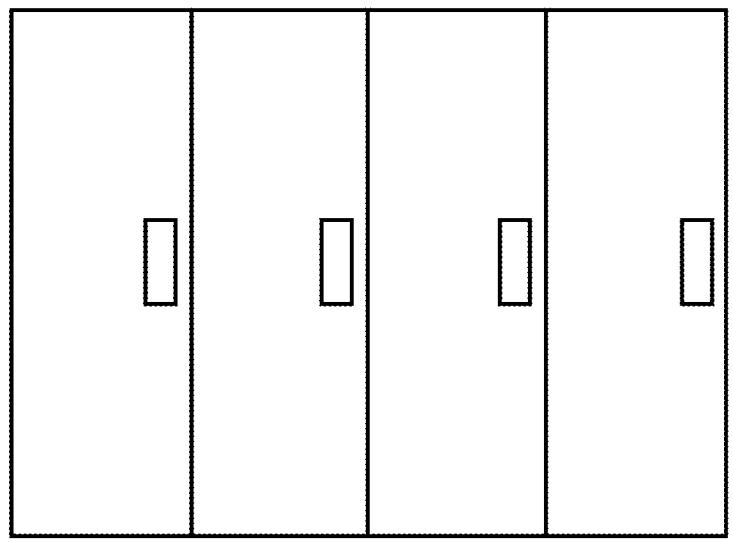
FIGS. 6B-6E show examples of a bank of package storage lockers.

FIG. 6B is an example of an arrangement of package storage lockers. In other words, there may be more than one package storage locker. Further, each package storage locker may be directly adjacent to each other (i.e. directly touching) to save space. In an exemplary embodiment, all of the package storage lockers are of the same shape and size. In another exemplary embodiment, the package storage lockers may have environmental changing devices (e.g., heater, cooler, etc.) located within.

Figure 6C:
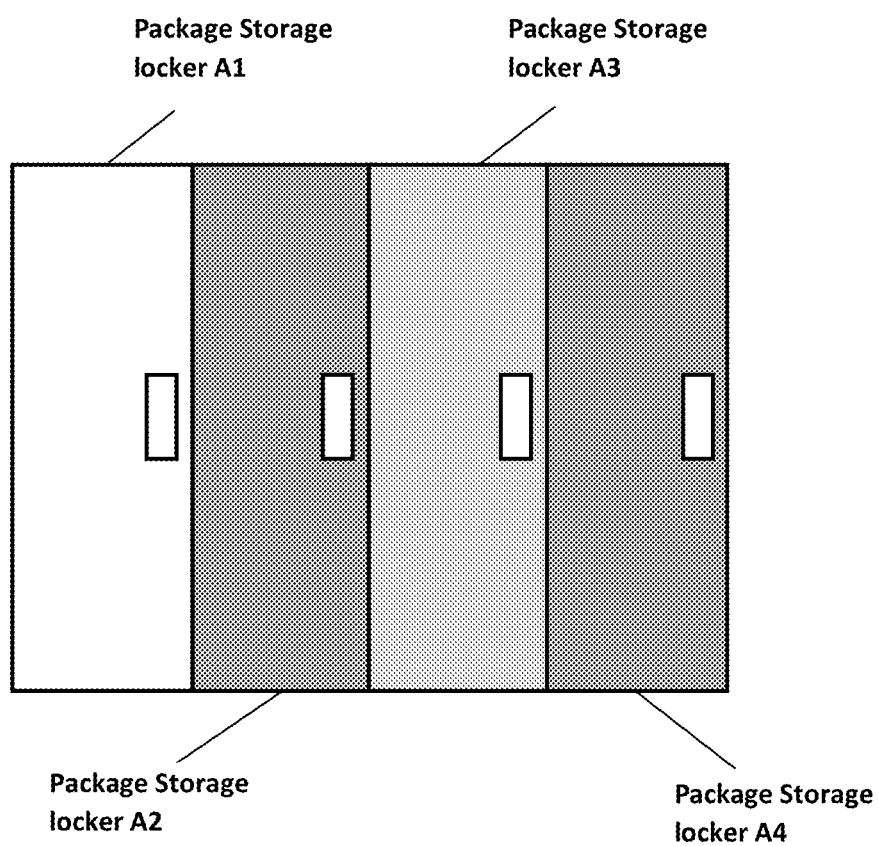

FIG. 6C is another example of an arrangement of package storage lockers. In this case, not all of the package storage lockers are of the same color. The colors may indicate a function of the package storage locker. For example, the color (white) on package storage locker A1 may indicate that this package storage locker is utilized for regular packages, the color (dark gray) for package storage locker A2 and A4 may indicated that these package storage lockers are for fragile packages, and the color (medium gray) for package storage locker A3 may indicate that this package storage locker is for perishable items (e.g., package storage locker A3 may include refrigeration).

Figure 6D:
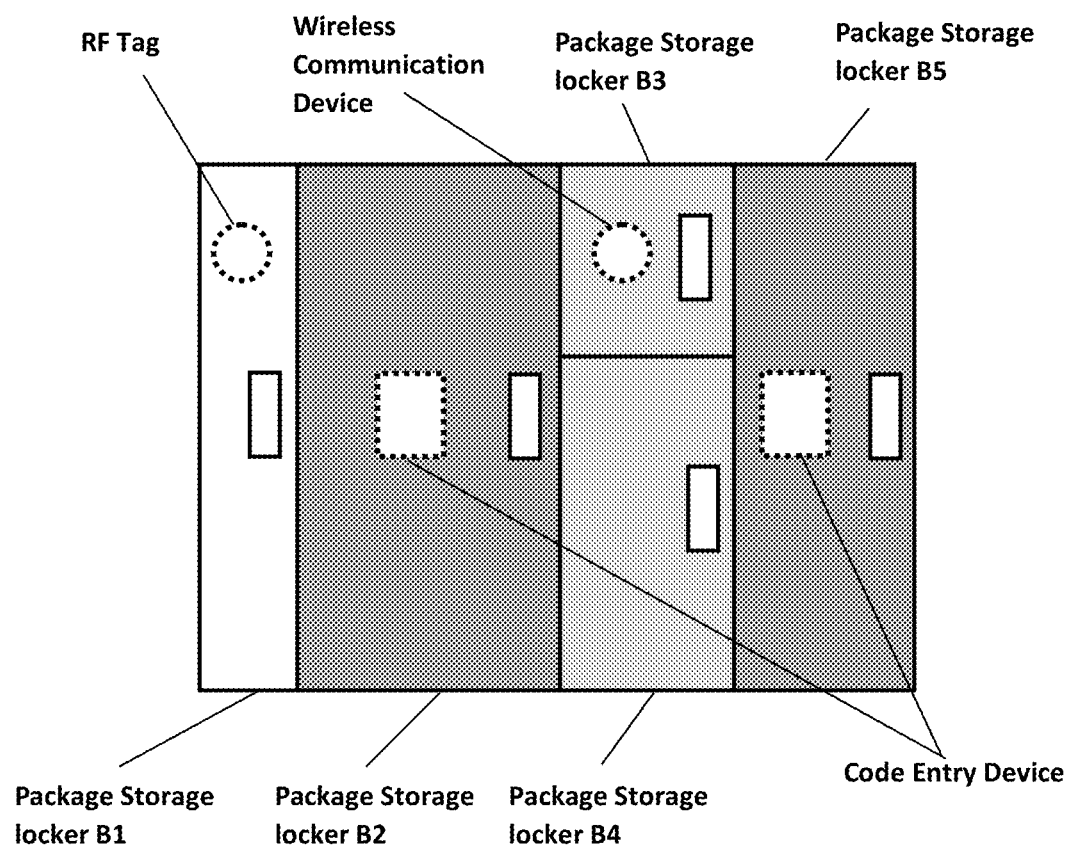

FIG. 6D is another example of an arrangement of package storage lockers. In this case, not all of the package storage lockers are of the same size or include the same devices. For example, some package storage lockers (e.g., B3, B4) may be smaller in size than other package storage lockers (e.g., B2, B5). This kind of arrangement may exist since not all packages are the same size. Thus, it may be inconvenient (and not inefficient in terms of using space) to have a small package be held in a large package storage locker. In addition, not all of the package storage lockers may include the same method for inputting unlock codes. For example, some package storage lockers (e.g., B2, B5) may include a code entry device for manual entering of the unlock code, while other package storage lockers may include a wireless communication device (e.g., B3) or an RF tag (e.g., B1). In exemplary embodiment, a package storage locker may not have either of the aforementioned devices or tags (e.g., B4).

Figure 6E:
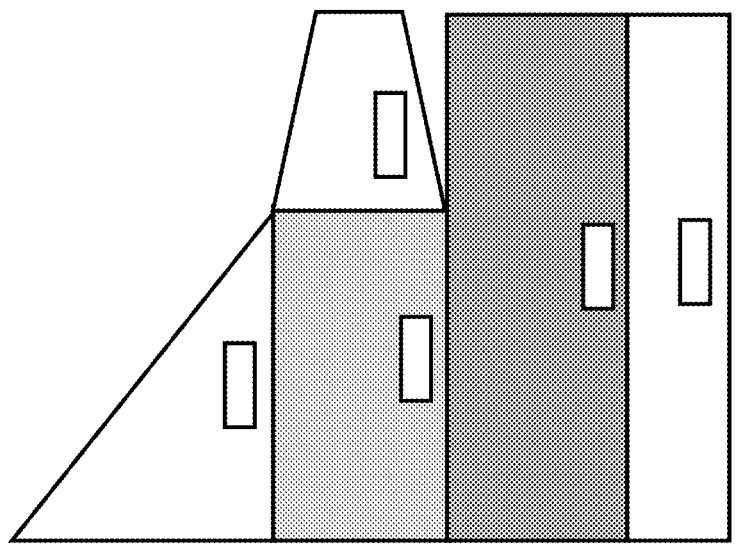

FIG. 6E is another example of an arrangement of package storage lockers. In this case, not all of the package storage lockers are of the same shape. For example, a good number of packages may be oddly shaped or have an uncommon shape. Such package storage lockers are created in a form which may be able to accommodate such packages when they appear.

Figure 7:
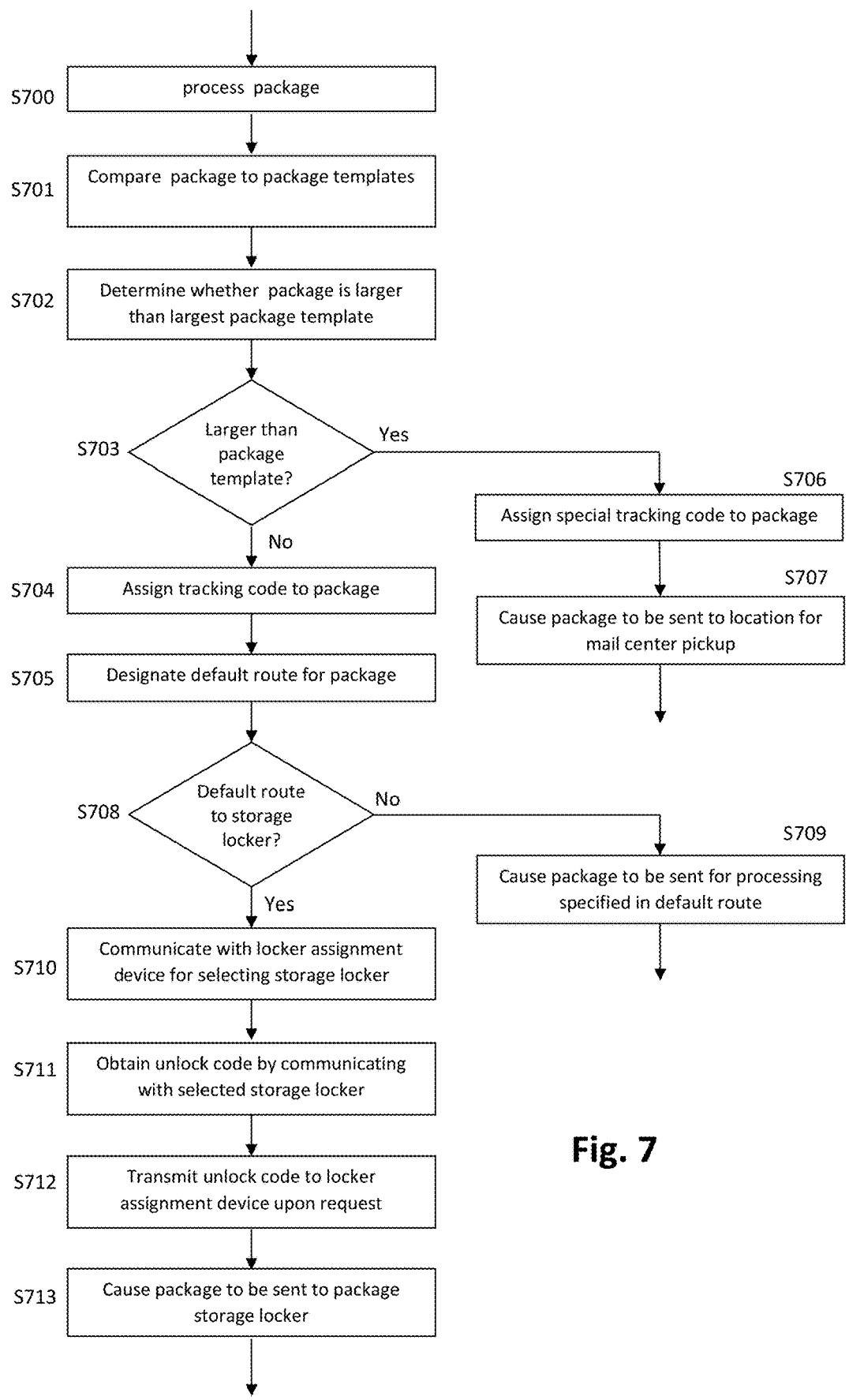
FIG. 7 shows a flow chart for a method that can be performed in any of the systems of FIGS. 1A-1C (or an equivalent)

FIG. 7 shows a method that can performed by a package processing workstation (e.g., 102 in FIG. 1A) according to an exemplary embodiment.

A mailcenter may include a package processing workstation which has functions to process mail received by the mailcenter. For example, mailcenter staff may utilize the package processing workstation to sort mail for further processing. When the package processing workstation receives a package (step S700) for processing, the package processing workstation compares the package to package templates to determine a size of the package (step S701). Such package templates may be in many forms. For example, the package templates may be one or more physical open top boxes whose physical features are approximately similar to of sizes of package storage lockers in the mailcenter. Thus, mailcenter staff may determine whether any of the package storage lockers can hold the package based by ascertaining whether any of the boxes can hold the package. In another example, the package templates may be package template markings on a wall of the mailcenter by which mailcenter staff can compare the package to such package template markings. Such markings may be labels that approximate an outline of the package holding portion (e.g., the part of the package storage lockers that accommodate the package) of the package storage lockers.

After performing the comparison, the package processing workstation determines whether the package is larger than the largest of the package templates. In other words, the package may be compared to each of the package storage templates until it has been determined which one of the package storage lockers (associated with the package storage templates) can hold the package. In an example, mailcenter staff may perform this task. In another example, the package processing workstation may perform the comparison by itself. However, it may be that by performing the comparison, it is discovered that none of the package storage lockers can hold the package since the package exceeds a size of the largest package template (representing a size of the largest package storage locker).

Thus, in a case that the package is larger in size than the largest package template (step S703, yes), a tracking code assigning device assigns a special tracking code to the package (step S706). In other words, since it has been determined that the package cannot be stored in any of the lockers, such package is sent to a location to be picked up. Further, the package is marked with the special tracking code which may (i) uniquely identify the package, (ii) associate the package with a customer who is to receive the package and (iii) indicate that such package is too large for any storage locker and is to be sent to a location in the mailcenter for pickup. After assigning the special tracking code, a route assignment device assigns a default route to the package. Such route, in this case, is mailcenter pickup. Next, the package processing workstation causes the package to be sent to mailcenter pickup location (step S707). In an exemplary embodiment, after mailcenter staff are aware that the default route is mailcenter pickup, the mailcenter staff may transport the package to a location designated for mailcenter pickup.

On the other hand, in the case that the size of the package is less than (or equal to) the size of the largest package template (step S703, no), the tracking code assigning device applies a tracking code to the package. Such tracking code may (i) uniquely identify the package and (ii) associate the package with a customer who is to receive the package. Next, the route assignment device assigns a default route for the package (step S705). Such default routes may include, but is not limited, to sending the package to a package storage locker, causing the package to be hand-delivered to the customer, forwarding the package to another location, destroying (and recycling) the package, etc. In the case that the default route is not to a package storage locker (step S708, no), the package processing workstation causes the package to be processed according to the default route assigned by the route assignment device (step S709).

On the other hand, in the case that the default route for the package is to a package storage locker (step S708, yes), the package processing workstation communicates with a locker assignment device to obtain selection of a package storage locker for the package. For example, the package processing workstation may communicate wirelessly (e.g., 802.11, Bluetooth, RF, etc.) with a wireless interface on the locker assignment device. In another example, the package processing workstation may send tracking code, customer information and metadata (e.g., physical features of the package, etc.) to the locker assignment device, so that the locker assignment device can determine an appropriate package storage locker for the package. In yet another example, an appropriate package storage locker may be a package storage locker that can hold the package storage locker with a maximum space in the package storage locker being used. In an exemplary embodiment, the mail staff may, via the locker assignment device, select a package storage locker which causes (i) the selected package storage locker to unlock (and open) and (ii) a device identifier corresponding to the selected package storage locker to the mail service controller.

Next, after receiving the assigned package storage locker, the package processing workstation communicates with the assigned package storage locker to obtain an unlock code of the package storage locker (step S711). For example, the locker assignment device may send the package processing workstation, a device identifier of the selected package storage locker. Such device identifier may uniquely identify the package storage locker. In another example, each package storage locker in the mailcenter may include a locking mechanism. To open the package storage locker under lock by the locking mechanism, an unlock code may be required. Afterwards, the package processing workstation sends the unlock code to the locker assignment device upon request (step S712). Then, the package processing workstation causes the package to be sent to the assigned package storage locker (step S713).

In an exemplary embodiment, after mail staff are aware that the default route is for the package storage lockers, the mail staff may transport the package to a location corresponding to the tracking code marked on the package. For example, the mail staff may utilize a locker assignment device to determine a device identifier associated with the tracking code. From the device identifier, the mail staff may determine the package storage locker location designated for the package. In another example, the mail staff may use the locker assignment device to translate the device identifier into a form that is recognizable for the mail staff to determine the physical location of the package storage locker. After locating the package storage locker, the mail staff places the package into the package storage locker (which has an open door whenever the package storage locker is empty), and closes the door to lock the package storage locker until a customer unlocks the package storage locker with an unlock code. In an exemplary embodiment, the package storage locker sends a message to the mail service controller informing that a package has been successfully placed in the package storage locker.

Figure 8:
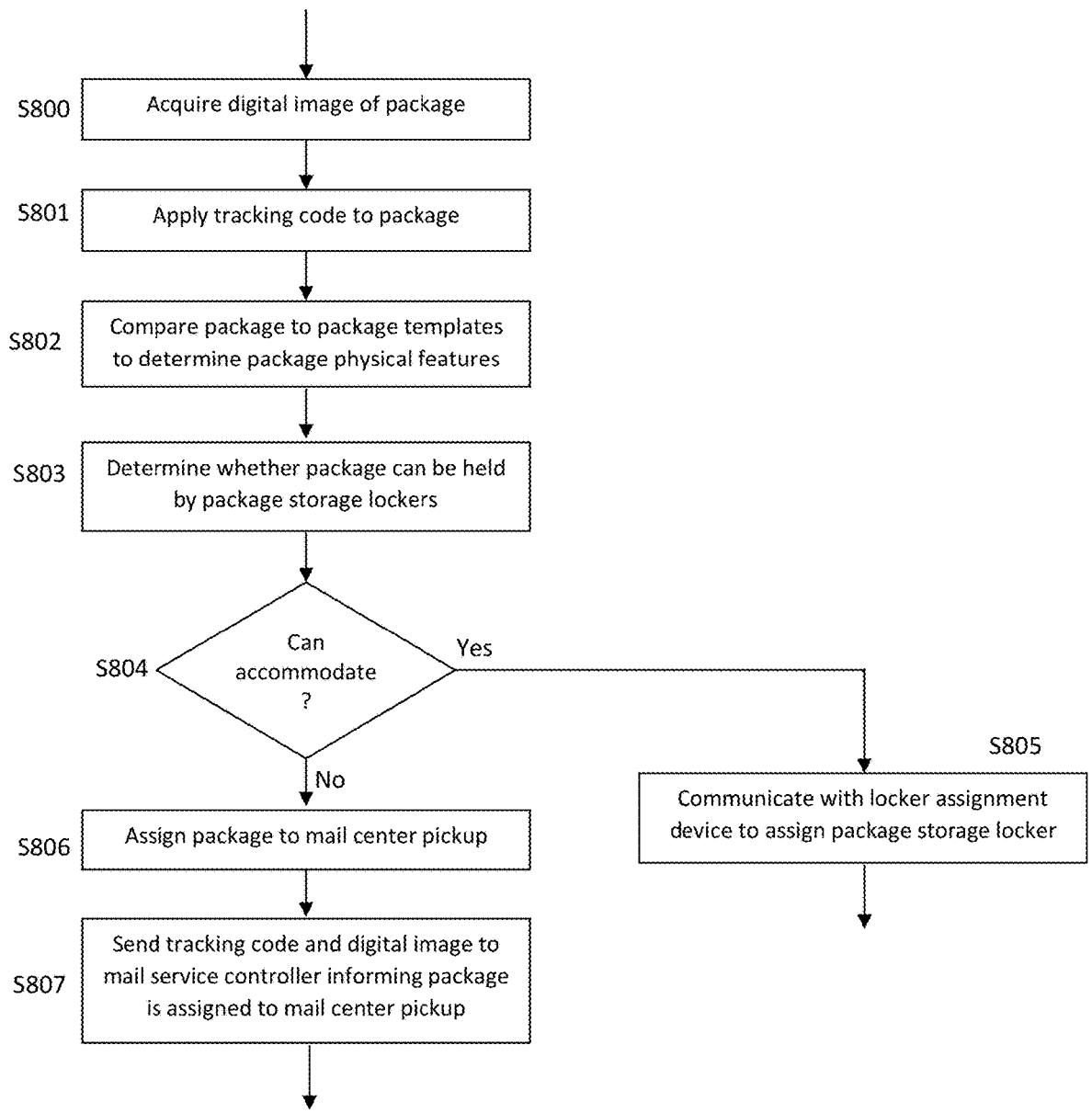
FIG. 8 shows a flow chart for a method that can be performed in any of the systems of FIGS. 1A-1C (or an equivalent)

FIG. 8 shows a method that can performed by a package processing workstation (e.g., 102 in FIG. 1A) according to an exemplary embodiment.

After receiving a package to be processed, an image capture device of the package processing workstation captures an image of the package to output as a digital image (step S800). Such digital image may include an address-bearing face of the package. Next, a tracking code assigning device of the package processing workstation applies a tracking code onto the package (step S801). Then, the package processing workstation compares the package to one or more package templates to determine physical features (e.g., size, shape, etc.) of the package (step S802). Next, the package processing workstation determines whether the package can be held by the package storage lockers (step S803). In the case that the package storage lockers can accommodate the package (step S804, yes), the package processing workstation communicates with the locker assignment device to obtain a specific package storage locker for containing the package (step S805). On the other hand, in the case that none of the package storage lockers can accommodate the package (step S804, no), a route assignment device of the package processing workstation assigns the package to mailcenter pickup (i.e. the package is to be picked up by the customer) as a default route (step S806). Afterwards, the package processing workstation sends the tracking code and the digital image to a mail service controller informing the mail service controller that there is a package assigned to mailcenter pickup (step S807).

Figure 9:
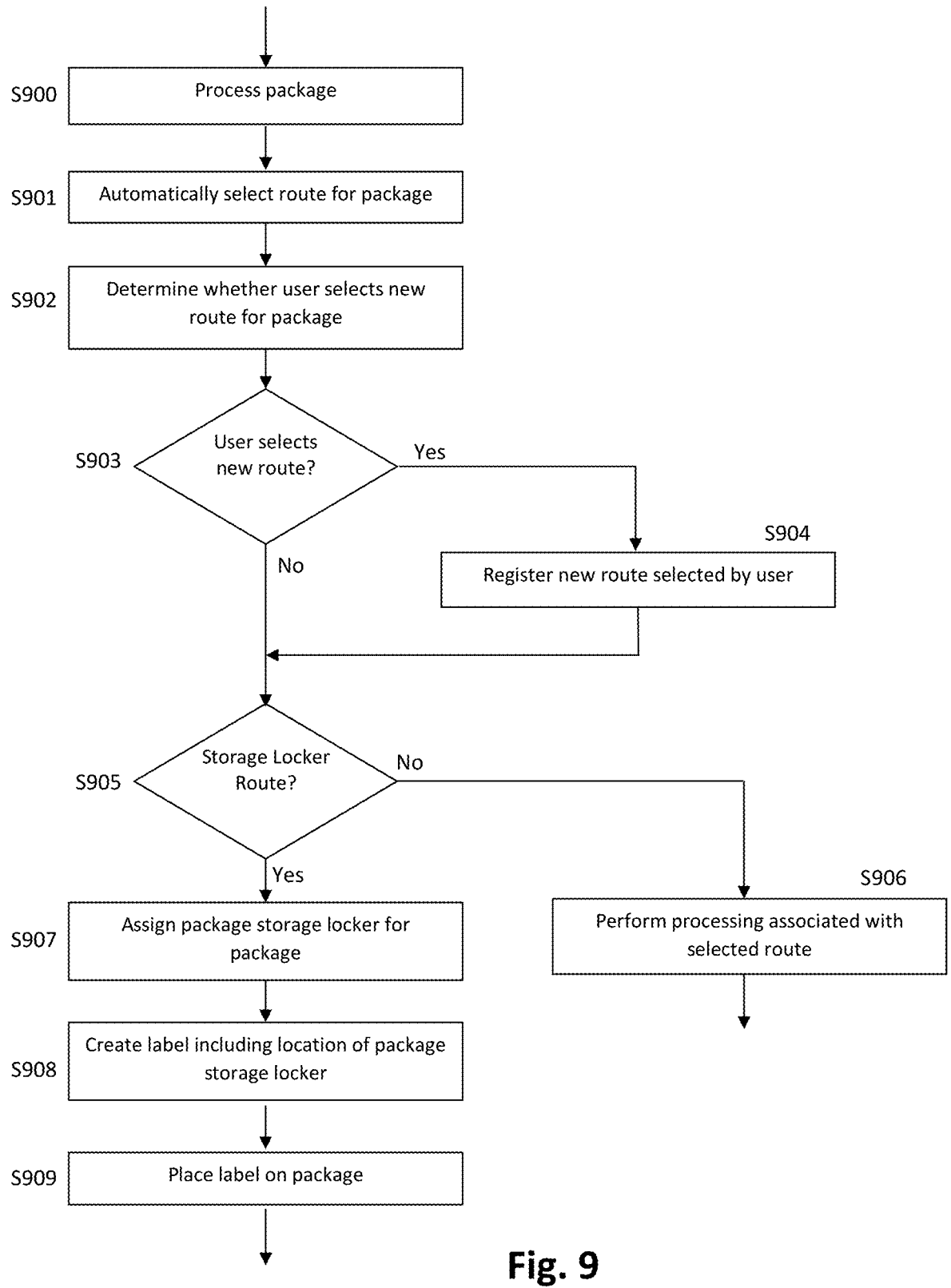
FIG. 9 shows a flow chart for a method that can be performed in any of the systems of FIGS. 1A-1C (or an equivalent)

FIG. 9 shows a method that can performed by and/or at a package processing workstation (e.g., 102 in FIG. 1A) according to an exemplary embodiment.

Figure 10A:
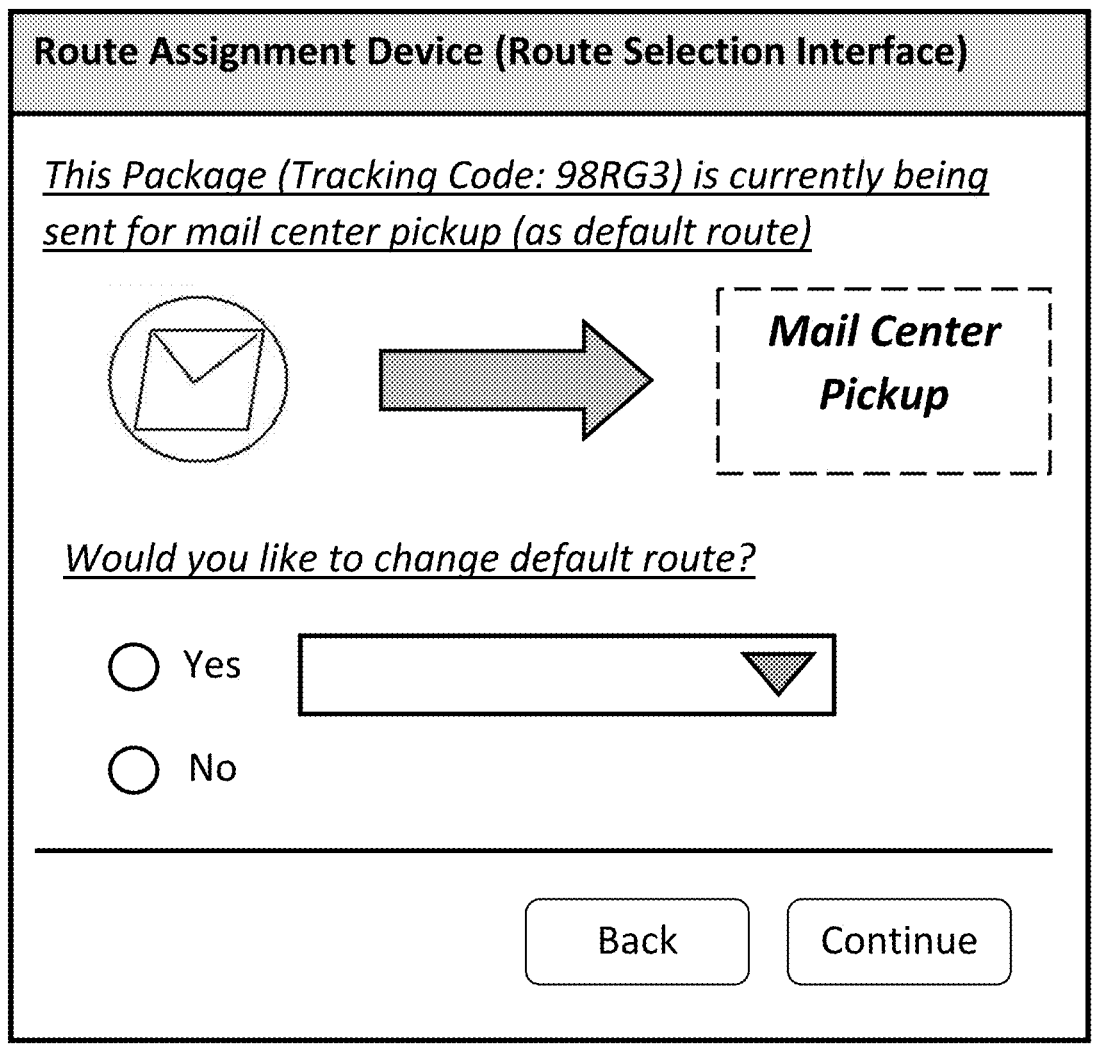
FIGS. 10A-10B show examples of interactions between a user and a locker assignment device, in any of the systems of FIGS. 1A-1C (or an equivalent)
Figure 10B:
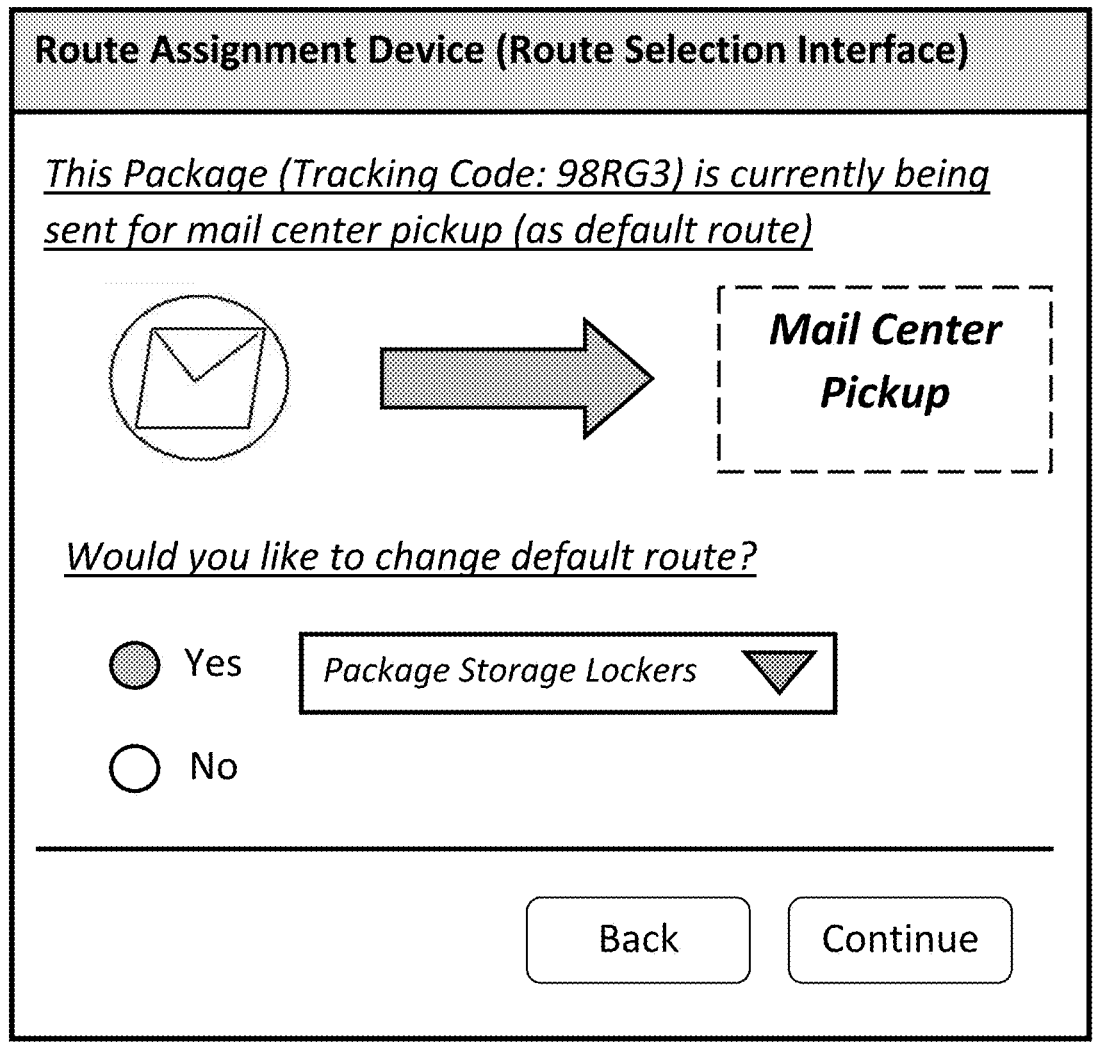

When the package processing workstation receives a package, the package processing workstation proceeds to process it (step S900), and may automatically select a default route for the package (step S901). However, the package processing workstation may include a route selection user interface (e.g., 102b-1) by which a user (e.g., mailcenter staff) may be informed of the default route for the package, such as shown in FIG. 10A. Further, the user may also be permitted via the route selection user interface of the package processing workstation to change the route to override the default route automatically set by the package processing workstation. For example, the use may select the radio button corresponding to "Yes" and activate a drop-down menu by activing the upside-down triangle button to select a particular route (e.g., sending the package to a package storage locker, causing the package to be hand-delivered to the customer, forwarding the package to another location, destroying (and recycling) the package, etc.). Thus, in the case that the user selects a route that is different from the one automatically assigned from the package processing workstation (step S903, yes), the package processing workstation registers the new route selected by the user (step S904). In the example shown in FIG. 10B, the user has selected to change the route from "sending to mailcenter pickup" to "send to package storage lockers".

On the other hand, in the case that the user does not select a different route from the default route automatically assigned by the package processing workstation (step S903, no), the package processing workstation determines whether the route is to send the package to the package storage lockers (step S905). In the case that the package is assigned a route that is not to the package storage lockers (step S905, no), the package processing workstation causes the package to be processed according to the selected route (step S906). However, in the case that the route is to the package storage lockers (step S905, yes), the package processing workstation assigns a specific package storage locker to the package (step S907). Further, the package processing workstation may create, via a label printer, a label that includes a location of the specific package storage locker that is assigned to the package (step S908). Such label may be a type of sticker that includes markings to identify the package storage locker location. Afterwards, the package processing workstation places the label onto the package (step S909).

Figure 11:
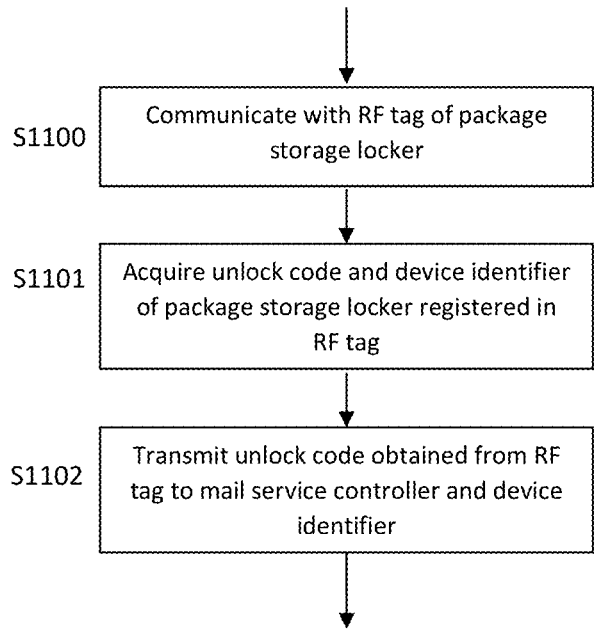
FIG. 11 shows a flow chart for a method that can be performed in any of the systems of FIGS. 1A-1C (or an equivalent)

FIG. 11 shows a method that can performed by a locker assignment device (e.g., 103 in FIG. 1A) according to an exemplary embodiment.

Each of the package storage lockers may include a radio frequency (RF) tag on (or in) the package storage locker that registers (i) an unlock code corresponding the package storage lockers and (ii) a device identifier to identify the package storage lockers. Further, a device identifier reader (e.g., 103a) of the locker assignment device may include an RF tag reader to communicate with RF tags. When the device reader communicates with the RF tag on the package storage locker (step S1100), the device reader obtains the unlock code and the device identifier belonging to the package storage locker that is registered in the RF tag (step S1101). Next, the locker assignment device communicates with a mail service controller, to send the unlock code to be registered by the mail service controller (step S1102).

Figure 12:
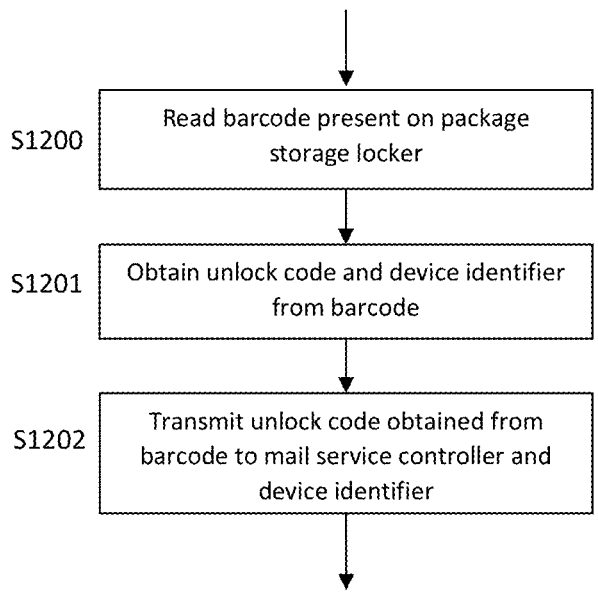
FIG. 12 shows a flow chart for a method that can be performed in any of the systems of FIGS. 1A-1C (or an equivalent)

FIG. 12 shows a method that can performed by a locker assignment device (e.g., 103 in FIG. 1A) according to an exemplary embodiment.

Each of the package storage lockers may include a barcode on (or in) the package storage locker that registers (i) an unlock code corresponding the package storage lockers and (ii) a device identifier to identify the package storage lockers. Further, a device reader (e.g., 103a) of the locker assignment device may include a barcode reader to obtain information from barcodes. When the device reader reads the barcode on the package storage locker (step S1200), the device reader obtains the unlock code and the device identifier belonging to the package storage locker that is registered in the barcode (step S1201). Next, the locker assignment device communicates with a mail service controller, to send the unlock code and the device identifier to be registered by the mail service controller (step S1202). In an exemplary embodiment, the barcode reader of the locker assignment device reads the tracking barcode from the label on the package for locker pickup when the package for locker pickup is at the package storage lock.

Figure 13:
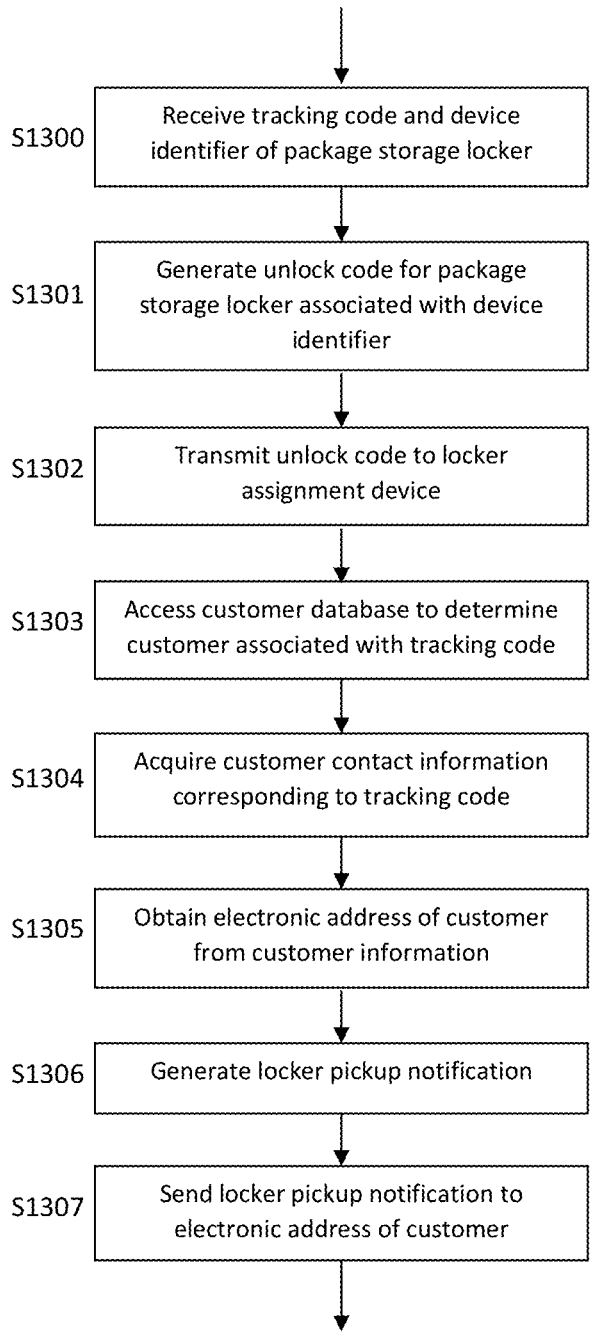
FIG. 13 shows a flow chart for a method that can be performed in any of the systems of FIGS. 1A-1C (or an equivalent)

FIG. 13 shows a method that can performed by a mail service controller (e.g., 104 in FIG. 1A) according to an exemplary embodiment.

When a mail service controller receives a tracking code of a package and a device identifier of a particular package storage locker (step S1300), the mail service controller generates an unlock code that is associated with the particular package storage locker (step S1301). For example, the unlock code for each package storage locker may not be the same one permanently. In other words, at one point in time, a package storage locker may have unlock code "A", while at another point in time the package storage locker may have another unlock code "B". Such change in unlock codes may provide better security since knowing an unlock code does not a grant someone permanent access to the package storage locker. In another example, the mail service controller generates an unlock code every time a new package is stored in the package storage locker.

After generating the unlock code, the mail service controller transmits wirelessly the unlock code to a locker assignment device (step S1302). Next, the mail service controller accesses a customer database (e.g., 105) to determine a customer who is associated with the tracking code. Afterwards, the mail service controller obtains customer contact information (e.g., name, physical address, electronic address, phone number, etc.) from the customer database (step S1303). From the customer contact information the mail service controller extract an electronic address of the customer. Then, the mail service controller generates a locker pickup notification which indicates that there is a package at the mailcenter for the customer to retrieve (step S1306). Then, the mail service controller sends the generated locker pickup notification to the electronic address associated with the customer (step S1307).

Figure 14:
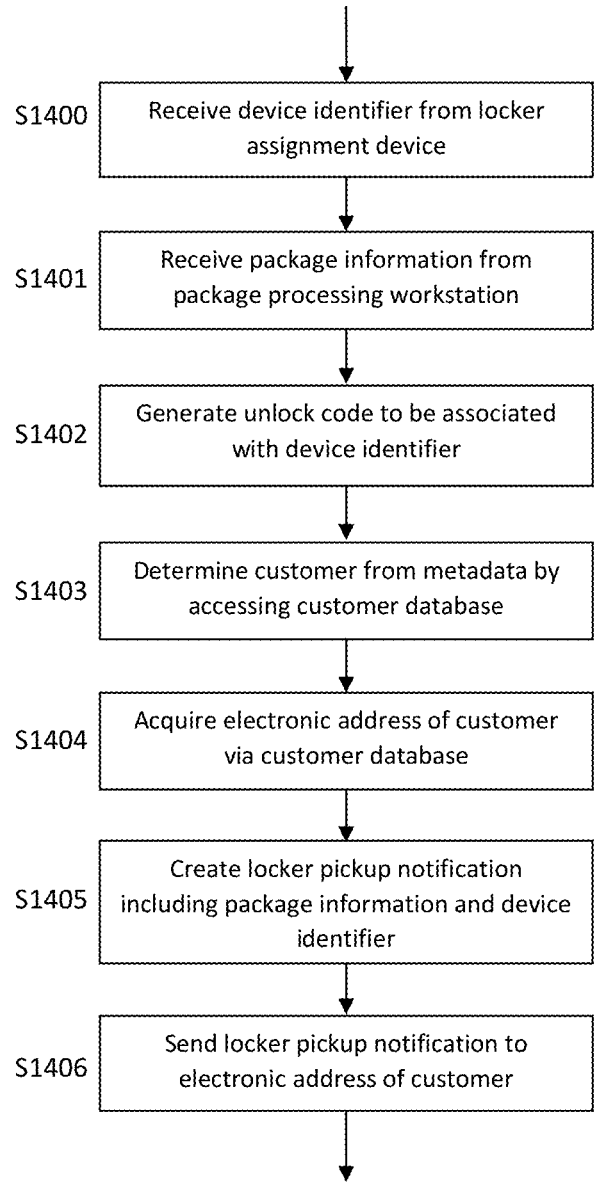
FIG. 14 shows a flow chart for a method that can be performed in any of the systems of FIGS. 1A-1C (or an equivalent)

FIG. 14 shows a method that can performed by a mail service controller (e.g., 104 in FIG. 1A) according to an exemplary embodiment.

The mail service controller may receive a device identifier corresponding to a specific package storage locker from a locker assignment device (step S1400). In addition, the mail service controller may also receive package information associated with a package from a package processing workstation (step S1401). Such package information may include, for example, a tracking code assigned to the package and metadata (e.g., sender/addressee information, time of arrival, size, color, digital image (including address-bearing face) of the package, etc.) associated with the package. Next, the mail service controller may generate an unlock code for the package storage locker corresponding to the device identifier received from the locker assignment device (step S1402). Then, the mail service controller uses the received metadata to determine a customer who is to receive the package from a customer database (step S1403). For example, the mail service controller may extract customer information from the customer database by trying to find a match using the addressee information. It should be noted that the mail service controller may utilize both name and physical address in the addressee information when accessing the customer database since there may be more than one customer with a same name.

After determining the customer who is to receive the package, the mail service controller acquires an electronic address (e.g., email address, etc.) of the customer registered in the customer information obtained from the customer database (step S1404). Next, the mail service controller creates a locker pickup notification notifying the customer that a package has arrived for him or her. In addition, the locker pickup notification includes the package information previously received by the mail service controller and the device identifier corresponding to the package storage locker that the package is being held in (step S1405). Afterwards, the mail service controller sends the locker pickup notification to the electronic address (step S1406).

Figure 15A:
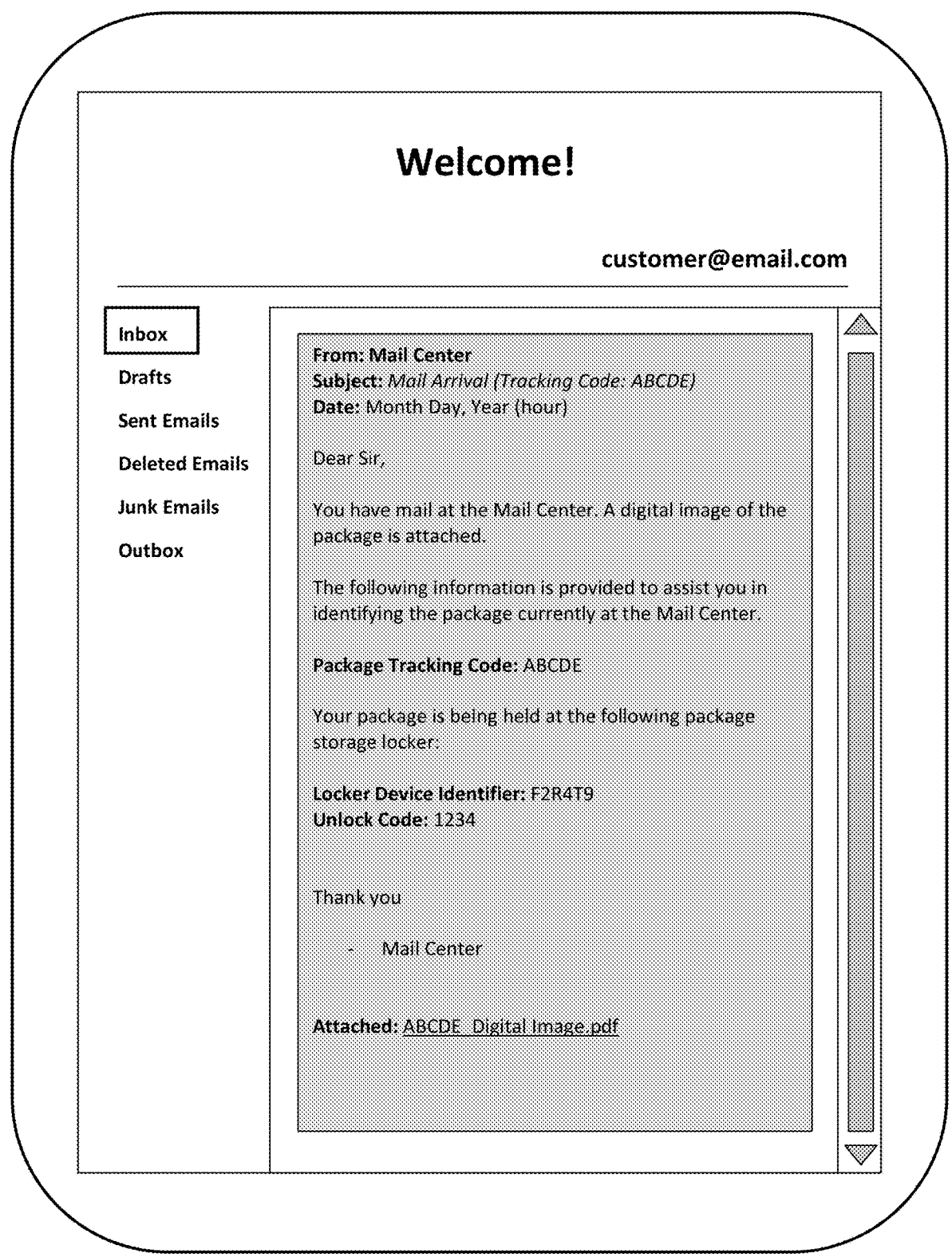
FIGS. 15A-15B show examples of electronic notifications that can be sent, in any of the systems of FIGS. 1A-1C (or an equivalent)
Figure 15B:
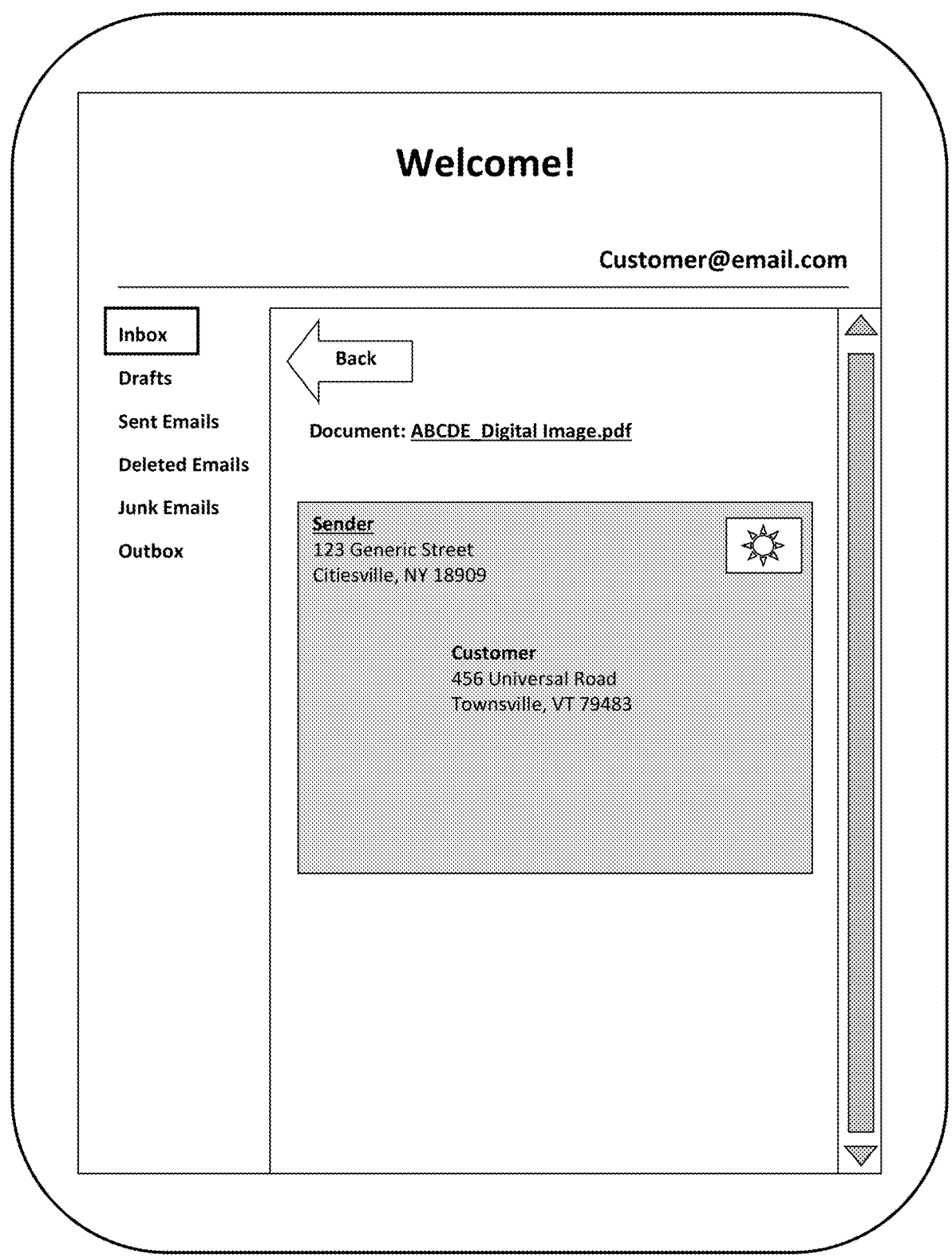

An example of the locker pickup notification is illustrated in FIG. 15A. As shown, the locker pickup notification may be in the form of an email sent to the customer. Such email may include one or more content associated with the package information such as, but not limited to, tracking code of the package, device identifier of the package storage locker holding the package, the unlock code to access contents (e.g., package, etc.) inside the package storage locker, etc. Further, the notification may also include a digital image corresponding to the mail item attached as a document (e.g., pdf, GIF, png, etc.) that can be viewed, such as shown in FIG. 15B. Such image shows who sent the mail item, and consequently the mail service customer may have a better determination of what kind of action is to be taken (e.g., destroy package, receive package, forward package to another address, etc.).

Figure 16:
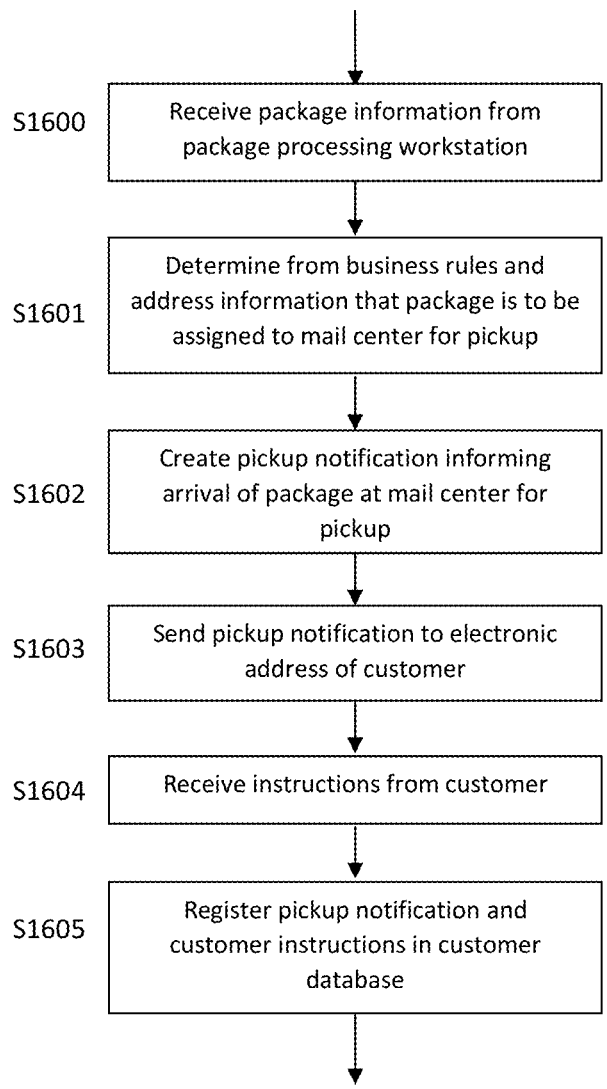
FIG. 16 shows a flow chart for a method that can be performed in any of the systems of FIGS. 1A-1C (or an equivalent)

FIG. 16 shows a method that can performed by a mail service controller (e.g., 104 in FIG. 1A) according to an exemplary embodiment.

The mail service controller may receive package information associated with a package from a package processing workstation (step S1600). Such package information may include, for example, a tracking code assigned to the package and metadata (e.g., sender/addressee information, time of arrival, size, color, digital image (including address-bearing face) of the package, etc.) associated with the package. Next, the mail service controller determines from business rules (or a combination of business rules) and the address information (i.e. sender/addressee information) that the package is to be assigned to mailcenter pickup (step S1601).

Business rules may include assigning the package to mail center pickup when determining from a digital image of the package information that contents of the package are fragile (e.g., glass, ceramic, etc.), chemical (e.g., sodium, mercury, etc.), unwieldy (e.g., too large, odd shape, etc.), etc. Further, the business rules may also include assigning the package to mail center pickup when determining from a digital image of the package information that the sender is a particular type of company (e.g., Chemical Company A, Glassworks Corporation, etc.) doing business in a particular type of industry (e.g., glass-making, creating chemicals, etc.). Such business rules may be present because one or more packages may not be suitable for package storage lockers. The content of the packages may (i) be too dangerous (e.g., sodium, nitrogen, etc.) to be placed in the package storage locker for a long time or (ii) may suffer irreparable damage from being handled improperly (e.g., glass ornaments, etc.).

Figure 17A:
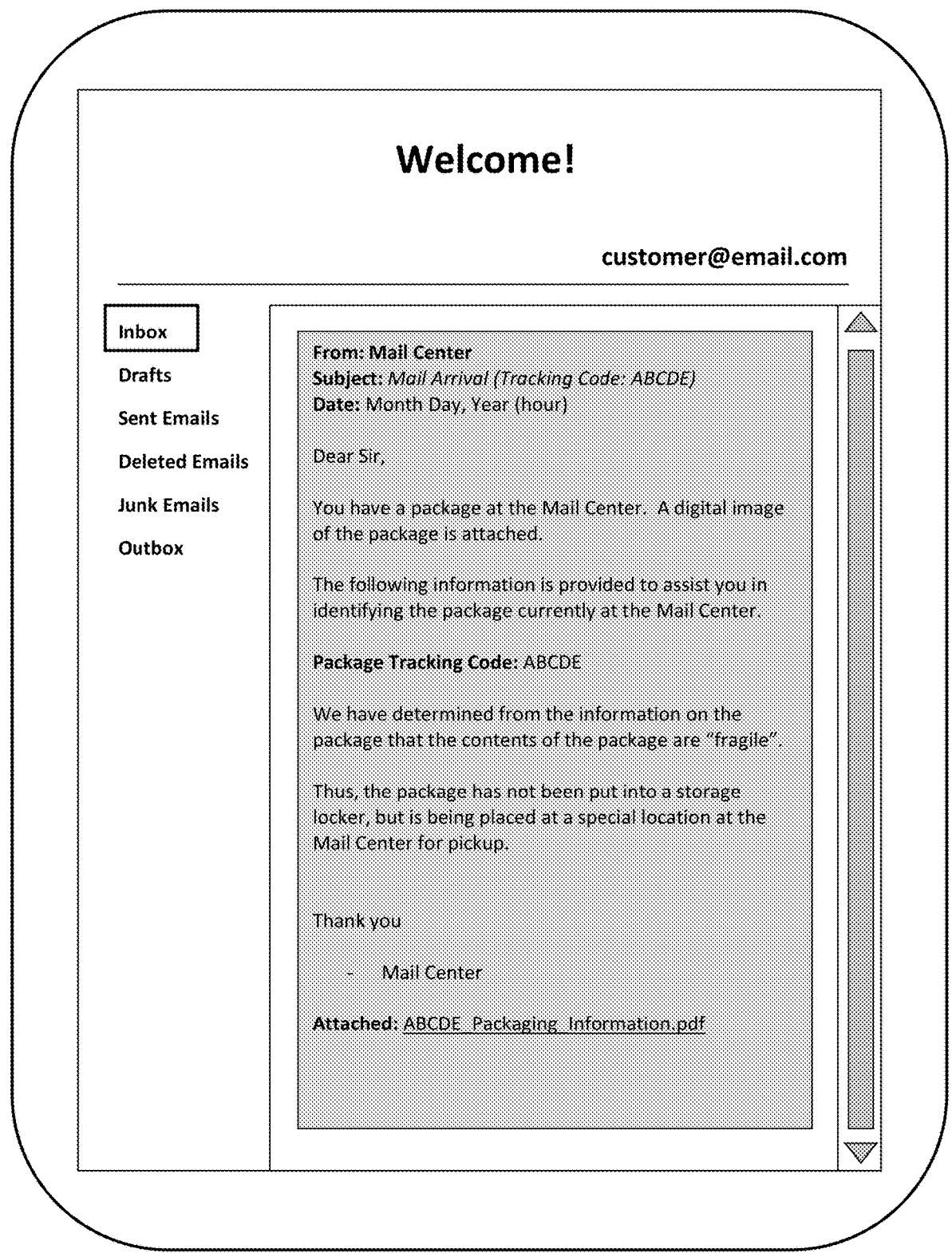
FIGS. 17A-17D show examples of electronic notifications that can be sent, in any of the systems of FIGS. 1A-1C (or an equivalent)
Figure 17B:
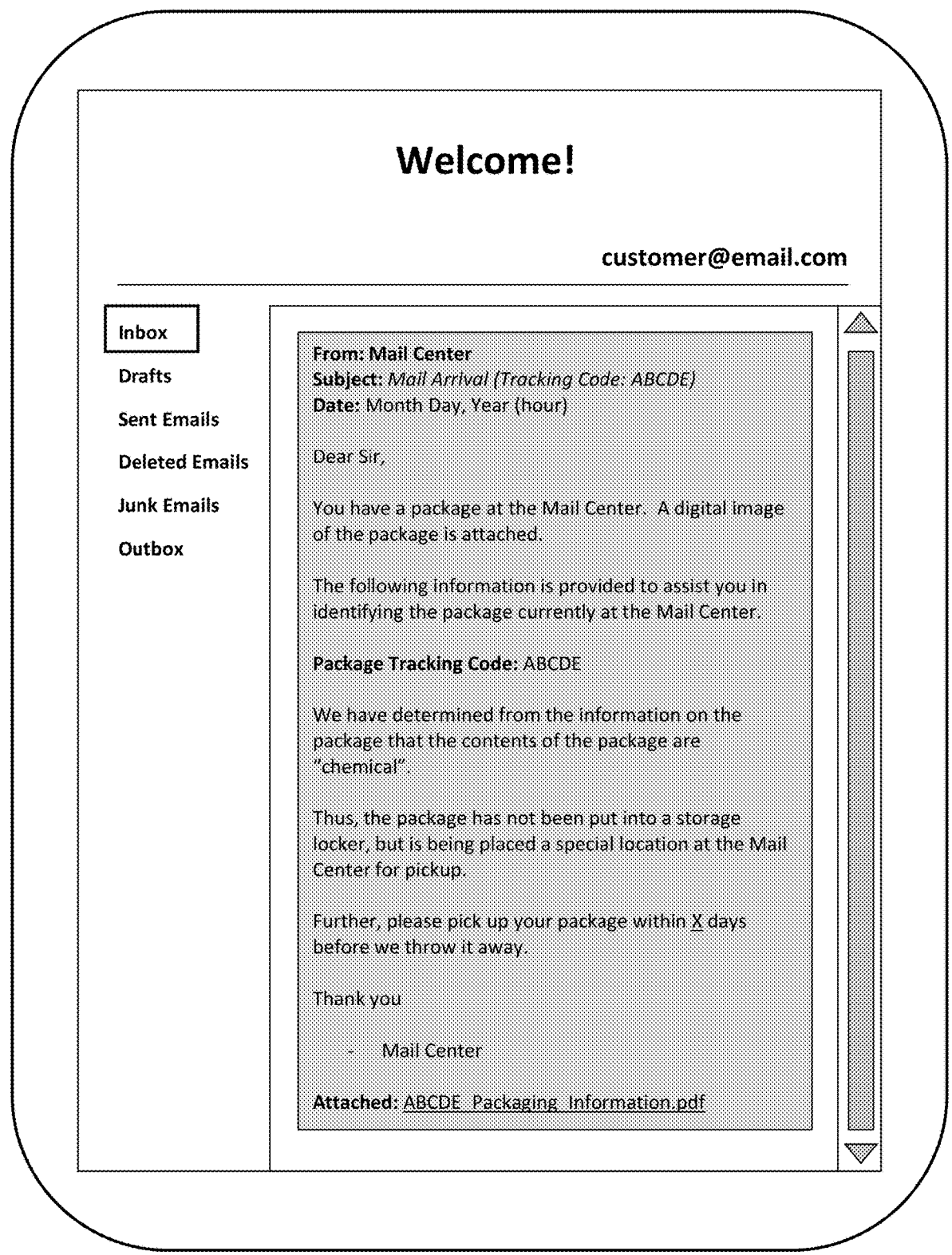
Figure 17C:
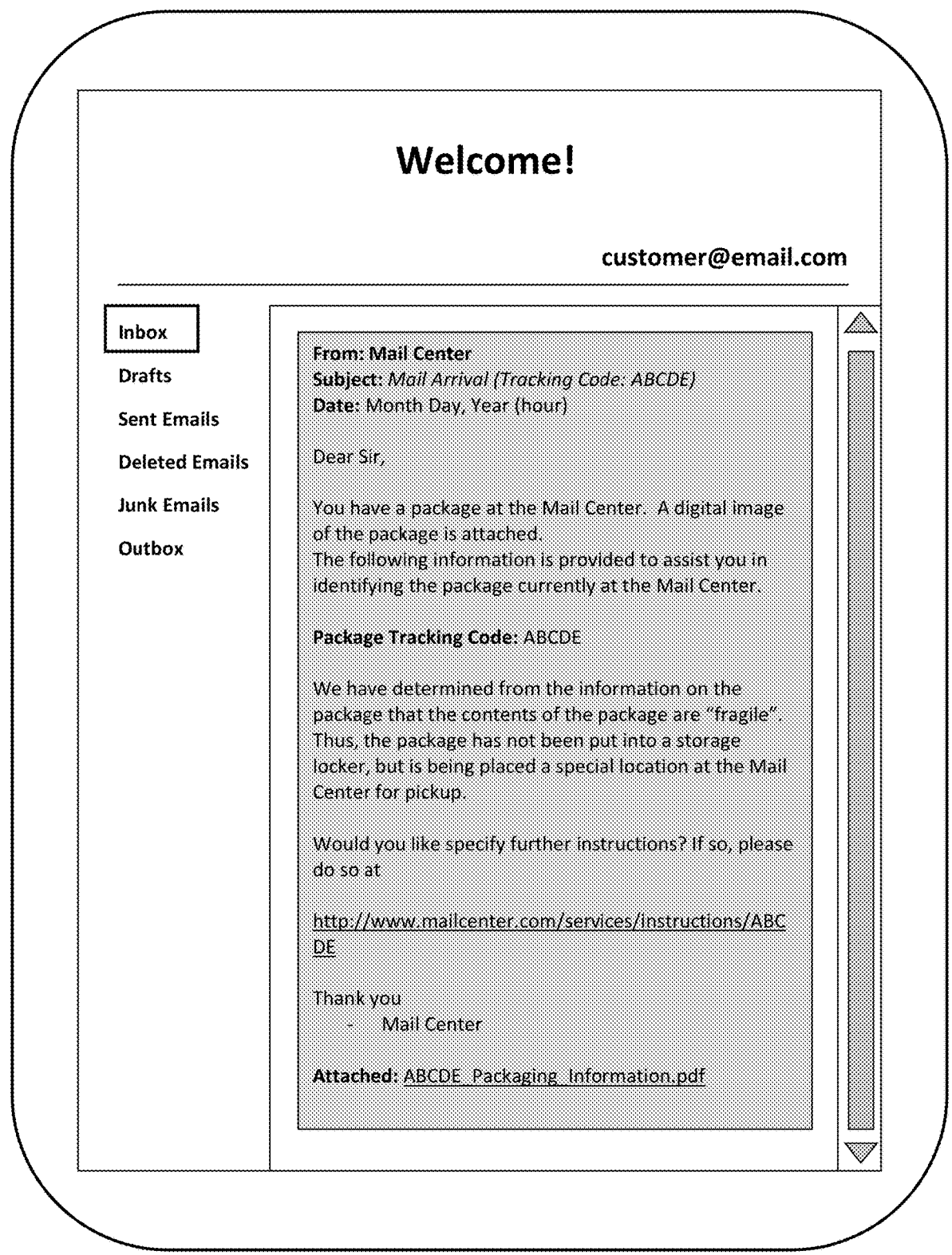
Figure 17D:
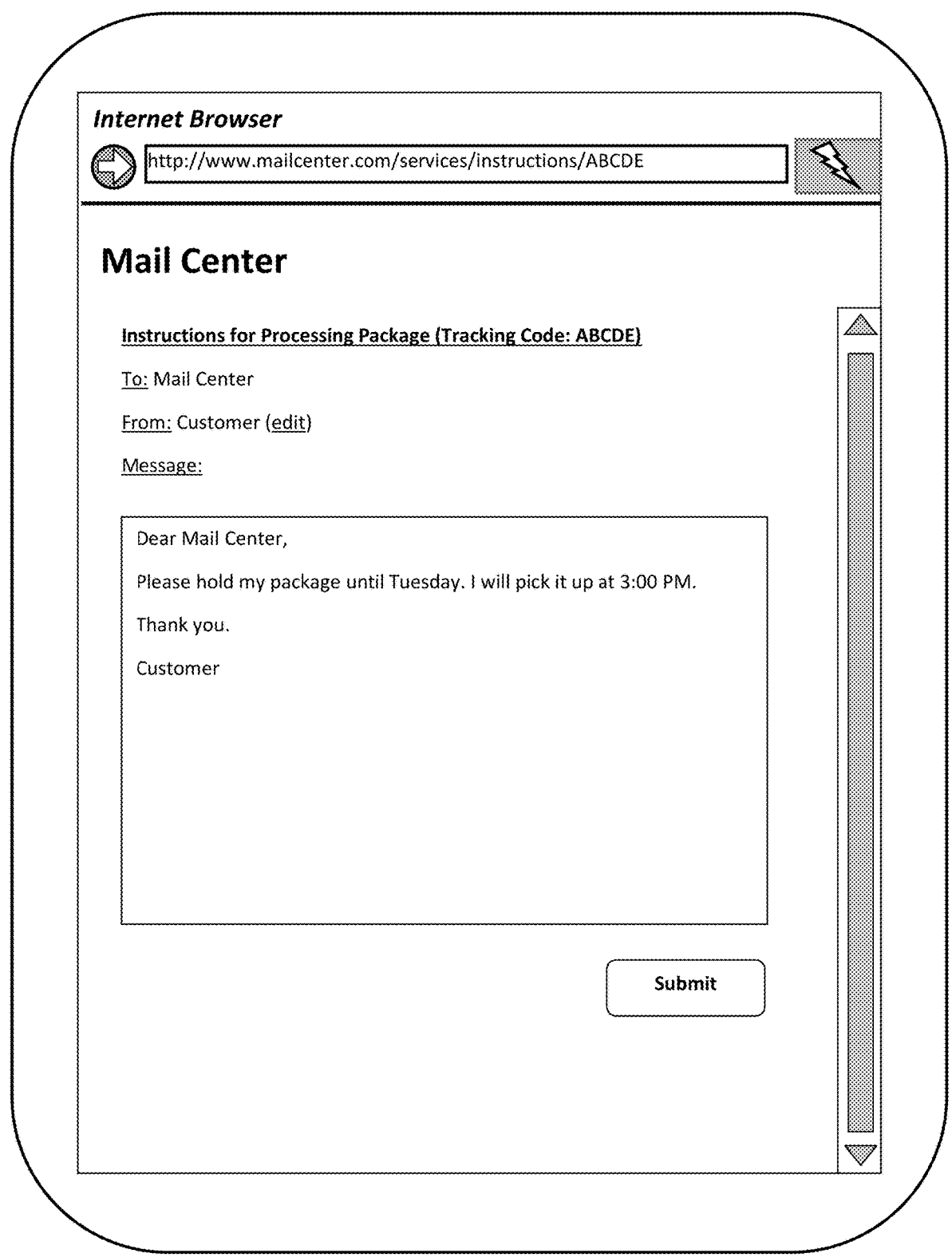

Next, the mail service controller creates a pickup notification that informs a customer who is to receive the package that there is a package for the customer at the mailcenter for pickup (step S1602). Then the mail service controller sends such pickup notification to an electronic address corresponding to the customer (step S1603). An example of a pickup notification received by the customer is illustrated in FIG. 17A. In such example, the pickup notification informs the customer that there is a package to be picked-up at the mailcenter. Further, the customer is informed why the package is not sent to a package storage locker. In another exemplary embodiment, the customer may be given a pre-determined amount of time to pick up the package before mailcenter staff throw it away, such as shown in FIG. 17B. In yet another exemplary embodiment, the pickup notification may include a link to a notification page, such as shown in FIG. 17C. Such notification page allows the customer to specify further disposition instructions, such as shown in FIG. 17D. After the customer has sent disposition instructions to the mail service controller (step S1604), the mail service controller registers both the pickup notification sent to the customer and the instructions received from the customer, in a customer database (step S1605).

Figure 18:
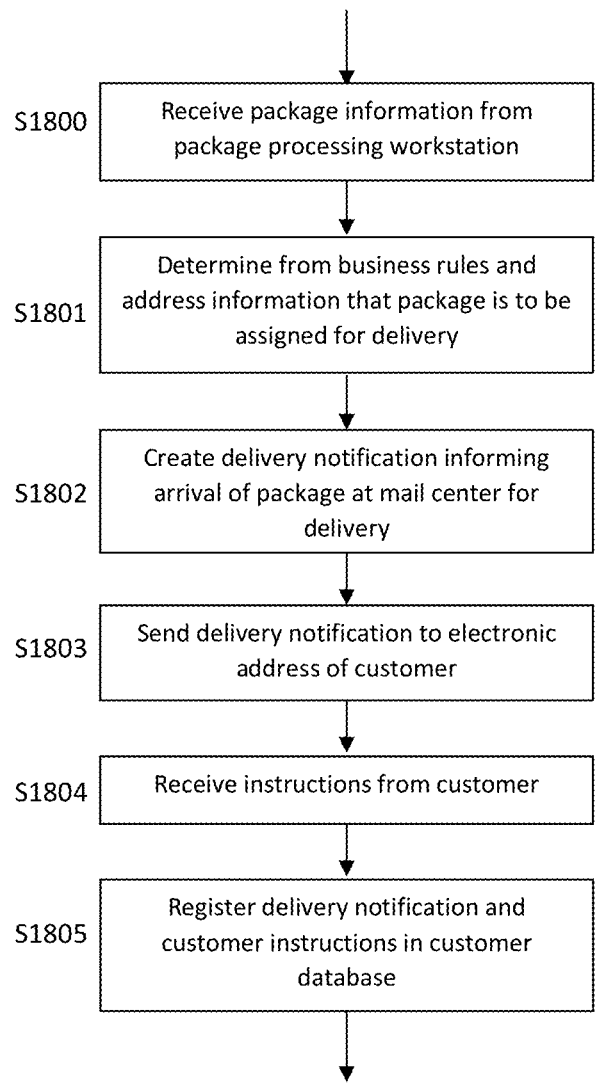
FIG. 18 shows a flow chart for a method that can be performed in any of the systems of FIGS. 1A-1C (or an equivalent)

FIG. 18 shows a method that can performed by a mail service controller (e.g., 104 in FIG. 1A) according to an exemplary embodiment.

The mail service controller may receive package information associated with a package from a package processing workstation (step S1800). Such package information may include, for example, a tracking code assigned to the package and metadata (e.g., sender/addressee information, time of arrival, size, color, digital image (including address-bearing face) of the package, etc.) associated with the package. Next, the mail service controller determines from business rules (or a combination of business rules) and the address information (i.e. sender/addressee information) that the package is to be sent for delivery (step S1801).

Business rules may include sending the package for delivery when determining from a digital image of the package information that contents of the package are urgent (e.g., credit card statements, etc.), perishable (e.g., food, beverage, medicine, etc.), biological (e.g., ant farm, sea monkeys, etc.), dangerous (e.g., lighter, gasoline, etc.), etc. Further, the business rules may also include assigning the package to mail center pickup when determining from a digital image of the package information that the sender is a particular type of company (e.g., Pet Shop Company, Frozen Foods, Inc., etc.) doing business in a particular type of industry (e.g., canning foods, cigarette/lighter making, etc.). Such business rules may be present because one or more packages may not be suitable for package storage lockers. The content of the packages may (i) be too time sensitive (e.g., urgent) to be placed in the package storage locker for a long time or (ii) may suffer irreparable damage from being in a closed location without sunlight (e.g., ant farm, food, beverages, etc.).

Figure 19A:
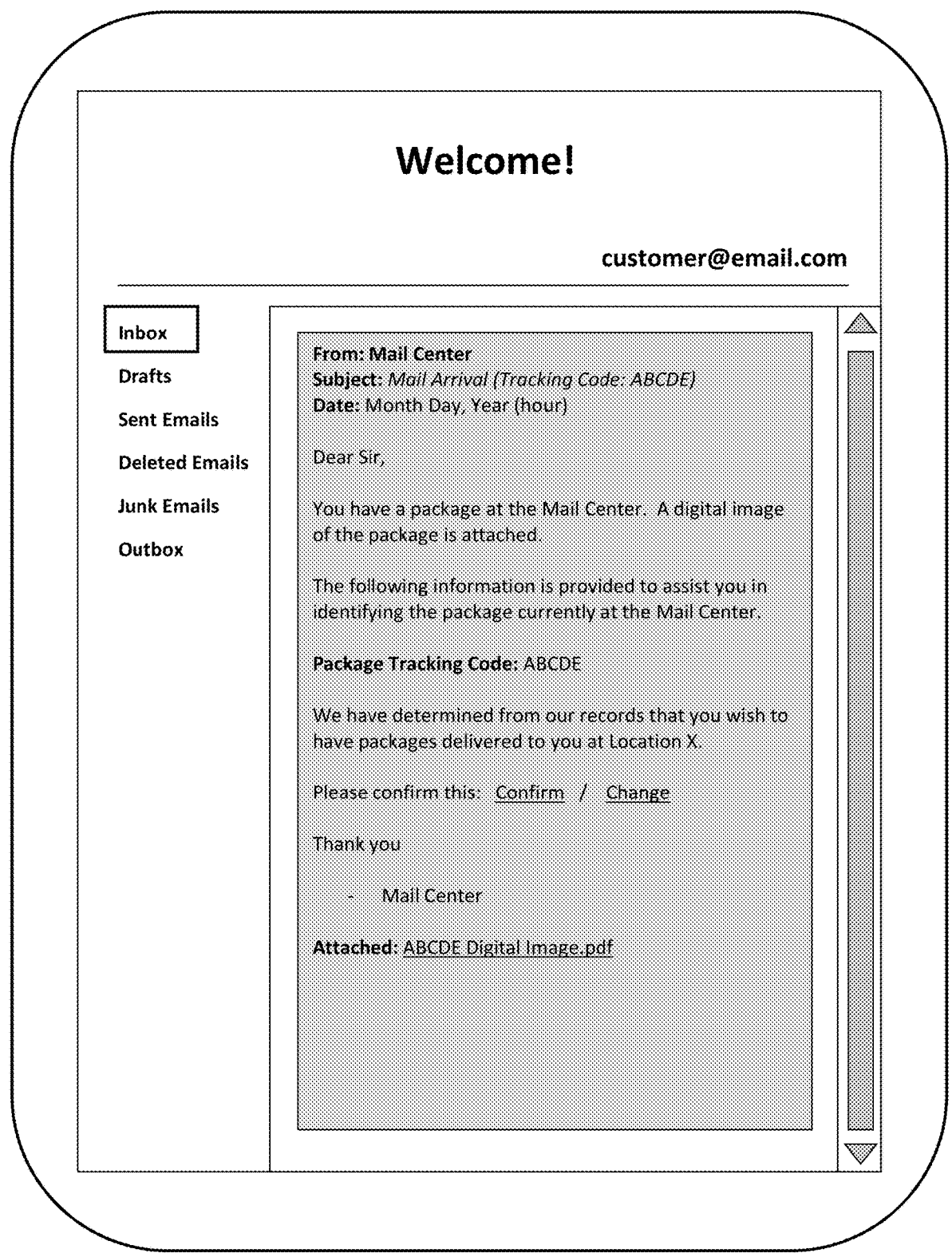
FIGS. 19A-19B show an example of (i) a package delivery notification that can be sent, in any of the systems of FIGS. 1A-1C (or an equivalent), and (ii) provision to change a delivery address.
Figure 19B:
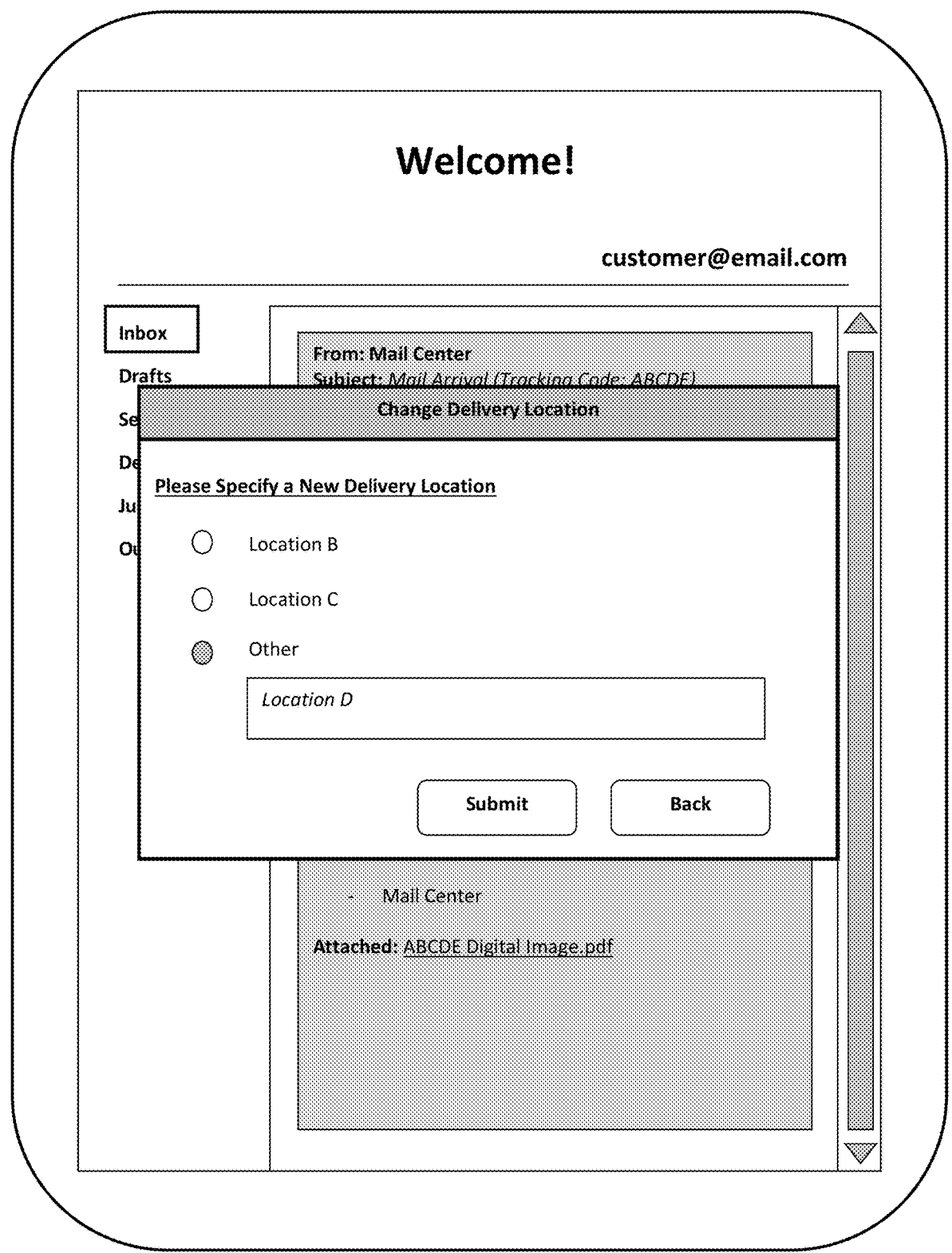

Next, the mail service controller creates a pickup notification that informs a customer who is to receive the package that there is a package for delivery to the customer (step S1902). Then the mail service controller sends such delivery notification to an electronic address corresponding to the customer (step S1903). An example of a delivery notification received by the customer is illustrated in FIG. 19A. As shown, the delivery notification informs the customer that there is a package to be delivered to the customer upon confirmation that the delivery location (i.e. customer address registered with the mailcenter) is correct. The customer is also informed why the package is not sent to a package storage locker. In the case, that the delivery location is not correct, the customer may activate the "Change" link which causes a screen for changing the delivery location (and includes suggestions for other delivery locations based on records associated with the customer), such as illustrated in FIG. 19B. After the customer has sent instructions (i.e. either confirming or changing the delivery location) to the mail service controller (step S1804), the mail service controller registers both the delivery notification sent to the customer and the instructions received from the customer, in a customer database (step S1805).

Figure 20:
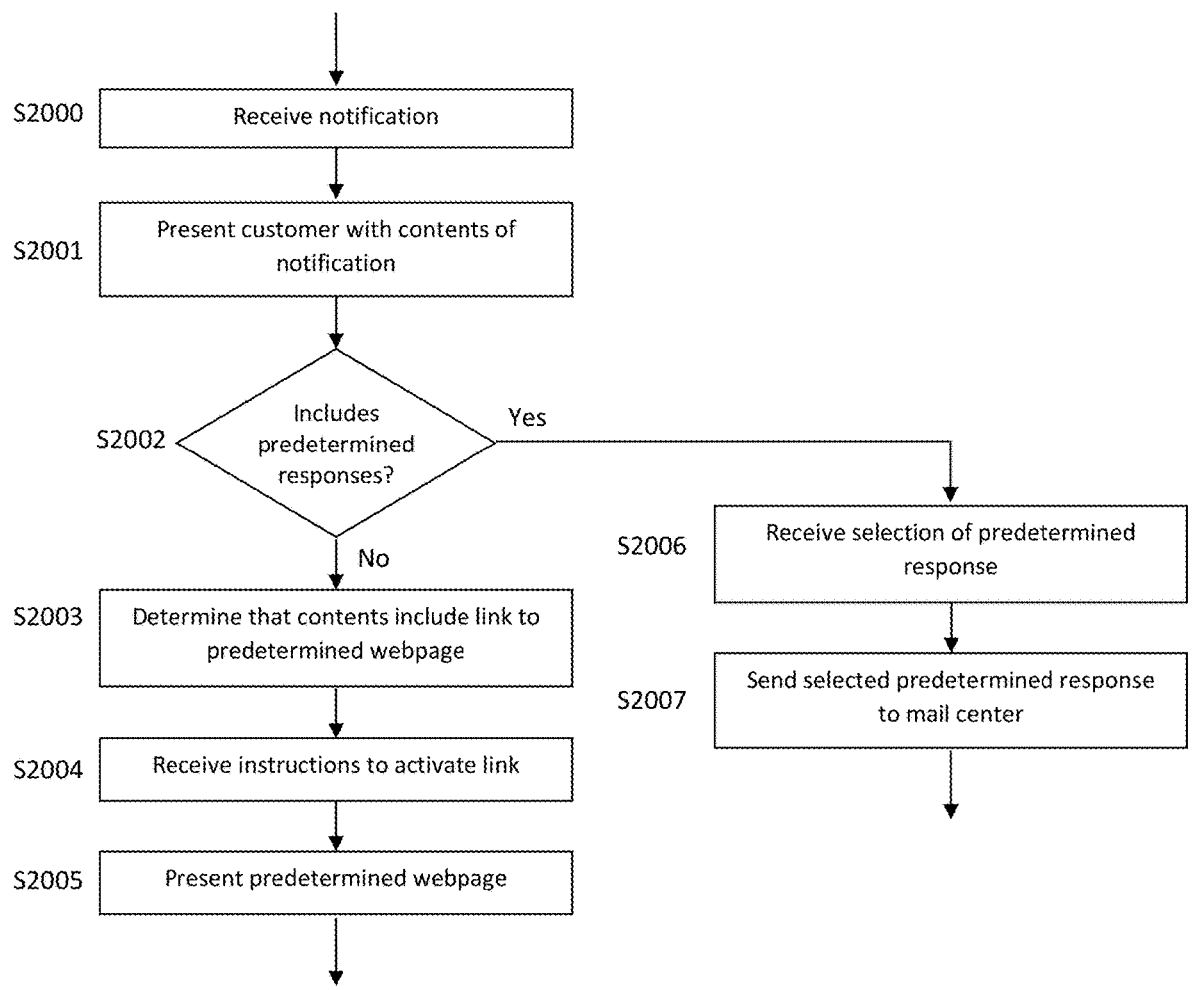
FIG. 20 shows a flow chart for a method that can be performed in any of the systems of FIGS. 1A-1C (or an equivalent)

FIG. 20 shows a method that can performed by a terminal (e.g., 106 in FIG. 1A) according to an exemplary embodiment.

After a mail service controller sends a locker pickup notification to one or more customers via, for example, an electronic address of the customer, one of the customer's terminal (e.g., tablet, personal computer, smartphone, etc.) may receive such notification (S2000). Such notification may be presented to the customer via an application on the terminal (S2001). For example, the application may be software that is installed on the customer's terminal that opens up emails for the customer to view.

The notification may include a request by the mailcenter for instructions on processing the mail item associated with the unique identifier. For example, the instructions may be in the form of predetermined responses that are embedded into the notification. In such case, the customer may simply activate the predetermine response which causes a message associated with the predetermined response to automatically be sent to the mailcenter. In another example, the notification may include a link to a predetermined (pre-generated) webpage at a website maintained (or utilized) by the mailcenter. Such webpage may allow a customer to manually input a message on how he or she wants processing to be performed on the mail item.

Figure 21A:
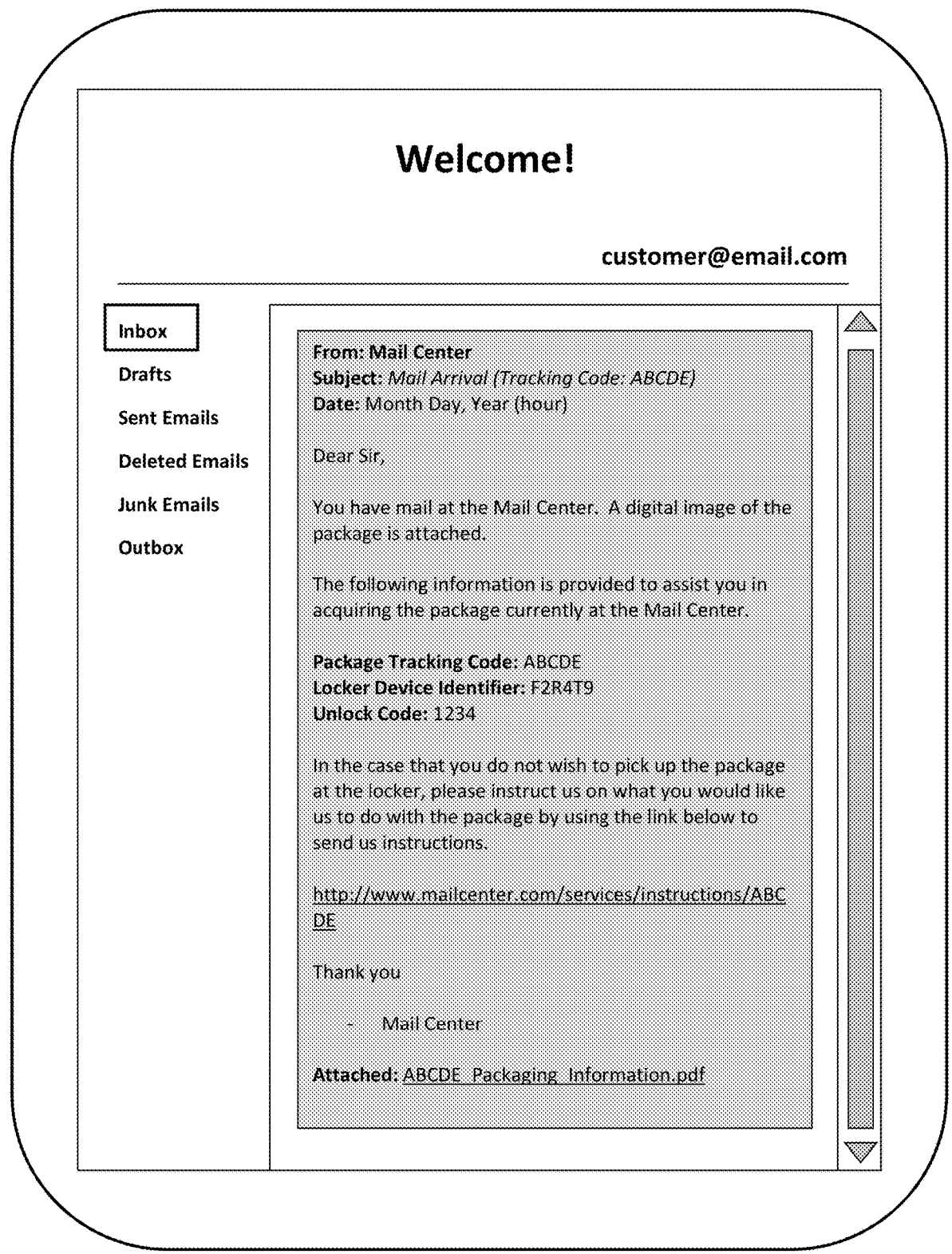
FIG. 21A shows an example of an electronic notification that can be sent, in any of the systems of FIGS. 1A-1C (or an equivalent)
Figure 21B:
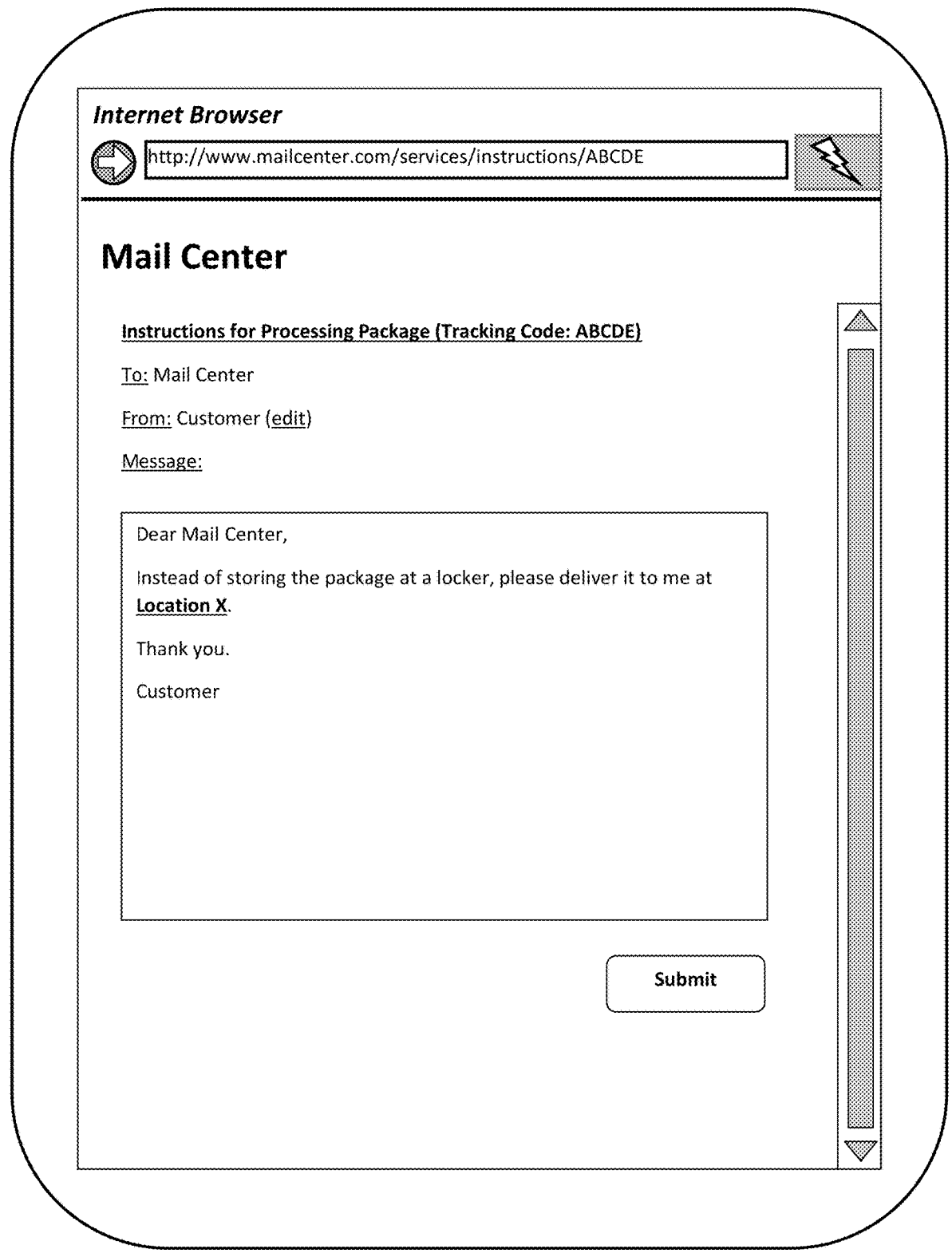
FIG. 21B shows an example of a notification response page, in any of the systems of FIGS. 1A-1C (or an equivalent)

In the case that the notification does not include predetermined responsive instructions (S2002, no), the terminal may determine that the contents include link to predetermined webpage (S2003). For example, the notification can be in the form of an email that includes a URL link to a webpage generated by the mailcenter, such as shown in FIG. 21A. As indicated in the email, such link provides the means for directing the mailcenter on how to process the mail item. Thus, the terminal may receive instructions from the customer to activate the link in the notification (S2004) which causes the terminal to present a predetermined webpage to the customer (S205). In an exemplary embodiment, the predetermined webpage may be automatically generated every time a package is received at the mailcenter. Further, such predetermined webpage may include ways for the customer to input his or her instructions. For example, the instructions may include asking for hand delivering the package to the customer instead of holding the package in the package storage lockers, such as shown in FIG. 21B.

Figure 21C:
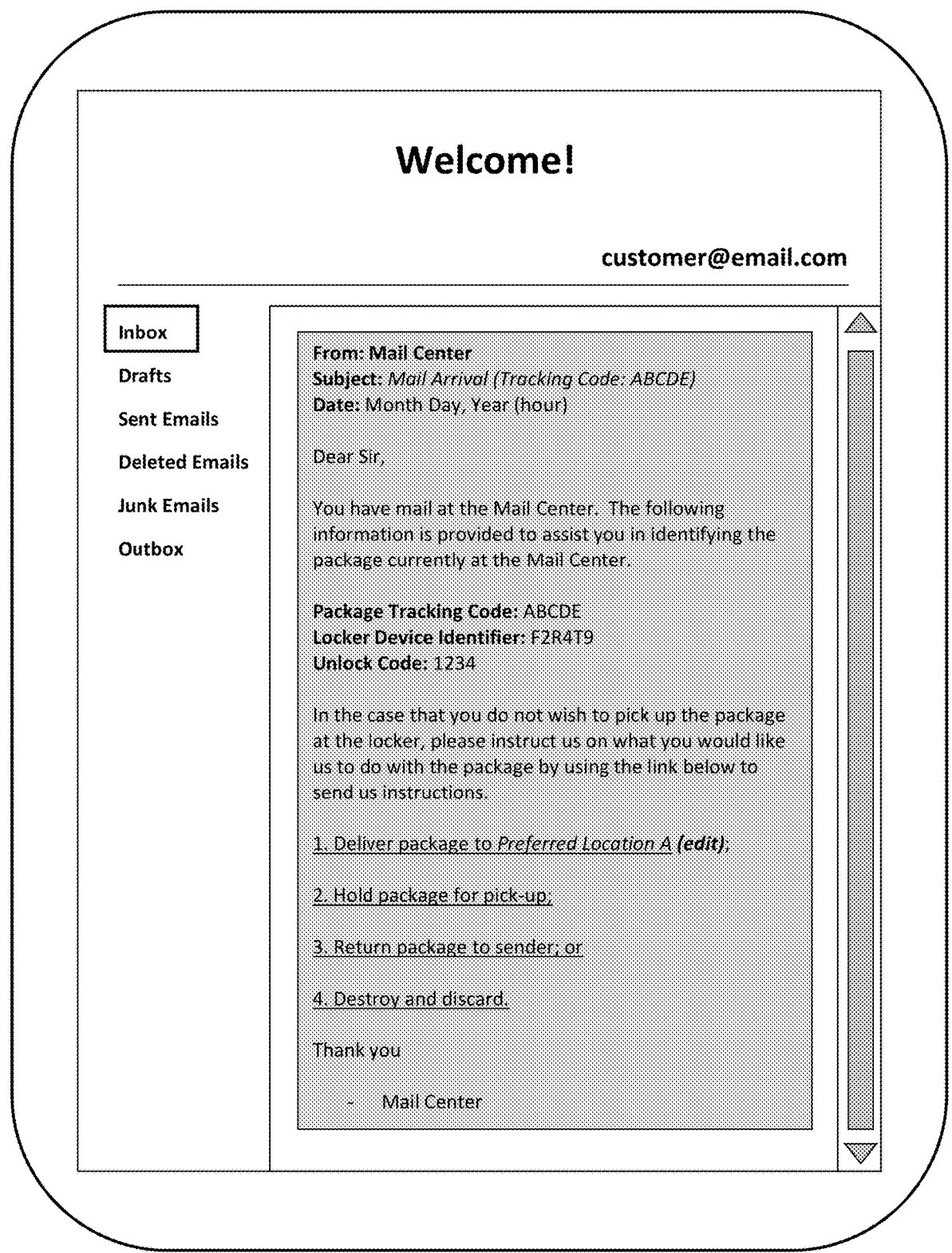
FIG. 21C shows an example of an electronic notification that can be sent, in any of the systems of FIGS. 1A-1C (or an equivalent)

On the other hand, in the case that the notification includes predetermined responsive instructions (S2002, yes), the terminal may receive a selection of one of the predetermined responsive instructions (S2006). For example, there may be a variety of predetermined responsive instructions (e.g., deliver package, hold package for pickup, return package to sender, destroy and discard, etc.), such as shown in FIG. 21C. In an exemplary embodiment, the customer may not have the option of selecting all of the predetermined responsive instructions. The customer may simply select the predetermined responsive instructions by activating the corresponding link (e.g., deliver package, hold package for pickup, return package to sender, discard or destroy, etc.). After receiving the selected predetermined response, the terminal sends the selected predetermined response to the mailcenter for processing (S2007).

Figure 22:
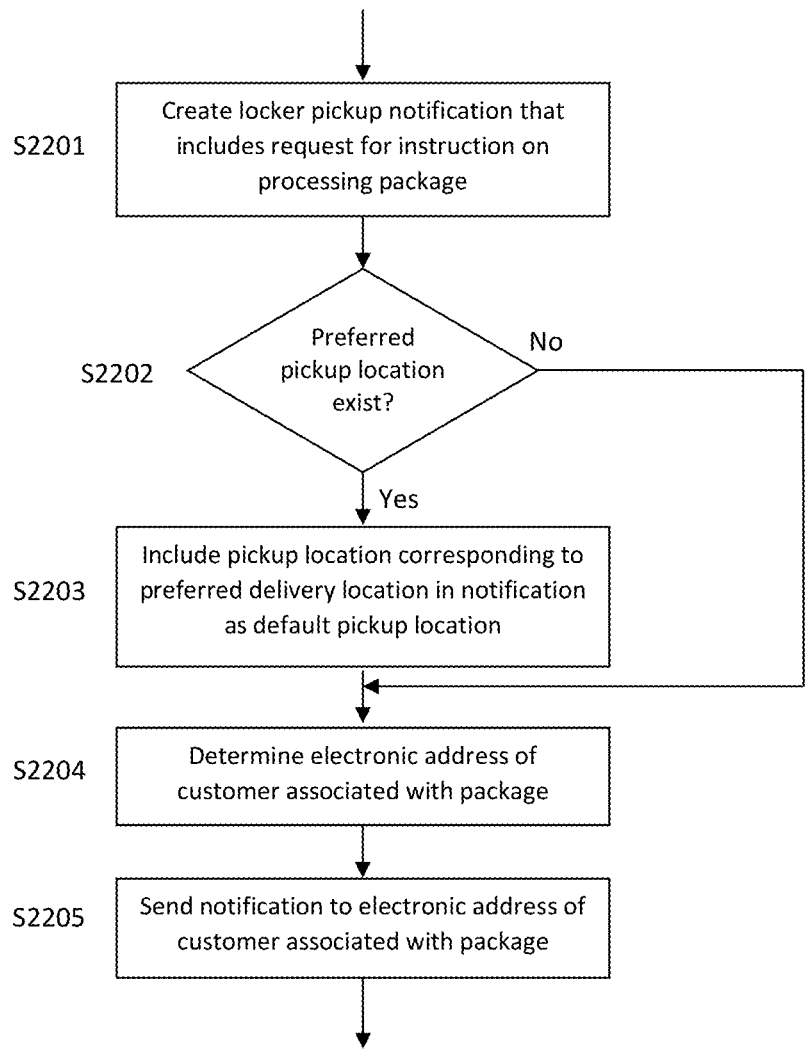
FIG. 22 shows a flow chart for a method that can be performed in any of the systems of FIGS. 1A-1C (or an equivalent)

FIG. 22 shows a method that can be performed by a mail service controller (e.g., 104 in FIG. 1A) according to an exemplary embodiment.

When the mail service controller creates a locker pickup notification that (i) notifies the customer that a package has arrived for him or her, (ii) informs the customer that the package is currently stored in a package storage locker and (iii) requests instructions from the user on how to process the package in case the customer does not want to retrieve the package from the package storage locker (step S2200). However, the mail service controller may modify or add other information into the notification depending on the information registered in databases at the mail facility. For example, the mail service controller may determine when creating the notification whether a preferred delivery location exists for the customer. In the case that the preferred delivery location exists (step S2202, yes), the mail service controller causes the preferred delivery location to be included as a default delivery location in the notification (step S2203). Next [or in the case that there is no preferred delivery location registered (step S2202, no)], the mail service controller determines an electronic address of a customer associated with the mail item (step S2204). Afterwards, the mail service controller sends notifications to the electronic address of the customer (step S2205).

Figure 23A:
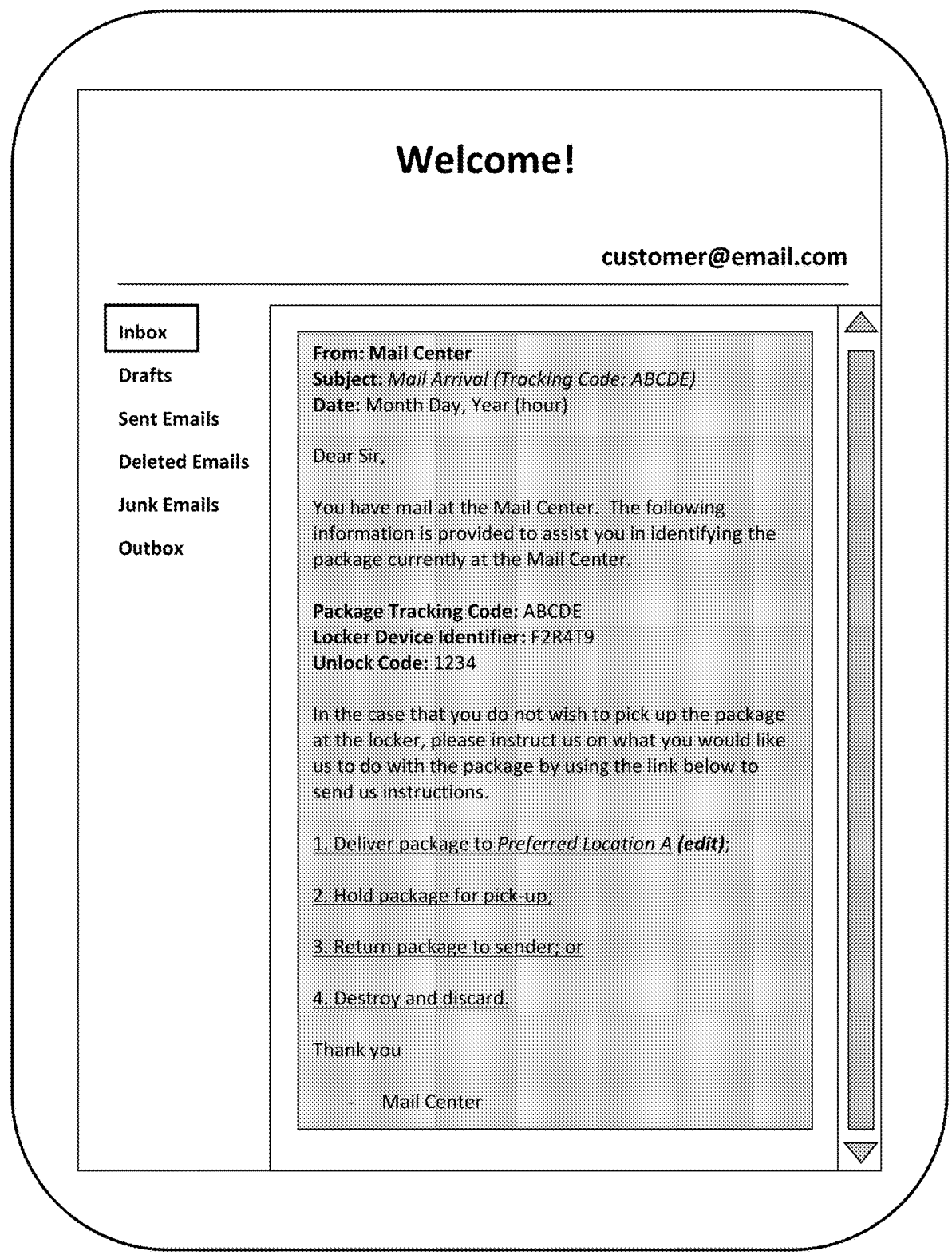
FIGS. 23A-23B show an example of (i) an electronic notification that can be sent, in any of the systems of FIGS. 1A-1C (or an equivalent), and (ii) provision to change a delivery address.
Figure 23B:
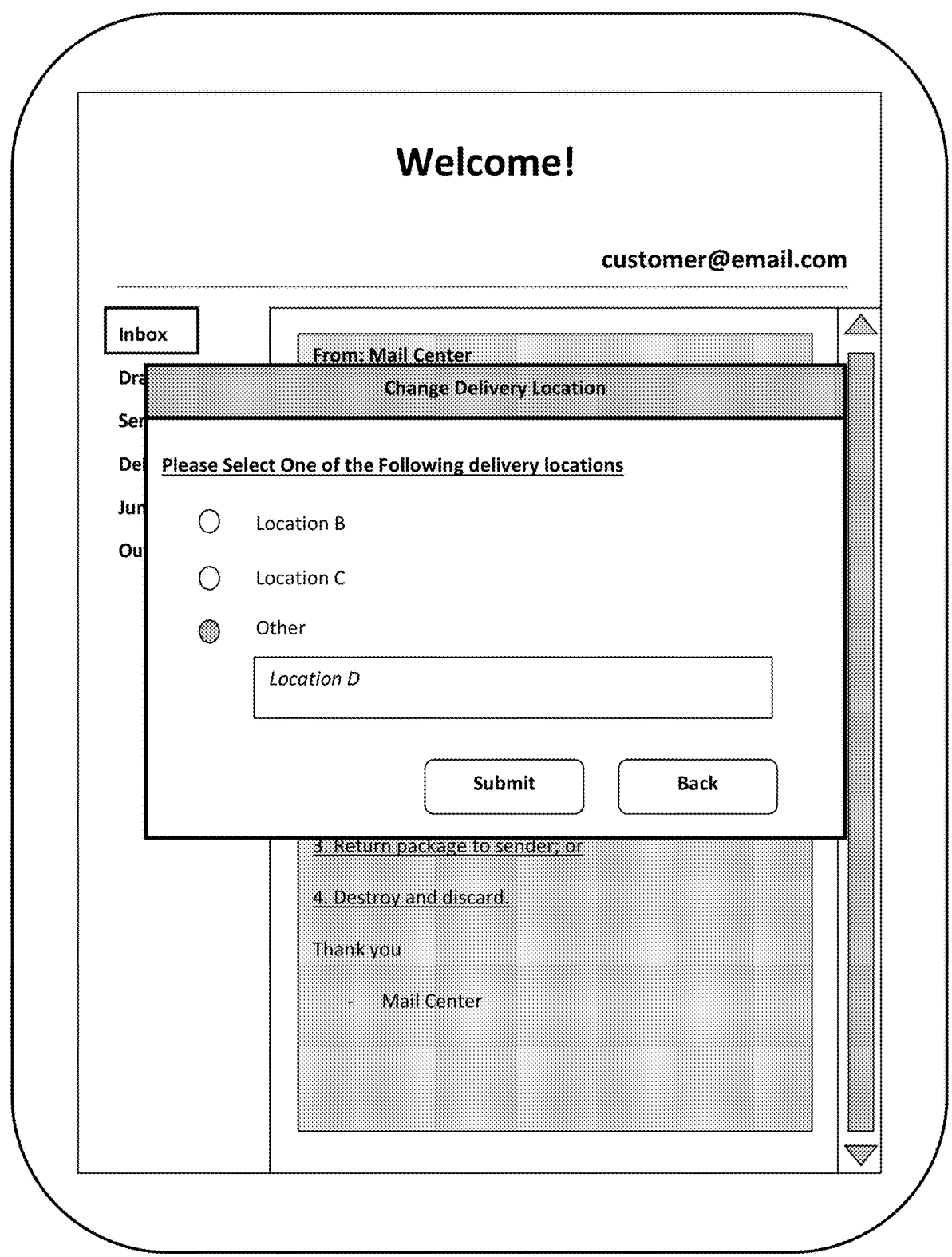
Figure 23C:
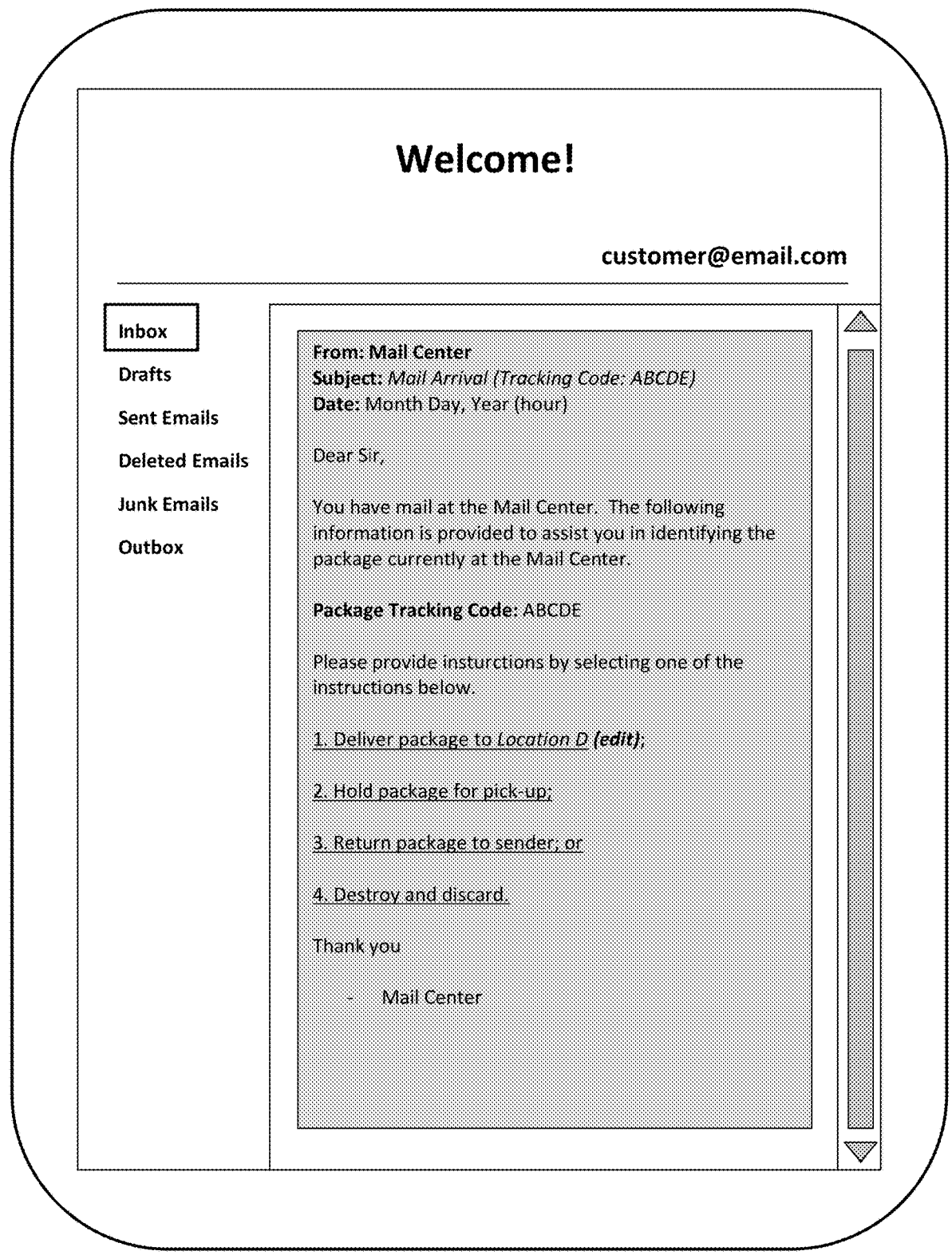
FIG. 23C shows an example of an electronic notification that can be sent, in any of the systems of FIGS. 1A-1C (or an equivalent)

An example of such notification is shown in FIG. 23A. As indicated in the notification, there are many different types of predetermined responsive instructions (e.g., "deliver to Preferred Location A", "hold package for pickup", "destroy and discard", etc.). More specifically, one of the predetermined responsive instructions includes "deliver to Preferred Location A". This is because the mail service controller determined that there was a preferred pickup location (i.e. Preferred Location A) associated with the customer. However, also present in the notification is an option (i.e. "edit") to change the delivery location of the package. When the "edit" link is activated, the customer is presented with a screen in which he or she can select another delivery location, such as shown in FIG. 23B. In an exemplary embodiment, the notification may include suggestions on alternative delivery locations. Such alternative pick-up locations may be determined by analyzing metrics registered in databases of the mailcenter. In another exemplary embodiment, the customer may specify a delivery location that was not included as part of the alternative delivery locations. After the customer has selected the new delivery location, the change is reflected in the notification, such as shown in FIG. 23C.

Figure 24:
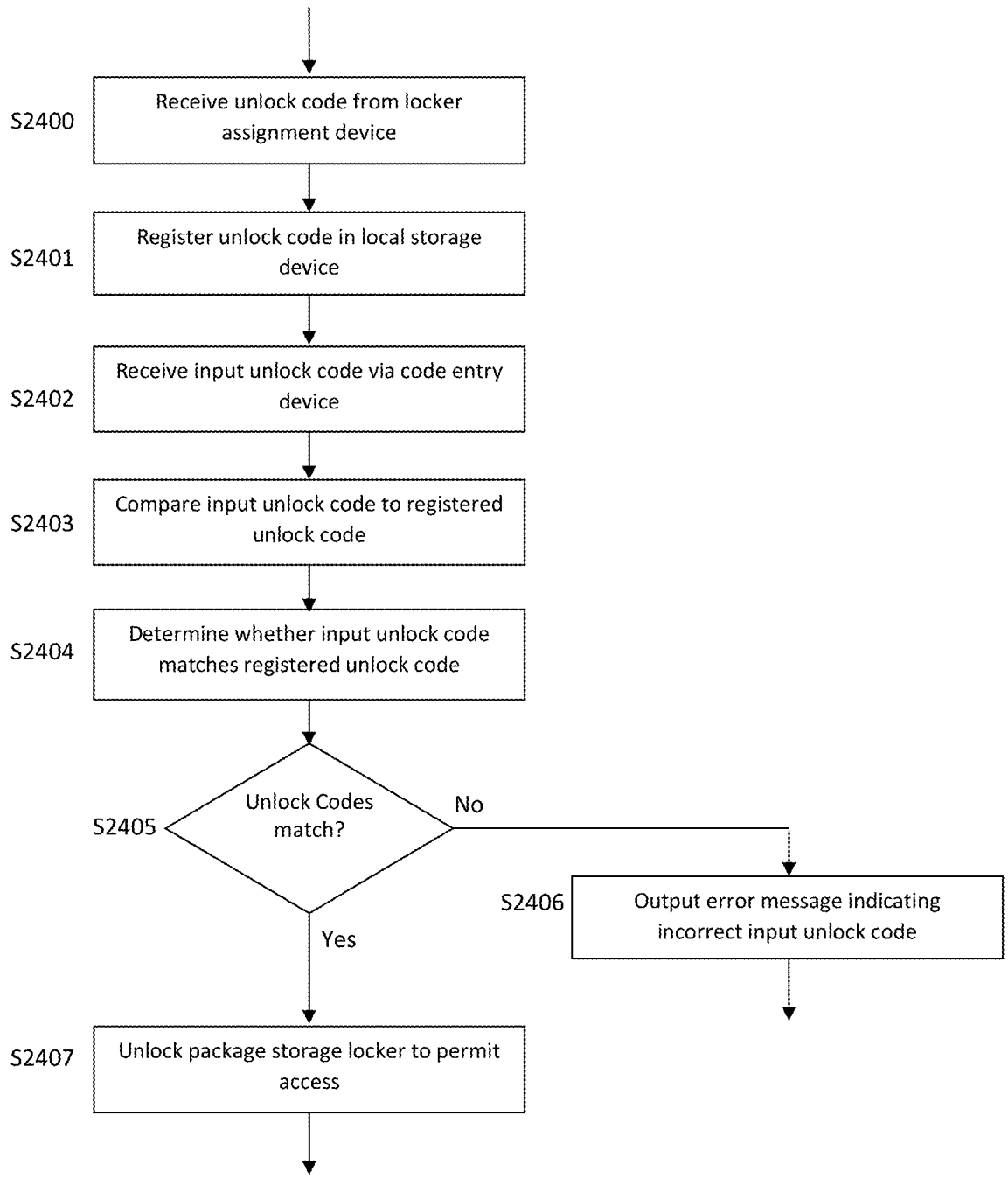
FIG. 24 shows a flow chart for a method that can be performed in any of the systems of FIGS. 1A-1C (or an equivalent)

FIG. 24 shows a method that can performed by a package storage locker amongst the package storage lockers (e.g., 101 in FIG. 1A) according to an exemplary embodiment.

The package storage locker may have a locking mechanism that prevents opening of the package storage locker without entering a proper unlock code. However, the unlock code may be different for each interval of time to enhance security. The unlock code may be generated by a locker assignment device. Thus, after generating the unlock code, the locker assignment device sends such unlock code to the package storage locker (step S2400). Next, after receiving the unlock code, the package storage locker registers the unlock code onto a local storage device accessible by the package storage locker (step S2401).

Next, a customer who has also received the unlock code, may come to the package storage locker to obtain the package that is disposed within the package storage locker. Thus, the package storage locker may receive input of the unlock code on, for example, a code entry device disposed on the package storage locker (step S2402). Then, after receiving the unlock code, the package storage locker compares the input unlock code by the customer to the unlock code registered in the local storage device of the package storage locker (step S2403). The package storage locker determines whether the input unlock code matches the registered unlock code (step S2404). In the case that the input unlock code and the registered unlock code don't match (step S2405, no), the package storage locker outputs an error message on a display of the code entry device indicating that the input unlock code is incorrect (step S2406). On the other hand, in the case that the input unlock code and the registered unlock code match (step S2205, yes), the package storage locker unlocks to allow the customer access to contents inside the package storage locker (step S2407). In an exemplary embodiment, after the customer acquires the package and closes a door of the package storage locker, the package storage locker may send a message to the mail service controller indicating that the package has been retrieved, and that the package storage locker is now empty.

Figure 25:
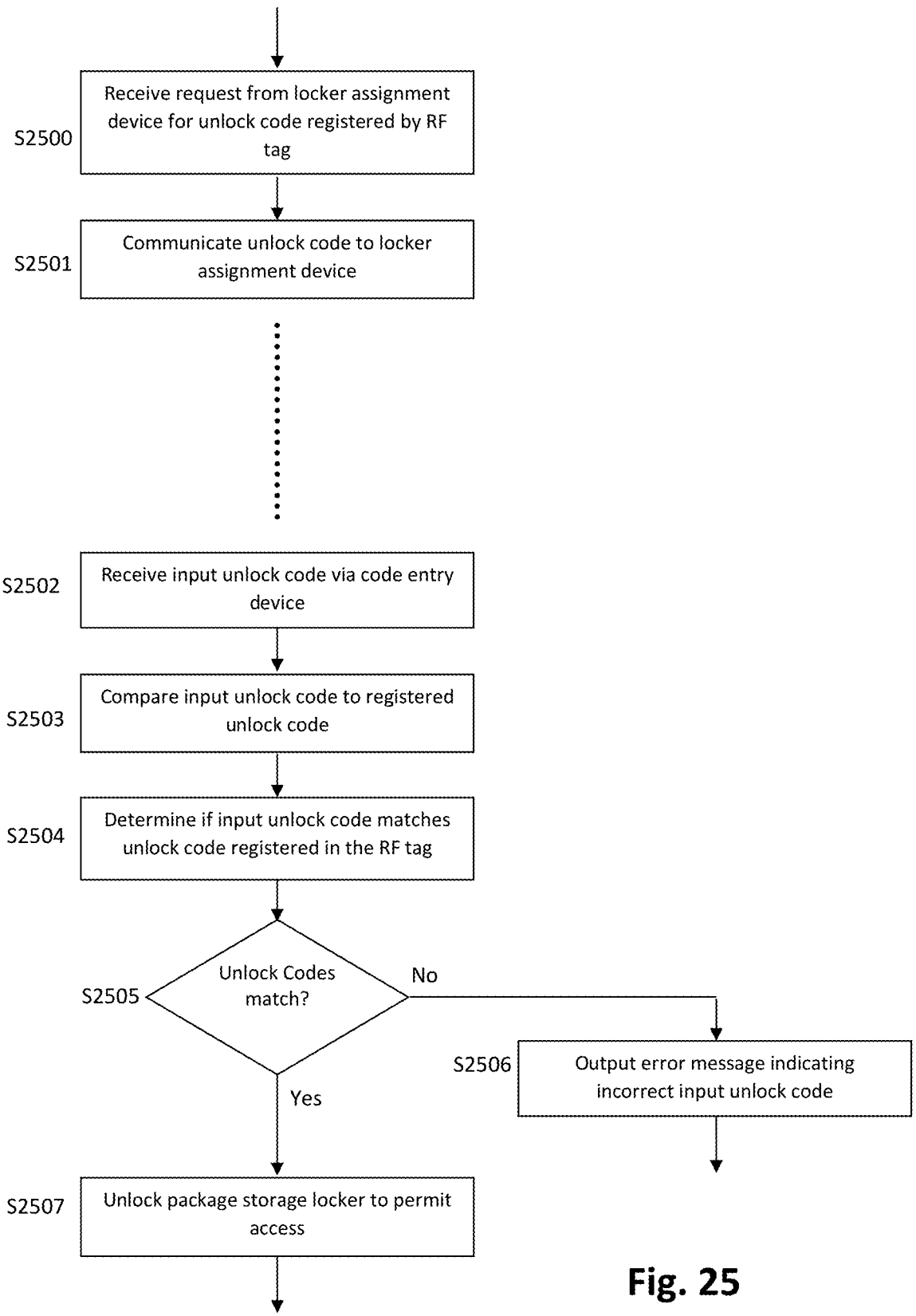
FIG. 25 shows a flow chart for a method that can be performed in any of the systems of FIGS. 1A-1C (or an equivalent)

FIG. 25 shows a method that can performed by a package storage locker amongst the package storage lockers (e.g., 101 in FIG. 1A) according to an exemplary embodiment.

A package storage locker may include an RF tag that registers an unlock code of the package storage locker. When a locker assignment device requests the unlock code by reading the RF tag of the package storage locker (step S2500), the package storage locker communicates the unlock code to the locker assignment device (step S2501). After an indeterminate amount of time, a customer who has received the unlock code, may come to the package storage locker to obtain the package that is disposed within the package storage locker. Thus, the package storage locker may receive input of the unlock code on, for example, a code entry device disposed on the package storage locker (step S2502).

Then, after receiving the unlock code, the package storage locker compares the input unlock code by the customer to the unlock code registered in the RF tag of the package storage locker (step S2503). The package storage locker determines whether the input unlock code matches the registered unlock code (step S2504). In the case that the input unlock code and the registered unlock code don't match (step S2505, no), the package storage locker outputs an error message on a display of the code entry device indicating that the input unlock code is incorrect (step S2506). On the other hand, in the case that the input unlock code and the registered unlock code match (step S2505, yes), the package storage locker unlocks to allow the customer access to contents inside the package storage locker (step S2507).

Figure 26:
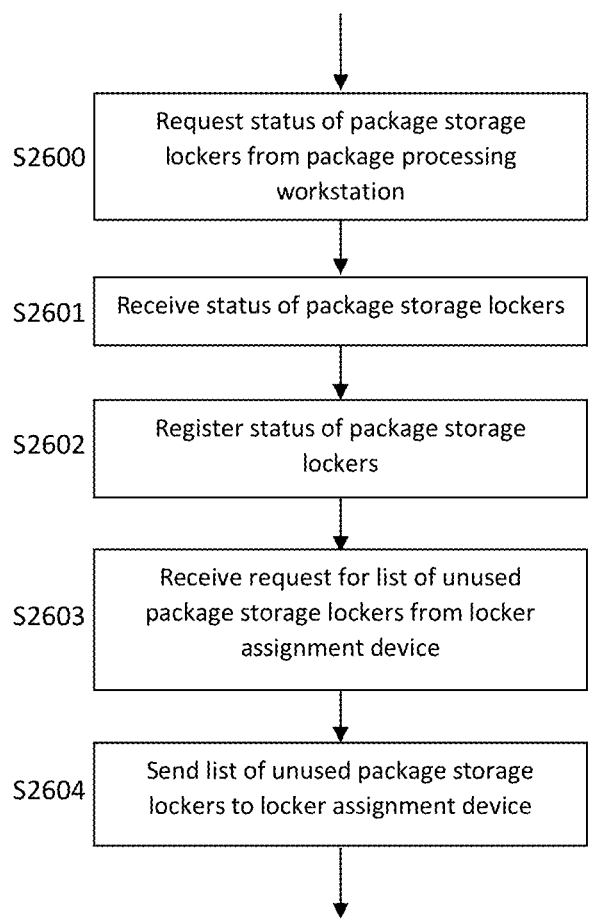
FIG. 26 shows a flow chart for a method that can be performed in any of the systems of FIGS. 1A-1C (or an equivalent)

FIG. 26 shows a method that can performed by a mail service controller (e.g., 104 in FIG. 1A) according to an exemplary embodiment.

The mail service controller may periodically request status (e.g., empty, filled, broken, under repairs, temporary unusable, etc.) of package storage lockers from the package processing workstation (step S2600). In response, the package processing workstation may send such package storage locker status to the mail service controller (step S2601). After receiving such status, the mail service controller may register the received status in a database (step S2602). Next, the mail service controller may receive a request from a locker assignment device for a list of unused package storage lockers (step S2603). In response, the mail service controller may utilize the status information (e.g., package storage locker status) received from the package processing workstation, to create the list of unused package storage lockers. Then the mail service controller may send such list to the locker assignment device (step S2604).

Figure 27:
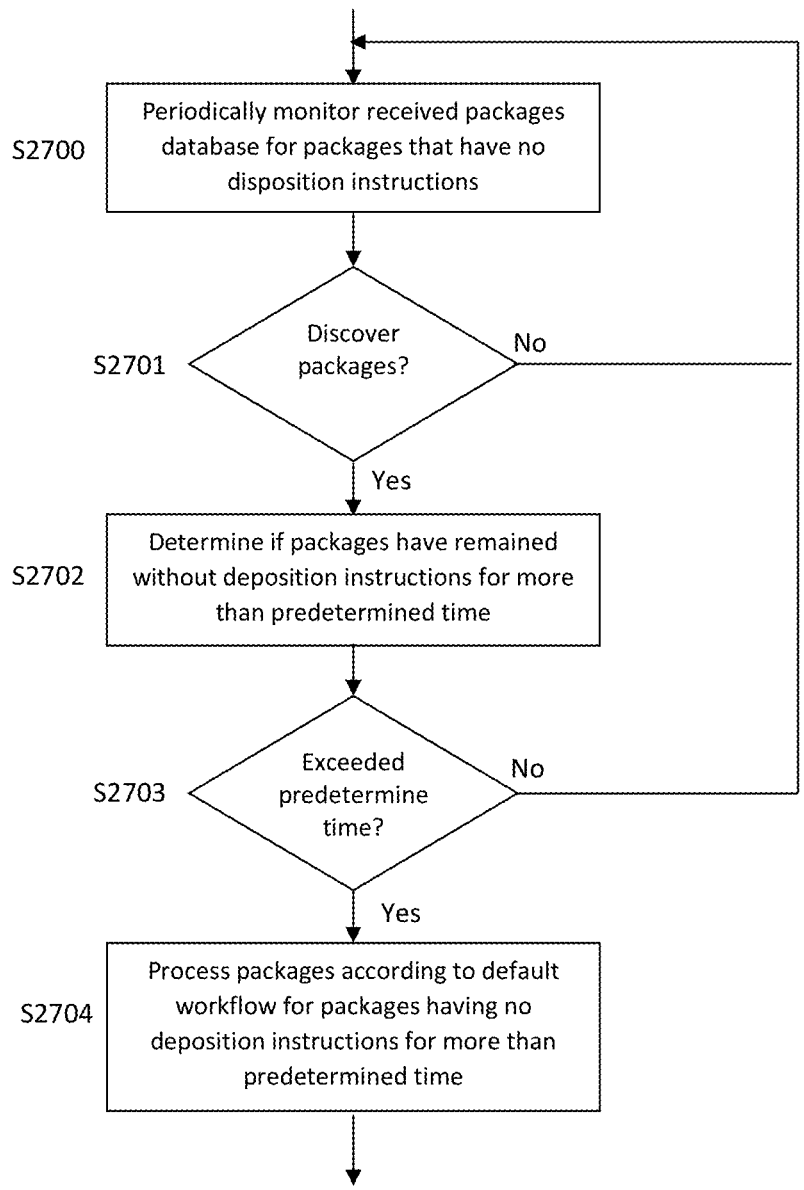
FIG. 27 shows a flow chart for a method that can be performed in any of the systems of FIGS. 1A-1C (or an equivalent)

FIG. 27 shows a method that can performed by a mail service controller (e.g., 104 in FIG. 1A) according to an exemplary embodiment.

Not every customer has the time or the concern to send instructions on processing one or more mail items intended for the customer. Further, not every customer remembers that he or she needs to send instructions. Thus, it is possible that within the mailcenter, there may be one or more mail items that have no processing instructions.

Accordingly, the mail service controller can periodically monitor a received packages database for particular packages that have no disposition instructions (S2700). In the case that all the packages have disposition instructions (S2701, no), the mail service controller reverts back to monitoring. Otherwise (S2701, yes), in the case that one or more of the particular packages have no disposition instructions, the mail processing controller determines if the particular packages have remained without deposition instructions for more than a predetermined time (S2702).

The predetermined amount of time (e.g., minutes, hours, days, weeks, months, years, etc.) may be preset by authorized mailcenter staff. In an exemplary embodiment, each particular package may have a different predetermined time set by the mail processing controller. This may be determined by the sender information or the size of the package. For example, in the case that the sender is determined to be from an important government agency (e.g., Internal Revenue Service), the predetermined time may be set longer (e.g., month). On the other hand, in the case that the sender is determined to be from a retailer, the predetermined time may be shorter (e.g., a week).

In the case that, for each package that has no disposition instructions, the predetermined time for at least one package that has no disposition instructions has not been exceeded (S2703, no), the mail service controller reverts back to monitoring. On the other hand, in the case that, for each package that has no disposition instructions, the predetermined time for at least one package that has no disposition instructions has been exceeded (S2703, yes), the mail service controller processes the package according to default workflow (S2704). The default workflow is set by the mailcenter. In other words, the default workflow is an action or series of action that are to be taken with regard to a package that has no disposition instructions for more than a predetermined period of time. For example such actions may include destroying the package, moving the package to a warehouse, hand delivering the mail item to the intended addressee, a combination of the aforementioned actions, etc. By having this default workflow, it is possible to eliminate any space issues within the mailcenter.

Figure 28:
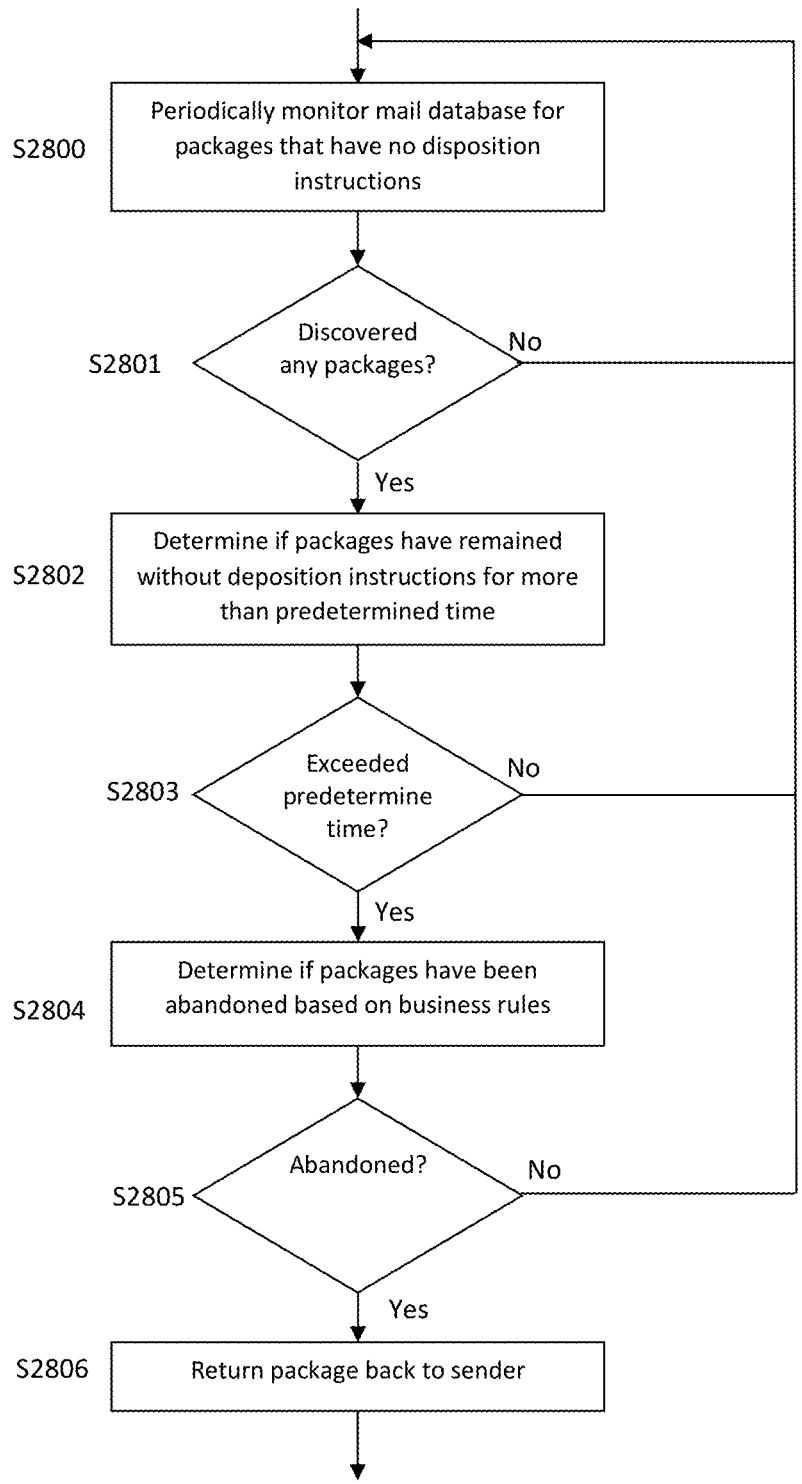
FIG. 28 shows a flow chart for a method that can be performed in any of the systems of FIGS. 1A-1C (or an equivalent)

FIG. 28 shows a method that can performed by a mail service controller (e.g., 104 in FIG. 1A) according to an exemplary embodiment.

Not every customer has the time or the concern to send instructions on processing one or more mail items intended for the customer. Further, not every customer remembers that he or she needs to send instructions. Thus, it is possible that within the mailcenter, there may be one or more mail items that have no processing instructions.

Accordingly, the mail service controller can periodically monitor a received packages database for particular packages that have no disposition instructions (S2800). In the case that all the packages have disposition instructions (S2801, no), the mail service controller reverts back to monitoring. Otherwise (S2801, yes), in the case that one or more of the particular packages have no disposition instructions, the mail processing controller determines if the particular packages have remained without deposition instructions for more than a predetermined time (S2802).

The predetermined amount of time (e.g., minutes, hours, days, weeks, months, years, etc.) may be preset by authorized mailcenter staff. In an exemplary embodiment, each particular package may have a different predetermined time set by the mail processing controller. This may be determined by the sender information or the size of the package. For example, in the case that the sender is determined to be from an important government agency (e.g., Internal Revenue Service), the predetermined time may be set longer (e.g., month). On the other hand, in the case that the sender is determined to be from a retailer, the predetermined time may be shorter (e.g., a week).

In the case that, for each package that has no disposition instructions, the predetermined time for at least one package that has no disposition instructions has not been exceeded (S2803, no), the mail service controller reverts back to monitoring. On the other hand, in the case that, for each package that has no disposition instructions, the predetermined time for at least one package that has no disposition instructions has been exceeded (S2803, yes), the mail service controller determines whether the package has been abandoned based on business rules. Such business rules may include abandoning the package when the contents of the package are determined to be junk mail (e.g., spam), advertisements (e.g., sales catalogues, etc.), entertainment literature (e.g., magazines, tabloids, etc.), request for donations, etc. In other words, the business rules may indicate that certain content may generally not be in the interest of the customer due to their nature. Thus, such packages may be abandoned without worrying about the consequences. Thus, in the case that the business rules indicate that the package is not to be abandoned (step S2805, no), the mail service controller reverts back to monitoring. On the other hand, in the case that the business rules indicate that the package can be abandoned (step S2805, yes), the package is sent back to the sender (step S2806).

Figure 29:
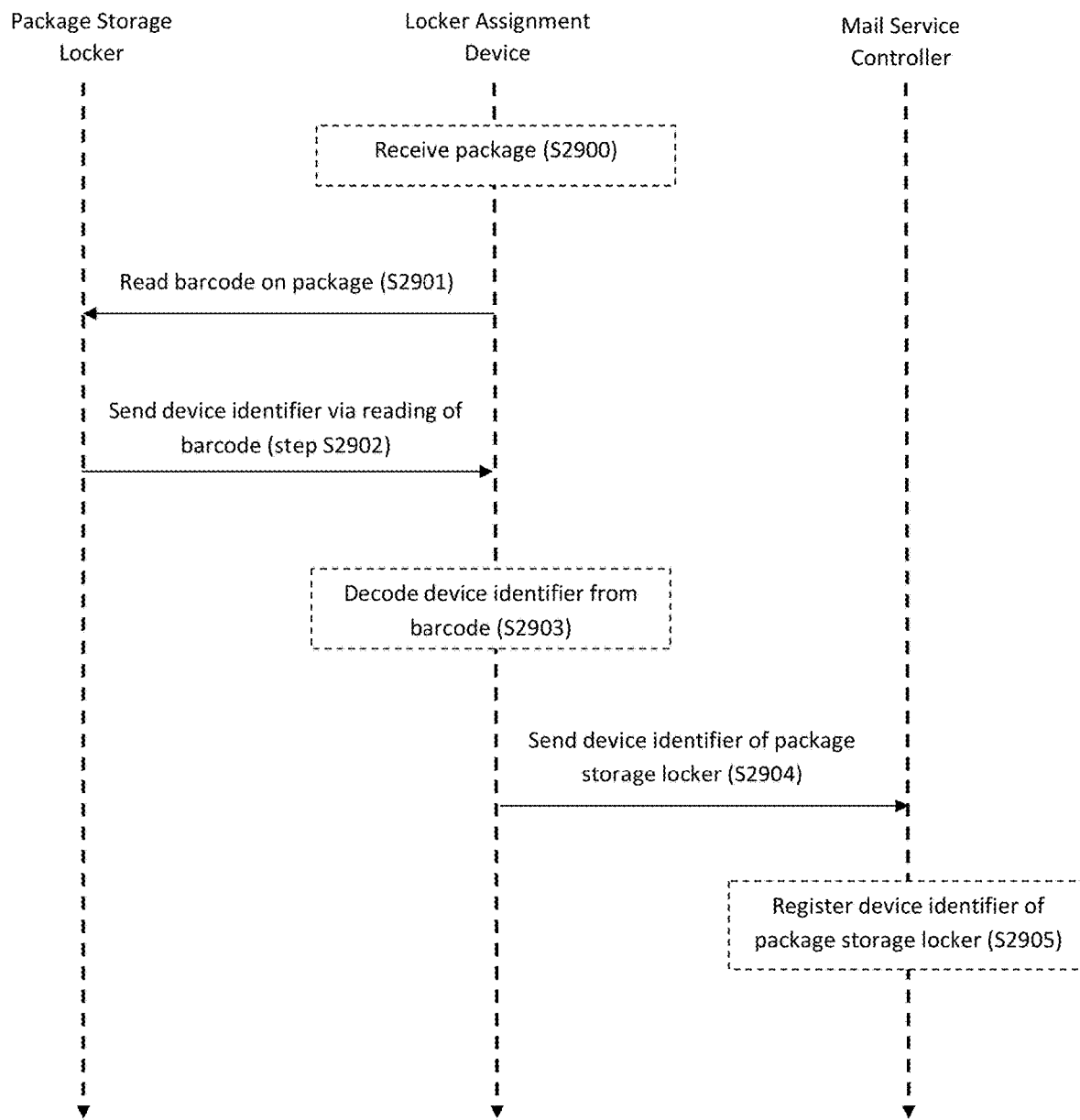
FIG. 29 shows a flow chart for a method (and communication flow) that can be performed in any of the systems of FIGS. 1A-1C (or an equivalent).

FIG. 29 shows a process performed in, for example, the systems 100A-100C (illustrated in FIGS. 1A-1C, respectively), according to an exemplary embodiment.

When a locker assignment device receives a package (step S2900), the locker assignment device reads a barcode off a package storage locker to determine a device identifier associated with the package storage locker (step S2901). After the package storage locker passively sends the device identifier via the reading of the barcode by the locker assignment device (step S2902), the locker assignment device decodes the barcode to obtain the device identifier (step S2903). After acquiring the device identifier, the locker assignment device sends the device identifier to a mail service controller (step S2904). In response, the mail service controller registers the device identifier of the package storage locker in a database (step S2905).

Various of the aforementioned aspects, features, etc., will now be explained by means of an example in the context of a campus. Such aspects, features, etc., may be embodied in a campus mail solution to streamline and automate package pickup and delivery, dramatically shorten wait times for students, decrease the space required for traditional student mailboxes while increasing space for packages, provide email notification to students of mail and package arrival and generally enhance the student experience with mail and package services.

Students' proclivity for online shopping has created massive challenges for colleges and universities. Most campus mailcenters were created in a time when students received a substantial amount of mail and an occasional care package from family and friends. On the other hand, most students today receive very little traditional letter mail and instead, due to the proliferation of online shopping, receive tremendous amounts of packages. Storing and distributing large numbers of packages to students creates significant challenges to mailcenters that were designed before the dawn of the Internet.

Another side of such challenge is that the mailcenters were designed to handle large amounts of incoming letter mail and often times have significant amounts of real estate dedicated to housing thousands of student mailboxes that are mostly unused. Such valuable real estate could be repurposed to provide more room for package storage. Even if the valuable real estate taken up by student mailboxes is repurposed to accommodate packages, the exponential growth in the volume of packages received means we will soon outgrow any space reclaimed from the elimination of the student mailboxes. Many universities are experiencing large amounts (e.g., 30% or more) of year-over-year growth in incoming package volumes. There is also an increasing demand from students to have access to packages 24/7. Many students work and go to school at the same time and find it challenging to get to the mailcenter during normal business hours to retrieve their packages. Expanding the hours and days of operation of the mail center can help but is also very expensive due to the high cost of labor.

The campus mail solution may include one or more kiosk on-site at the mailcenter to automate the package pickup process for students. In conventional campus processes without kiosks, it was not unusual for students to stand in line 45 minutes to an hour or more to obtain their packages from a pickup window on a busy day. Use of kiosks can reduce the median wait time to a few minutes or less.

In the campus mail solution, incoming packages are processed by one or more package processing workstations, and for each such package addressed to a student, the student receives an email notification that a package has arrived for them in the university mailcenter. The notification may permit the student to elect, by reply email or at a notification response page, locker pickup, mailcenter pickup, delivery to customer, delivery to alternate address, etc., as a package processing route.

In the case of mailcenter pickup, when the student arrives at one of the kiosks which are usually placed 15-30 seconds walk from the mailcenter, they simply swipe their student ID at the kiosk or enter their student ID number on the keypad. The kiosk addresses the student by name, displays how many packages have been received for the student and provides the student with the option to pickup now or later. If the student chooses to pickup now, information regarding the student and the package(s) is displayed on monitors in the mailcenter. This information includes the student name, ID number, number of packages, carrier, sender, and package location. The screen also changes color briefly and a bell sounds to give the mailcenter staff a visual and audible alert that a student has arrived to pickup the packages. The mailcenter staff member can select the line for the new student on the touchscreen monitor, and in such instance, the line changes color, indicting that someone is working to retrieve the package(s) for this student. Such provision prevents multiple mailcenter staff members from trying to work the same packages at the same time. Using the information displayed on the monitor and other reference monitors around the mailcenter the mailcenter staff member retrieve the student's packages and takes them to the pickup window. The packages are then scanned and the student signs or swipes their student ID to acknowledge delivery of the packages. Once the student accepts delivery of the packages their information is deleted from the monitors in the mail center. Details about each transaction are tracked for reporting and may be used in metrics and analytics processes to improve the workflow.

The campus mail solution may also include a high density mail provision. In many universities employing a conventional mailcenter, a significant amount of space is taken up by traditional student mailboxes that are hardly used. Maintaining keys or combinations for these mailboxes can also be very labor intensive. Since students now rarely receive letter mail, they rarely check their mailboxes, making the provision of mailboxes even less efficient for communication. On the other hand, a high density mail provision can address such challenges and eliminate traditional student mailboxes, freeing up space to be used for package storage or other applications. Student mailboxes which are generally outside the student mail center and accessible by students directly can be replaced by vertical folders in fixed or moveable racking inside the mailcenter where they are no longer directly available to students. This vertical folder solution takes up a fraction of the space required for traditional student mailboxes. Each vertical folder is barcoded with the student's mailbox number. When mail is sorted into a student's folder the barcode is scanned by the Mailcenter staff member wearing a hand- or finger-fitted barcode scanner. The system then sends the student an email letting them know that a piece of letter mail has been received for them. When the student arrives at the mail center, the student swipe the student ID or enter a student ID number at the kiosk. The kiosk confirms that mail has arrived for the student, and if there are packages waiting on the student, such information is also displayed. The student's info is displayed on a monitor system, and the student can then pick up the mail letter and/or packages.

To address the demand for faster and improved access to incoming packages, intelligent lockers are integrated in the campus mail solution. Such intelligent lockers provision allows for centralized receipt and processing of packages with decentralized delivery to make room for more packages and still maintain chain of custody and enhanced student experience, by giving students access to their packages when and where they want.

Student packages are separated by size. Those that are too large to fit into lockers or may be perishable are received into a queue for delivery/pickup at the mailcenter through the kiosk system. Items that can fit into a locker are received into a queue for intelligent lockers. Each locker is considered a delivery route and packages are assigned appropriately. When a mailcenter staff member reaches the locker bank with the packages to be loaded into lockers, the mailcenter staff member logs into the locker control system, types the name of the customer, and selects the size locker needed for the package. The locker control system then assigns the package to a correct-size or larger locker bay and unlocks the door. On the inside of the door is a barcode sticker with the unique location of the locker bay. Using the handheld scanner the mailcenter staff member scans the tracking code on the package and the barcode on the inside of the door, essentially delivering that particular package to that locker bay. The door is then closed which indicates to the locker control system to generate a notification and email it to the student letting the student know that a package has been placed in this particular locker bank. The email also provides an unlock code or barcode.

When the student arrives, the student simply enters the unlock code into the locker control screen or scans the barcode. The system will then open the door of the bay where the package has been stored.

Various aspects may be integrated in the campus mail solution. For example, a common user or customer database may be maintained by the system, and is queried on demand by the locker control system, or the database is exported into, or imported by, the locker system on a regular basis.

As another aspect, the campus mail solution may include separate routing paths from the package processing workstation, with packages headed for lockers on one path, packages for mailcenter pickup on another path, packages for delivery on a third path, etc. In addition to registering such routing path in connection with the package in a packages database, the routing information may be printed on a label that is in turn applied to the package, or the routing information is printed (such as by an imprinter) directly on the package.

The aforementioned specific embodiments are illustrative, and many variations can be introduced on these embodiments without departing from the spirit of the disclosure or from the scope of the appended claims.

For example, the aforementioned embodiments, aspects, features, etc., can be adapted for use in a mailcenter within a school, a corporate or organizational campus, etc., or the mailcenter may be a post office, such as servicing a rural (or other relatively small population) community in which mail delivery may or may not be a burden.

Further, various examples and embodiments are discussed herein with reference to output devices, but it should be appreciated that the inventive subject matter of this disclosure can be applied to maintain, configure and service devices other than output devices, automobile emission control systems, medical test equipment, flight systems in aircraft, etc. In such examples (as well as many others), it is highly desirable, and even necessary in many instances, to oversee the application of configuration settings and to log information regarding who made changes, what changes were made, when they were made, as well as what systems they were applied to.

In addition, elements and/or features of different examples and illustrative embodiments may be combined with each other and/or substituted for each other within the scope of this disclosure and appended claims. For example, the orders in which the steps are performed in the aforementioned methods are not limited to those shown in the examples of FIGS. 7-9, 11-14, 16, 18, 20, 22 and 24-29, and may be switched as long as similar results are achieved. Also, it should be noted that the methods illustrated in the examples of FIGS. 7-9, 11-14, 16, 18, 20, 22 and 24-29 may be implemented using any of the systems described in connection with FIGS. 1A-1C.

Further, while wireless technology can be used as much as possible and the various components in the system communicate with each other through a network (such as a wireless network) or via other wireless communication, it should be understood that some functionalities may be integrated in one device. For example, a package processing workstation configured to adequate processing, storage and communication resources may also serve as the mail service controller. In another example, locker assignment functionality may by, at least partially, integrated in the package processing workstation and/or mail service controller, and locker assignments are managed by, and communicated from, such centrally-located package processing workstation and/or mail service controller.

What is claimed is:

1. A mailcenter package locker system for a community of plural mail service customers registered in a customer database registering contact information for the plural mail service customers, the mailcenter package locker system comprising:

plural package storage lockers, each package storage locker having a device identifier unique to the package storage locker and associated with an assigned location of the package storage locker, and each package storage locker including a code entry device to receive user entry of an unlock code specific to unlocking the package storage locker at an instant moment;

a package processing workstation to process an incoming package for a specified customer, including assigning a tracking code unique to the package being processed, and specifying a default route assigned to the package being processed, the specified route being one of plural candidate routes including locker pickup, mailcenter pickup and delivery to specified address;

a mail service controller to communicate with the package processing workstation and monitor status of the plural package storage lockers; and a locker assignment device including a device identifier reader to read the device identifier of the package storage locker when the package specified for locker pickup is at the assigned package storage locker, and a wireless communication interface through which the locker assignment device communicates with the mail service controller, and wherein the locker assignment device, upon reading the device identifier of the package storage locker in which the package specified for locker pickup is being deposited, communicates via the wireless communication interface to the mail service controller the device identifier of the package storage locker in association with the tracking code of the deposited package, and wherein the mail service controller, upon receiving from the locker assignment device the device identifier of the package storage locker in association with the tracking code of the deposited package, registers an unlock code in association with the device identifier and the tracking code, and transmits a locker pickup notification of arrived package to an electronic address of a specified customer registered in the customer database, the locker pickup notification informing arrival of the deposited package, identifying the deposited package by the tracking code of the deposited package, indicating a location and device identifier of the package storage locker, and indicating the unlock code for unlocking the package storage locker for removal of the deposited package from the package storage locker.

2. The mailcenter package locker system as claimed in claim 1,
wherein when the mail service controller receives, from the locker assignment device, the device identifier of the package storage locker in association with the tracking code of the deposited package, the mail service controller generates an assigned unlock code to be associated with the device identifier and the tracking code, and transmits the assigned unlock code to the locker assignment device, and
wherein the locker assignment device, in response to receiving the assigned unlock code associated with the device identifier of the package storage locker, communicates the assigned unlock code by wireless communication to the package storage locker.

3. The mailcenter package locker system as claimed in claim 2,
wherein the package storage locker further includes a local storage device to register the assigned unlock code received from the locker assignment device, and when an input unlock code is entered through the code entry device of the package storage locker, the package storage locker compares the input unlock code to the assigned unlock code and unlocks only if the input unlock code matches the assigned unlock code registered in the local storage device.

4. The mailcenter package locker system as claimed in claim 1,
wherein the package storage locker further includes an RF tag on or in a package storage locker, the RF tag registering the unlock code of the package storage locker, and the device identifier reader of the locker assignment device includes a RF tag reader to communicate with the RF tag to obtain the registered unlock code from the RF tag, and
wherein when the device identifier reader obtains the registered unlock code from the RF tag, the locker assignment device communicates the registered unlock code via the wireless communication interface to the mail service controller.

5. The mailcenter package locker system as claimed in claim 4,
wherein when an input unlock code is entered through the code entry device of the package storage locker, the package storage locker compares the input unlock code to the registered unlock code and unlocks only if the input unlock code matches the registered unlock code.

6. The mailcenter package locker system as claimed in claim 1,
wherein the package storage locker further includes a device barcode on or in the package storage locker, the device barcode encoding the device identifier and an assigned unlock code of the package storage locker, and
wherein the device identifier reader of the locker assignment device includes a barcode reader to read the device barcode from the package storage locker, and
wherein the locker assignment device decodes the assigned unlock code from the device barcode read by the barcode reader, and communicates the assigned unlock code of the package storage locker via the wireless communication interface to the mail service controller.

7. The mailcenter package locker system as claimed in claim 6,
wherein the package storage locker further includes a local storage device to register the assigned unlock code which is assigned to the package storage locker and is encoded by the device barcode, and
wherein when an input unlock code is entered through the code entry device of the package storage locker, the package storage locker compares the input unlock code to the assigned unlock code registered in the local storage device, and unlocks only if the input unlock code matches the registered unlock code.

8. The mailcenter package locker system as claimed in claim 1, wherein the package storage locker further includes:
a wireless communication interface through which the package storage locker communicates with the mail service controller; and the package storage locker further includes a local storage device to register an assigned unlock code which is assigned to the package storage locker, and
wherein the mail service controller communicates directly with the package storage locker, via the wireless communication interface of the package storage locker, to obtain the assigned unlock code of the package storage locker.

9. The mailcenter package locker system as claimed in claim 1,
wherein the package storage locker further includes a wireless communication interface through which the package storage locker communicates with the mail service controller, and wherein when the locker assignment device communicates the device identifier of the package storage locker in association with the tracking code of the package to the mail service controller, the mail service controller generates an assigned unlock code to be associated with the device identifier of the package storage locker and the tracking code of the package assigned to locker pickup, and communicates the assigned unlock code directly to the package storage locker via the wireless communication interface of the package storage locker, and wherein the package storage locker further includes a local storage device to register the assigned unlock code assigned to the package storage locker and received, via the wireless communication interface of the package storage locker, from the mail service controller.

10. The mailcenter package locker system as claimed in claim 1,
wherein when the package being processed is assigned to locker pickup, the package processing workstation assigns a required locker size to the package being processed, and the locker assignment device determines, based on the device identifier of the package storage device, a size of the package storage device, and permits the package to be deposited in the package storage device only if the size of the package storage device is the same as or greater than the required locker size of the package.

11. The mailcenter package locker system as claimed in claim 1,
wherein the package storage locker further includes an identification reader, in addition to the code entry device, to require entry of a user identification as a precondition to unlock code entry.

12. The mailcenter package locker system as claimed in claim 1,
wherein the tracking code is a tracking barcode applied to the package for locker pickup, and the device identifier of the package storage locker is a device barcode on or in the package storage device, and
wherein the device identifier reader of the locker assignment device includes a barcode reader to read the device barcode, at the package storage locker, and read the tracking barcode on the package for locker pickup, and
wherein when the device identifier reader reads the device barcode from the package storage locker, the locker assignment device decodes the device identifier of the package storage locker from the device barcode, and communicates the device identifier in association with the tracking code of the package for locker pickup via the wireless communication interface to the mail service controller.

13. The mailcenter package locker system as claimed in claim 1,
wherein the locker assignment device is a handheld device and obtains the device identifier and unlock code of the package storage locker from the package storage locker, and the locker assignment device communicates the device identifier and unlock code of the package storage locker, via the wireless communication interface, to the mail service controller.

14. A method to automate package pickup in a mailcenter for a community of plural mail service customers registered in a customer database registering contact information for the plural mail service customers, comprising:

processing, by a package processing workstation, an incoming package for a specified customer, including assigning a tracking code unique to the package being processed, and specifying a default route assigned to the package being processed, the specified route being one of plural candidate routes including locker pickup, mailcenter pickup and delivery to specified address;

managing, by a mail service controller, package pickup and delivery, including communicating with the package processing workstation and monitoring status of plural package storage lockers;

reading, by a device identifier reader of a locker assignment device, a unique device identifier of a package storage locker having in addition an unlock code, when the package specified for locker pickup is at the package storage locker, and communicating through a wireless communication interface of the locker assignment device to the mail service controller the device identifier of the package storage locker in association with the tracking code of the deposited package; and registering, by the mail service controller upon receiving from the locker assignment device the device identifier of the package storage locker in association with the tracking code of the deposited package, an unlock code in association with the device identifier and the tracking code, and transmitting a locker pickup notification of arrived package to an electronic address of a specified customer registered in the customer database, the locker pickup notification informing arrival of the deposited package, identifying the deposited package by the tracking code of the deposited package, indicating a location and device identifier of the package storage locker, and indicating the unlock code to unlock the package storage locker for removal of the deposited package from the package storage locker.

15. The method as claimed in claim 14, further comprising:

generating an assigned unlock code associated with the device identifier of the package storage locker and transmitting the assigned unlock code from the mail service controller to the locker assignment device, which in turn communicates the assigned unlock code by wireless communication to the package storage locker;

registering in a local storage device of the package storage locker the assigned unlock code received by the package storage locker from the locker assignment device; and comparing, when an input unlock code is entered through a code entry device of the package storage locker, (i) the input unlock code to (ii) the assigned unlock code and unlocking the package storage locker to permit removal of the deposited package from the package storage locker, only if the input unlock code matches the assigned unlock code registered in the local storage device.

16. The method as claimed in claim 14, further comprising:

registering the unlock code of the package storage locker, in an RF tag on or in the package storage locker;

communicating the registered unlock code from the RF tag to the locker assignment device in response to a request received from a RF tag reader of the locker assignment device, which in turn communicates the registered unlock code via the wireless communication interface of the locker assignment device to the mail service controller; and comparing, when an input unlock code is entered through a code entry device of the package storage locker, (i) the input unlock code to (ii) the registered unlock code and unlocking the package storage locker to permit removal of the deposited package from the package storage locker, only if the input unlock code matches the registered unlock code registered in the RF tag.

17. The method as claimed in claim 14, further comprising:
reading, by a barcode reader of the locker assignment device, a device barcode on or in the package storage locker, the device barcode encoding the device identifier and an assigned unlock code of the package storage locker;
decoding, by the locker assignment device, the assigned unlock code from the device barcode read by the barcode reader, and communicating the assigned unlock code of the package storage locker via the wireless communication interface to the mail service controller;
registering, by a local storage device of the package storage locker, the assigned unlock code which is assigned to the package storage locker and is encoded by the device barcode; and
comparing, when an input unlock code is entered through a code entry device of the package storage locker, (i) the input unlock code to (ii) the assigned unlock code and unlocking the package storage locker to permit removal of the deposited package from the package storage locker, only if the input unlock code matches the assigned unlock code registered in the local storage device.

18. The method as claimed in claim 14, further comprising:
registering in a local storage device of the package storage locker an assigned unlock code which is assigned to the package storage locker; and
communicating by the mail service controller directly with the package storage locker, via a wireless communication interface of the package storage locker, to obtain the assigned unlock code of the package storage locker.

19. The method as claimed in claim 14, further comprising:
generating by the mail service controller, when the locker assignment device communicates the device identifier of the package storage locker in association with the tracking code of the package to the mail service controller, an assigned unlock code to be associated with the device identifier of the package storage locker and the tracking code of the package assigned to locker pickup, and communicating by the mail service controller the assigned unlock code directly to the package storage locker via a wireless communication interface of the package storage locker; and
registering in a local storage device of the package storage locker the assigned unlock code received, via the wireless communication interface of the package storage locker, from the mail service controller.

* * * * *